US008627934B2

(12) United States Patent
Murata et al.

(10) Patent No.: US 8,627,934 B2
(45) Date of Patent: Jan. 14, 2014

(54) FLUID TRANSMISSION DEVICE

(75) Inventors: Kiyohito Murata, Susono (JP); Takuya Okada, Susono (JP)

(73) Assignee: Toyta Jidosha Kabushiki Kaisha, Aichi-ken (JP)

( * ) Notice: Subject to any disclaimer, the term of this patent is extended or adjusted under 35 U.S.C. 154(b) by 390 days.

(21) Appl. No.: 13/123,362

(22) PCT Filed: Oct. 9, 2009

(86) PCT No.: PCT/IB2009/007098
§ 371 (c)(1),
(2), (4) Date: Apr. 8, 2011

(87) PCT Pub. No.: WO2010/041137
PCT Pub. Date: Apr. 15, 2010

(65) Prior Publication Data
US 2011/0192691 A1   Aug. 11, 2011

(30) Foreign Application Priority Data

Oct. 10, 2008  (JP) ................................. 2008-264594
Oct. 10, 2008  (JP) ................................. 2008-264595

(51) Int. Cl.
*F16D 33/00*   (2006.01)
*F16D 35/00*   (2006.01)
*F16D 37/00*   (2006.01)
*F16D 21/00*   (2006.01)
*F16D 25/08*   (2006.01)
*F16D 25/10*   (2006.01)

(52) U.S. Cl.
USPC ...... 192/3.26; 192/3.25; 192/3.3; 192/48.613

(58) Field of Classification Search
USPC ...................... 192/3.25 X, 3.3 X, 48.613 X
See application file for complete search history.

(56) References Cited

U.S. PATENT DOCUMENTS

| 4,966,261 A | 10/1990 | Kohno et al. | |
| 5,211,270 A * | 5/1993 | Tamura et al. | ............... 192/3.29 |

(Continued)

FOREIGN PATENT DOCUMENTS

| DE | 199 05 625 A1 | 8/1999 |
| JP | 5-215197 A | 8/1993 |

(Continued)

OTHER PUBLICATIONS

International Search Report and Written Opinion for corresponding International Patent Application No. PCT/IB2009/007098 mailed Jan. 28, 2010.

(Continued)

*Primary Examiner* — David D Le
*Assistant Examiner* — Colby M Hansen
(74) *Attorney, Agent, or Firm* — Sughrue Mion, PLLC

(57) ABSTRACT

A fluid transmission device includes a pre-damper (10) that transmits driving force received from a crankshaft (100) to a front cover (20) via first damper springs (14), a mechanism (30) that transmits the driving force transmitted to a pump (31) to a turbine (32) via hydraulic fluid, a piston member (40) that is disposed between the front cover (20) and the mechanism (30) and delivers the driving force to an output shaft (200), a dynamic damper (60) that connects the piston member (40) and the turbine (32) via second damper springs (63), a lock-up clutch (50) that enables the front cover (20) and the piston member (40) to engage with each other, a turbine clutch (70) that enables the turbine (32) and the piston member (40) to engage with each other, and a control device (80) that controls the lock-up clutch (50) and the turbine clutch (70).

36 Claims, 25 Drawing Sheets

(56) References Cited

U.S. PATENT DOCUMENTS

| | | | |
|---|---|---|---|
| 5,699,887 A * | 12/1997 | Kundermann | 192/3.26 |
| 8,051,964 B2 * | 11/2011 | Olsen et al. | 192/3.3 |
| 2008/0149440 A1 | 6/2008 | Sturgin | |

FOREIGN PATENT DOCUMENTS

| JP | 5-263893 A | 10/1993 |
|---|---|---|
| JP | 6-26561 A | 2/1994 |
| JP | 8-226522 A | 9/1996 |
| JP | 9-32904 A | 2/1997 |
| JP | 9-126275 A | 5/1997 |
| JP | 9-236173 A | 9/1997 |
| JP | 9-264399 A | 10/1997 |
| JP | 11-159595 A | 6/1999 |
| JP | 2000-154863 A | 6/2000 |
| JP | 2003-065421 A | 3/2003 |
| JP | 2003-130207 A | 5/2003 |

OTHER PUBLICATIONS

Japanese Office Action for corresponding Japanese Patent Application No. 2008-264595 drafted Aug. 12, 2010.
Japanese Office Action for corresponding Japanese Patent Application No. 2008-264594 drafted Aug. 11, 2010.

* cited by examiner

| FIRST SWITCHING VALVE | ON |
|---|---|
| SECOND SWITCHING VALVE | OFF |
| THIRD SWITCHING VALVE | OFF |
| FIRST CONTROL VALVE | OFF |
| SECOND CONTROL VALVE | OFF |

| FIRST OPERATING MODE (CONVERTER MODE) | |
|---|---|
| LOCK-UP CLUTCH OFF | |
| DYNAMIC DAMPER OFF | |
| PORT1 | SUPPLY STATE |
| PORT2 | DISCHARGE STATE |
| PORT3 | DISCHARGE STATE |
| LOCK-UP CLUTCH | RELEASE STATE |
| TURBINE CLUTCH | ENGAGED STATE |

FIRST OPERATING MODE

| FIRST SWITCHING VALVE | OFF |
|---|---|
| SECOND SWITCHING VALVE | ON |
| THIRD SWITCHING VALVE | OFF |
| FIRST CONTROL VALVE | ON |
| SECOND CONTROL VALVE | OFF |

| SECOND OPERATING MODE (L/U=ON D/D=ON) | |
|---|---|
| LOCK-UP CLUTCH ON | |
| DYNAMIC DAMPER ON | |
| PORT1 | DISCHARGE STATE |
| PORT2 | SUPPLY STATE |
| PORT3 | DISCHARGE STATE (CONTROL) |
| LOCK-UP CLUTCH | FULLY ENGAGED STATE |
| TURBINE CLUTCH | RELEASE STATE |

SECOND OPERATING MODE, FIFTH OPERATING MODE

| FIRST SWITCHING VALVE | OFF |
|---|---|
| SECOND SWITCHING VALVE | OFF |
| THIRD SWITCHING VALVE | ON |
| FIRST CONTROL VALVE | OFF |
| SECOND CONTROL VALVE | OFF |

| THIRD OPERATING MODE (L/U=ON D/D=OFF) ||
|---|---|
| LOCK-UP CLUTCH ON ||
| DYNAMIC DAMPER OFF ||
| PORT1 | DISCHARGE STATE |
| PORT2 | DISCHARGE STATE |
| PORT3 | SUPPLY STATE |
| LOCK-UP CLUTCH | FULLY ENGAGED STATE |
| TURBINE CLUTCH | ENGAGED STATE |

THIRD OPERATING MODE, SIXTH OPERATING MODE

FIG. 10

| FIRST SWITCHING VALVE | ON | OFF | ON |
|---|---|---|---|
| SECOND SWITCHING VALVE | ON | OFF | ON |
| THIRD SWITCHING VALVE | ON | OFF | OFF |
| FIRST CONTROL VALVE | OFF | OFF | OFF |
| SECOND CONTROL VALVE | OFF | OFF | OFF |

| FOURTH OPERATING MODE (FREE MODE) | | | |
|---|---|---|---|
| LOCK-UP CLUTCH OFF | | | |
| DYNAMIC DAMPER ON | | | |
| PORT1 | SUPPLY STATE | DISCHARGE STATE | SUPPLY STATE |
| PORT2 | SUPPLY STATE | DISCHARGE STATE | SUPPLY STATE |
| PORT3 | SUPPLY STATE | DISCHARGE STATE | DISCHARGE STATE |
| LOCK-UP CLUTCH | RELEASE STATE | RELEASE STATE | RELEASE STATE |
| TURBINE CLUTCH | RELEASE STATE | RELEASE STATE | RELEASE STATE |

| FIRST SWITCHING VALVE | OFF |
|---|---|
| SECOND SWITCHING VALVE | ON |
| THIRD SWITCHING VALVE | OFF |
| FIRST CONTROL VALVE | ON |
| SECOND CONTROL VALVE | OFF |

| FIFTH OPERATING MODE (L/U=SLIP D/D=ON) ||
|---|---|
| LOCK-UP CLUTCH ON (SLIP) ||
| DYNAMIC DAMPER ON ||
| PORT1 | DISCHARGE STATE |
| PORT2 | SUPPLY STATE |
| PORT3 | DISCHARGE STATE (CONTROL) |
| LOCK-UP CLUTCH | SLIPPING STATE |
| TURBINE CLUTCH | RELEASE STATE |

| FIRST SWITCHING VALVE | OFF |
|---|---|
| SECOND SWITCHING VALVE | OFF |
| THIRD SWITCHING VALVE | ON |
| FIRST CONTROL VALVE | OFF |
| SECOND CONTROL VALVE | ON |

| SIXTH OPERATING MODE (L/U=SLIP D/D=OFF) ||
|---|---|
| LOCK-UP CLUTCH ON (SLIP) ||
| DYNAMIC DAMPER OFF ||
| PORT1 | DISCHARGE STATE |
| PORT2 | DISCHARGE STATE |
| PORT3 | SUPPLY STATE (CONTROL) |
| LOCK-UP CLUTCH | SLIPPING STATE |
| TURBINE CLUTCH | ENGAGED STATE |

FIG. 16

|  | FIRST OPERATING MODE | FIRST INTERMEDIATE OPERATION | SECOND INTERMEDIATE OPERATION | FIFTH OPERATING MODE |
|---|---|---|---|---|
| PORT1 | SUPPLY STATE | SUPPLY STATE | SUPPLY STATE | DISCHARGE STATE |
| PORT2 | DISCHARGE STATE | SUPPLY STATE | SUPPLY STATE | SUPPLY STATE |
| PORT3 | DISCHARGE STATE | DISCHARGE STATE | DISCHARGE STATE (CONTROL) | DISCHARGE STATE (CONTROL) |
| LOCK-UP CLUTCH | RELEASE STATE |  |  | SLIPPING STATE |
| TURBINE CLUTCH | ENGAGED STATE |  |  | RELEASE STATE |

FIG. 17

|  | FIRST OPERATING MODE | THIRD INTERMEDIATE OPERATION | FOURTH INTERMEDIATE OPERATION | SECOND OPERATING MODE |
|---|---|---|---|---|
| PORT1 | SUPPLY STATE | SUPPLY STATE | SUPPLY STATE | DISCHARGE STATE |
| PORT2 | DISCHARGE STATE | SUPPLY STATE | SUPPLY STATE | SUPPLY STATE |
| PORT3 | DISCHARGE STATE | DISCHARGE STATE | DISCHARGE STATE (CONTROL) | DISCHARGE STATE (CONTROL) |
| LOCK-UP CLUTCH | RELEASE STATE |  |  | FULLY ENGAGED STATE |
| TURBINE CLUTCH | ENGAGED STATE |  |  | RELEASE STATE |

FIG. 18

|  | SECOND OPERATING MODE | FIFTH INTERMEDIATE OPERATION | FIRST OPERATING MODE |
|---|---|---|---|
| PORT1 | DISCHARGE STATE | DISCHARGE STATE | SUPPLY STATE |
| PORT2 | SUPPLY STATE | DISCHARGE STATE | DISCHARGE STATE |
| PORT3 | DISCHARGE STATE (CONTROL) | SUPPLY STATE | DISCHARGE STATE |
| LOCK-UP CLUTCH | FULLY ENGAGED STATE | | RELEASE STATE |
| TURBINE CLUTCH | RELEASE STATE | | ENGAGED STATE |

FIG. 19

|  | FIFTH OPERATING MODE | SIXTH INTERMEDIATE OPERATION | SEVENTH INTERMEDIATE OPERATION | FIRST OPERATING MODE |
|---|---|---|---|---|
| PORT1 | DISCHARGE STATE | DISCHARGE STATE | SUPPLY STATE | SUPPLY STATE |
| PORT2 | SUPPLY STATE | SUPPLY STATE | DISCHARGE STATE | DISCHARGE STATE |
| PORT3 | DISCHARGE STATE (CONTROL) | SUPPLY STATE | SUPPLY STATE | DISCHARGE STATE |
| LOCK-UP CLUTCH | SLIPPING STATE | | | RELEASE STATE |
| TURBINE CLUTCH | RELEASE STATE | | | ENGAGED STATE |

FIG. 20

|  | FIRST OPERATING MODE | EIGHTH INTERMEDIATE OPERATION | SIXTH OPERATING MODE |
|---|---|---|---|
| PORT1 | SUPPLY STATE | SUPPLY STATE | DISCHARGE STATE |
| PORT2 | DISCHARGE STATE | DISCHARGE STATE | DISCHARGE STATE |
| PORT3 | DISCHARGE STATE | SUPPLY STATE | SUPPLY STATE (CONTROL) |
| LOCK-UP CLUTCH | RELEASE STATE |  | SLIPPING STATE |
| TURBINE CLUTCH | ENGAGED STATE |  | ENGAGED STATE |

FIG. 21

|  | FIRST OPERATING MODE | NINTH INTERMEDIATE OPERATION | THIRD OPERATING MODE |
|---|---|---|---|
| PORT1 | SUPPLY STATE | SUPPLY STATE | DISCHARGE STATE |
| PORT2 | DISCHARGE STATE | DISCHARGE STATE | DISCHARGE STATE |
| PORT3 | DISCHARGE STATE | SUPPLY STATE | SUPPLY STATE |
| LOCK-UP CLUTCH | RELEASE STATE |  | FULLY ENGAGED STATE |
| TURBINE CLUTCH | ENGAGED STATE |  | ENGAGED STATE |

FIG. 22

|  | THIRD OPERATING MODE | TENTH INTERMEDIATE OPERATION | FIRST OPERATING MODE |
|---|---|---|---|
| PORT1 | DISCHARGE STATE | SUPPLY STATE | SUPPLY STATE |
| PORT2 | DISCHARGE STATE | DISCHARGE STATE | DISCHARGE STATE |
| PORT3 | SUPPLY STATE | SUPPLY STATE | DISCHARGE STATE |
| LOCK-UP CLUTCH | FULLY ENGAGED STATE | | RELEASE STATE |
| TURBINE CLUTCH | ENGAGED STATE | | ENGAGED STATE |

FIG. 23

|  | SIXTH OPERATING MODE | ELEVENTH INTERMEDIATE OPERATION | FIRST OPERATING MODE |
|---|---|---|---|
| PORT1 | DISCHARGE STATE | SUPPLY STATE | SUPPLY STATE |
| PORT2 | DISCHARGE STATE | DISCHARGE STATE | DISCHARGE STATE |
| PORT3 | SUPPLY STATE (CONTROL) | SUPPLY STATE | DISCHARGE STATE |
| LOCK-UP CLUTCH | SLIPPING STATE | | RELEASE STATE |
| TURBINE CLUTCH | ENGAGED STATE | | ENGAGED STATE |

XXVII-XXVII SECTION

XXVIII-XXVIII SECTION

FLUID TRANSMISSION DEVICE

BACKGROUND OF THE INVENTION

1. Field of the Invention

The invention relates to a fluid transmission device, and in particular to a fluid transmission device including a lock-up clutch and a damper or dampers.

2. Description of the Related Art

In a fluid transmission device including a lock-up clutch, it is preferable, for improved fuel efficiency, to place the lock-up clutch in an engaged (ON) state when the engine speed as a rotational speed of an engine as a driving source is in a low rotational speed range. When the lock-up clutch is in the ON or engaged state, driving force from the engine, which is applied from an input member without being transmitted via hydraulic fluid, is directly transmitted to an output member, and vibrations, such as booming noise, are generated since no hydraulic fluid is involved in the transmission of the driving force. The vibrations, such as booming noise, vary in accordance with the engine speed, and become noticeable in particular rotational speed ranges. The particular rotational speed ranges exist in a plurality of engine speed ranges, and the booming noise occurs noticeably in one of the particular speed ranges which is in a low rotational speed range, resulting in driver's discomfort during driving of the vehicle. Accordingly, it has been desired to damp or suppress vibrations, such as booming noise, when the lock-up clutch is engaged in the low rotational speed range, so as to assure improved fuel efficiency.

Examples of the fluid transmission device including a damper for damping vibrations, such as booming noise, are disclosed in Japanese Patent Application Publication No. 2000-154863 (JP-A-2000-154863) and Japanese Patent Application Publication No. 11-159595 (JP-A-11-159595). Also, a fluid transmission device including a pre-damper mechanism for generally damping vibrations, such as booming noise, and a dynamic damper mechanism for locally damping such vibrations is disclosed in Japanese Patent Application Publication No. 9-264399 (JP-A-9-264399). In this fluid transmission device, the dynamic damper is brought into a non-operating state when the engine speed falls in a rotational speed range in which vibrations, such as booming noise, become worse due to the operation of the dynamic damper.

In the fluid transmission device as described above, the vibrations, such as booming noise, may be damped in the particular rotational speed range that exists in a low rotational speed range, but another particular rotational speed range or ranges may appear in another rotational speed range or ranges. Namely, it has been difficult to generally damp the vibrations, such as booming noise, in the overall speed range even if the fluid transmission device is equipped with the damper that damps the vibrations in a local (or particular) speed range. Also, in the fluid transmission device as described above, the dynamic damper is mechanically controlled to the operating state or non-operating state based on a predetermined rotational speed, and may not be controlled as desired. Thus, the above-described fluid transmission device is not satisfactory in terms of damping of vibrations, such as booming noise, in a local (or particular) speed range and the overall speed range.

SUMMARY OF THE INVENTION

The invention provides a fluid transmission device that is able to reduce vibrations, such as booming noise, with respect to the overall speed range and a local speed range.

A first aspect of the invention is concerned with a fluid transmission device including a front cover to which driving force of a driving source is transmitted from an input member, a pre-damper that has a first elastic body and transmits the driving force to the front cover via the first elastic body, a fluid transmission unit that includes a pump connected to the front cover and a turbine, and is operable to transmit the driving force transmitted to the pump, to the turbine, via a hydraulic fluid, a piston member that is disposed between the front cover and the fluid transmission unit, and delivers the driving force to an output member, a dynamic damper that has a second elastic body, and is connected to the piston member and the turbine via the second elastic body, and a clutch control device. In the fluid transmission device, a part of the turbine and a part of the piston member provide a turbine clutch, and are engaged with each other when the turbine clutch is in an engaged state, and a part of the front cover and another part of the piston member provide a lock-up clutch, and are engaged with each other when the lock-up clutch is in an engaged state. The clutch control device controls the lock-up clutch and the turbine clutch.

A second aspect of the invention is concerned with a fluid transmission device including a front cover to which driving force of a driving source is transmitted from an input member, a fluid transmission unit that has a pump connected to front cover and a turbine, and is operable to transmit the driving force transmitted to the pump, to the turbine, via a hydraulic fluid, a piston member that is disposed between the front cover and the fluid transmission unit, and delivers the driving force to an output member, a pre-damper that is provided between the input member and the front cover, for damping vibrations corresponding to a rotational speed of the driving source, a clutch control device, and a dynamic damper that is connected to the turbine and the piston member, and elastically supports the turbine when the clutch control device places a turbine clutch that a part of the turbine and a part of the piston member provide in a release state, so as to damp vibrations corresponding to a particular rotational speed range of the driving source. In the fluid transmission device, a part of the front cover and another part of the piston member provide a lock-up clutch, and are engaged with each other when the lock-up clutch is in an engaged state, and the part of the turbine and the part of the piston member are engaged with each other when the turbine clutch is in an engaged state. The clutch control device controls the lock-up clutch and the turbine clutch.

In the fluid transmission device according to the first or second aspect of the invention, the clutch control device may control the lock-up clutch and the turbine clutch so that the lock-up clutch is placed in a release state and the turbine clutch is placed in the engaged state when the fluid transmission device is in a fluid transmission state in which the driving force is transmitted to the output member via the fluid transmission unit, and the clutch control device may control the lock-up clutch and the turbine clutch so that the lock-up clutch is placed in the engaged state and the turbine clutch is placed in a release state when the fluid transmission device is in a damper operating, direct transmission state in which the driving force is directly transmitted to the output member while the dynamic damper is in an operating state in which the rotational speed of at least a part of the dynamic damper is different from that of the piston member. The clutch control device may also control the lock-up clutch and the turbine clutch so that the lock-up clutch is placed in the engaged state and the turbine clutch is placed in the engaged state when the fluid transmission device is in a damper non-operating, direct transmission state in which the driving force is directly transmitted to the output member while the dynamic damper is in a state other than the operating state.

In the fluid transmission device according to the first or second aspect of the invention, the above-indicated part of the front cover and the above-indicated another part of the piston member may be engaged by friction with each other when the lock-up clutch is in the engaged state, and the above-indicated part of the front cover may be a cover-side clutch face formed on the front cover while the above-indicated another part of the piston member may be a first piston-side clutch face that is formed on the piston member and is opposed to the cover-side clutch face. The above-indicated part of the turbine and the above-indicated part of the piston member may be engaged by friction with each other when the turbine clutch is in the engaged state, and the above-indicated part of the turbine may be a turbine-side clutch face formed on the turbine while the above-indicated part of the piston member may be a second piston-side clutch face that is formed on the piston member and is opposed to the turbine-side clutch face. The first piston-side clutch face may be formed on one side of the piston member which is closer to the front cover, and the second piston-side clutch face may be formed on the other side of the piston member which is closer to the turbine.

In the fluid transmission device as described just above, the turbine-side clutch face may be a turbine-side inclined face that is inclined radially inwards in an axial direction from an output-member side to an input-member side, and the second piston-side clutch face may be a piston-side inclined face which is located radially outwardly of the turbine-side inclined face and is opposed to the turbine-side inclined face, and which is inclined from radially inwards in the axial direction from the output-member side to the input-member side.

In the fluid transmission device according to the first or second aspect of the invention, the pre-damper may include an elastic body holding member that holds the first elastic body, rotates as a unit with the input member, and transmits the driving force to the first elastic body, and an elastic body side member that rotates relative to the elastic body holding member, rotates as a unit with the front cover, and transmits the driving force transmitted to the first elastic body, to the front cover. The front cover may be supported such that the front cover rotates relative to the input member, and the elastic body side member may be formed with a space in which the first elastic body and the elastic body holding member are received, and may be fastened by a fastening member to the front cover such that the elastic body side member rotates relative to the elastic body holding member and rotates as a unit with the front cover.

In the fluid transmission device as described just above, the space may be closed by the input member and the front cover, and a sealing member may be provided between the elastic body side member and the front cover.

In the fluid transmission device according to the first or second aspect of the invention, the clutch control device may control a pressure of the hydraulic fluid in a first port as a space formed between the front cover and the piston member, a pressure of the hydraulic fluid in a second port formed between the piston member and the turbine, and a pressure of the hydraulic fluid in a third port formed between the turbine and the pump, so as to control the lock-up clutch and the turbine clutch.

In the fluid transmission device as described just above, the clutch control device may include a port controller that brings each of the first, second and third ports into a supply state in which the hydraulic fluid is supplied to each of the ports or a discharge state in which the hydraulic fluid is discharged from each of the ports. When the fluid transmission device is in a fluid transmission state in which the driving force is transmitted to the output member via the fluid transmission unit, the port controller may bring the first port into the supply state, bring the second port into the discharge state, and bring the third port into the discharge state, so as to place the lock-up clutch in the release state and place the turbine clutch in the engaged state. The port controller may bring the first port into the discharge state, bring the second port into the supply state, and bring the third port into the discharge state, so as to place the lock-up clutch in the engaged state and place the turbine clutch in the release state, when the fluid transmission device is in a damper operating, direct transmission state in which the driving force is directly transmitted to the output member while the dynamic damper is in an operating state in which the rotational speed of at least a part of the dynamic damper is different from that of the piston member. The port controller may bring the first port into the discharge state, bring the second port into the discharge state, and bring the third port into the supply state, so as to place the lock-up clutch in the engaged state and place the turbine clutch in the engaged state, when the fluid transmission device is in a damper non-operating, direct transmission state in which the driving force is directly transmitted to the output member while the dynamic damper is in a state other than said operating state.

In the fluid transmission device as described above, the clutch control device may include a slip controller that controls the lock-up clutch that is in the engaged state into a slipping state in which the lock-up clutch is partially engaged or a fully engaged state. When the fluid transmission device is in a direct transmission state in which the driving force is directly transmitted to the output member, the slip controller may control a flow rate of the hydraulic fluid supplied to or discharged from the third port, so as to control the lock-up clutch into the slipping state or the fully engaged state.

In the fluid transmission device as described above, during switching from the fluid transmission state to the damper operating, direct transmission state, the port controller may perform intermediate control for bringing the second port into the supply state prior to switching to the damper operating, direct transmission state.

In the fluid transmission device as described above, during switching from the damper operating, direct transmission state to the fluid transmission state, the port controller may perform intermediate control for bringing the second port into the discharge state prior to switching to the fluid transmission state.

In the fluid transmission device as described above, during switching from the fluid transmission state to the damper non-operating, direct transmission state, the port controller may perform intermediate control for bringing the third port into the supply state prior to switching to the damper non-operating, direct transmission state.

In the fluid transmission device as described above, during switching from the damper non-operating, direct transmission state to the fluid transmission state, the port controller may perform intermediate control for bringing the first port into the supply state prior to switching to the fluid transmission state.

In the fluid transmission device as described above, the port controller may bring at least the second port into the discharge state when a brake is applied by a braking device provided in a vehicle on which the driving source is installed.

In the fluid transmission device as described above, the clutch control device may control at least the turbine clutch based on a rotational speed of the driving source, and a turbine-clutch engagement speed that is the rotational speed of the driving source at which the turbine clutch is brought into the engaged state may be different from a turbine-clutch release speed that is the rotational speed of the driving source at which the turbine clutch is brought into the release state.

The fluid transmission device as described above may further include a first channel resistance changing unit that is provided in a channel formed between the first port and the third port and is configured to change a channel resistance of the channel. In operation, the first channel resistance changing unit may increase the channel resistance when the hydraulic fluid is supplied from the first port, to a higher level than that provided when the hydraulic fluid is discharged from the first port.

The fluid transmission device as described above may further include a second channel resistance changing unit that is provided in a channel formed between the clutch control device and the third port and is configured to change a channel resistance of the channel. In operation, the second channel resistance changing unit may increase the channel resistance before the lock-up clutch is placed in the engaged state when the fluid transmission device switches from the fluid transmission state to the damper operating, direct transmission state or the damper non-operating, direct transmission state.

In the fluid transmission device as described just above, the fluid transmission unit may include a stator disposed between the pump and the turbine, and the second channel resistance changing unit may increase the channel resistance with reduction in torque of the stator in the fluid transmission state.

In the fluid transmission device according to the first or second aspect of the invention, the lock-up clutch may have a friction plate, and the friction plate may be provided on the front cover.

In the fluid transmission device according to the invention, the driving force of the driving source is transmitted to the front cover via the pre-damper. The pre-damper is provided between the input member and the front cover. Therefore, the balance between the input-side inertial mass and output-side inertial mass of the pre-damper is improved as compared with the case where the pre-damper is provided between the front cover and the fluid transmission unit. Thus, the resonance point corresponding to the rotational speed of the driving source can be lowered, and vibrations corresponding to the rotational speed of the driving source can be damped or suppressed. When the turbine clutch is in the release state, the dynamic damper elastically supports the turbine and operates to damp vibrations. Thus, the dynamic damper, when it is in the operating state, is able to suppress the resonance in a particular rotational speed range of the driving source with a phase opposite to that of the resonance, thereby to damp vibrations corresponding to the particular rotational speed range. Also, the dynamic damper may be placed in the operating state when the rotational speed of the driving source is within the particular rotational speed range, and may be placed in the non-operating state when the rotational speed is not within the particular speed range. Accordingly, the dynamic damper can operate only when vibrations corresponding to the particular rotational speed range of the driving source are to be damped, and is brought into the non-operating state before the rotational speed of the driving source enters a rotational speed range in which vibrations would become worse due to the operation of the dynamic damper. Thus, the vibrations are prevented from becoming worse due to the operation of the dynamic damper in the rotational speed range that is outside the particular rotational speed range. Namely, the turbine clutch is engaged or released so as to control the dynamic damper into the non-operating or operating state as desired, so that the dynamic damper can be effectively used. With this arrangement, vibrations, such as booming noise, can be reduced in a local speed range (i.e., particular speed range) and in the overall speed range.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 10 is a view useful for explaining a fourth operating mode of the fluid transmission device of FIG. 1 and FIG. 2;

FIG. 16 is a view illustrating intermediate control performed during switching from the first operating mode to the fifth operating mode;

FIG. 17 is a view illustrating intermediate control performed during switching from the first operating mode to the second operating mode;

FIG. 18 is a view illustrating intermediate control performed during switching from the second operating mode to the first operating mode;

FIG. 19 is a view illustrating intermediate control performed during switching from the fifth operating mode to the first operating mode;

FIG. 20 is a view illustrating intermediate control performed during switching from the first operating mode to the sixth operating mode;

FIG. 21 is a view illustrating intermediate control performed during switching from the first operating mode to the third operating mode;

FIG. 22 is a view illustrating intermediate control performed during switching from the third operating mode to the first operating mode;

FIG. 23 is a view illustrating intermediate control performed during switching from the sixth operating mode to the first operating mode;

DETAILED DESCRIPTION OF EMBODIMENTS

One embodiment of the invention will be described in detail with reference to the drawings. It is, however, to be understood that the invention is not limited to the embodiment as described below, and that constituent elements of the invention include those of the following embodiment, those that can be easily conceived by those skilled in the art, and those that are substantially the same as the elements of the following embodiment. While an engine, such as a gasoline engine, diesel engine, or LPG engine, is used in the following embodiment as a driving source for generating driving force or power to be transmitted to a fluid transmission device, the driving source is not limited to these types of engines, but may be an electric machine, such as a motor, or a combination of an engine and an electric machine, such as a motor.

Figure 1:
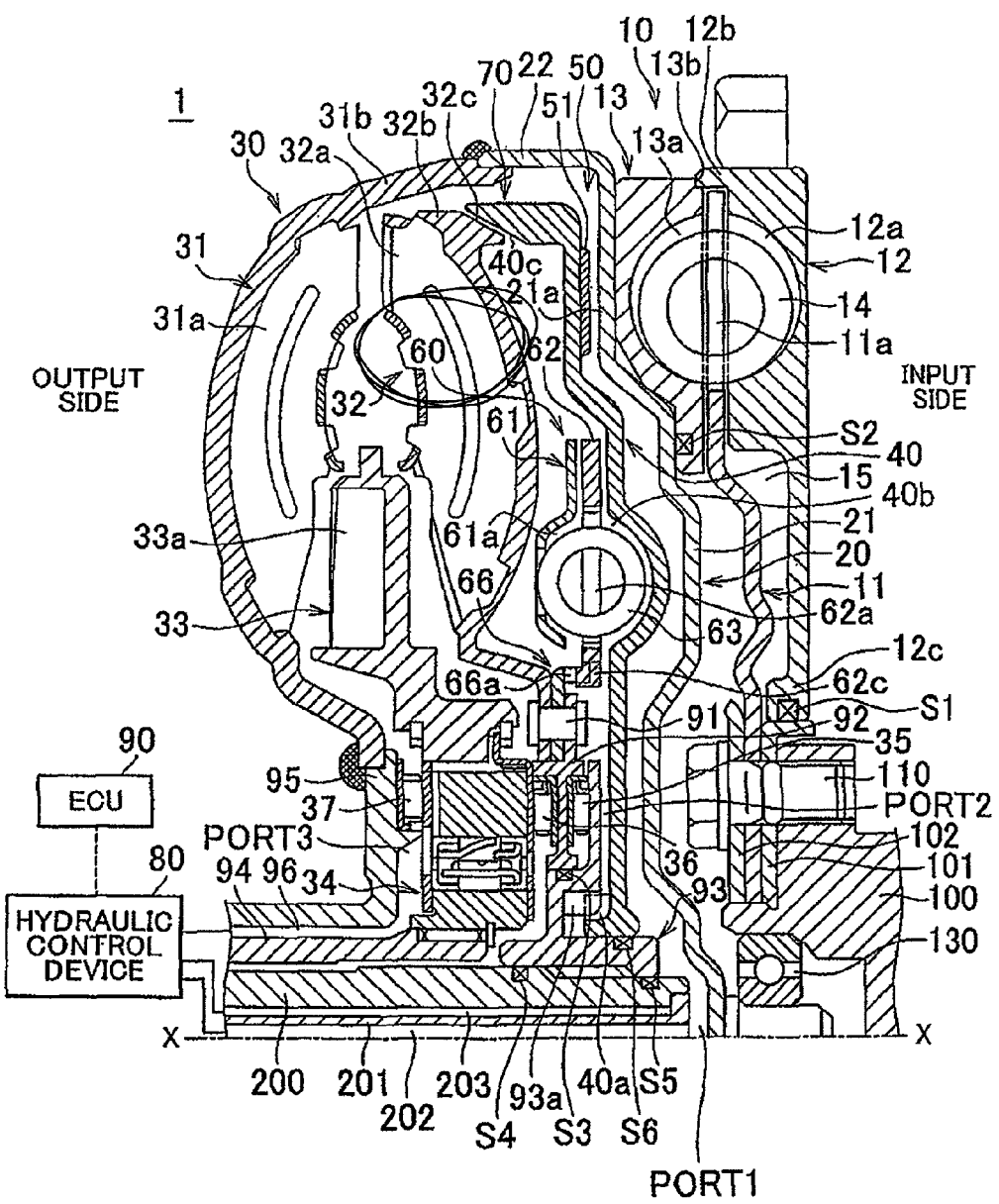
FIG. 1 is a cross-sectional view showing a principal part of a fluid transmission device according to one embodiment of the invention.
Figure 2:
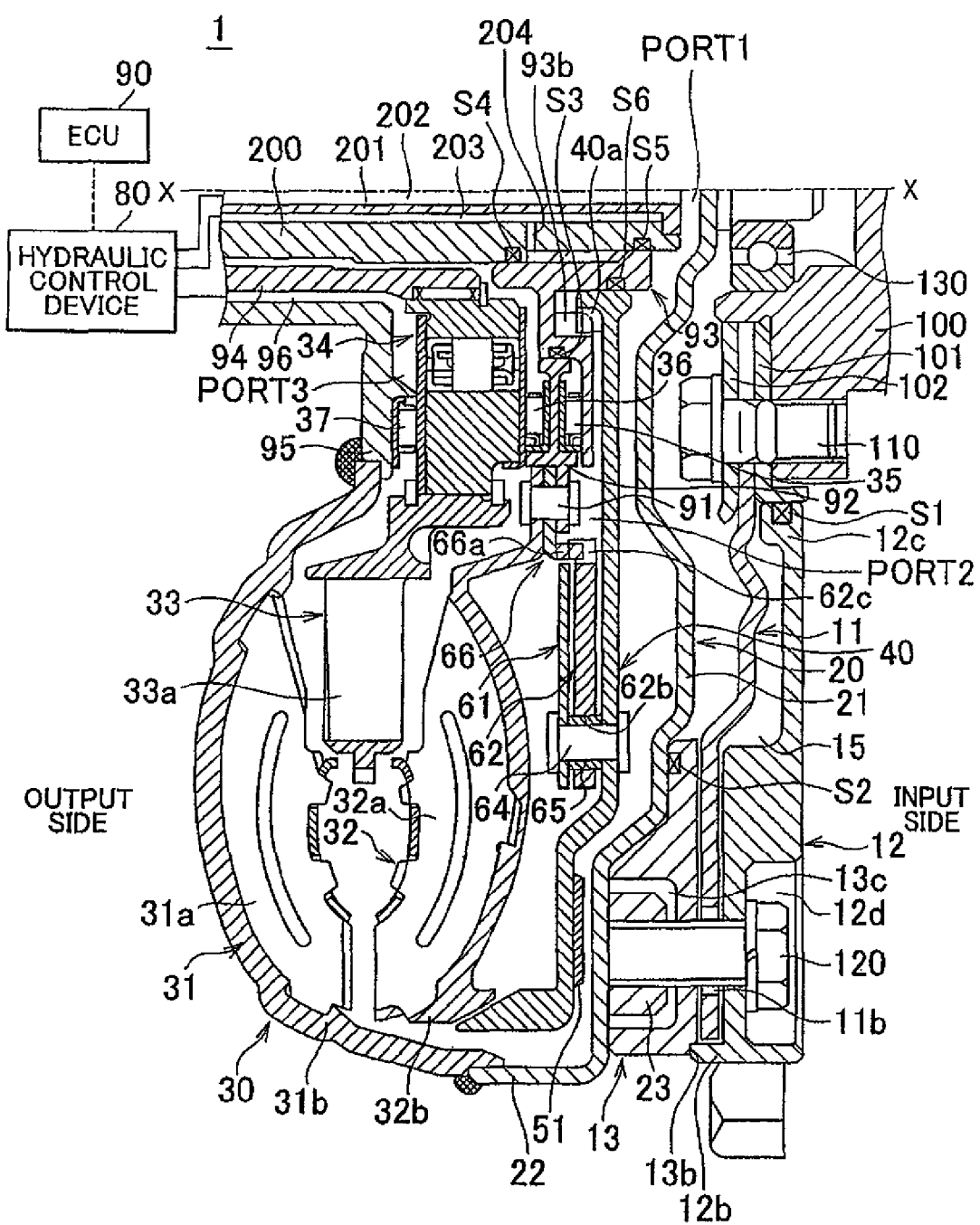
FIG. 2 is a cross-sectional view showing a principal part of the fluid transmission device according to the embodiment of FIG. 1.
Figure 3:
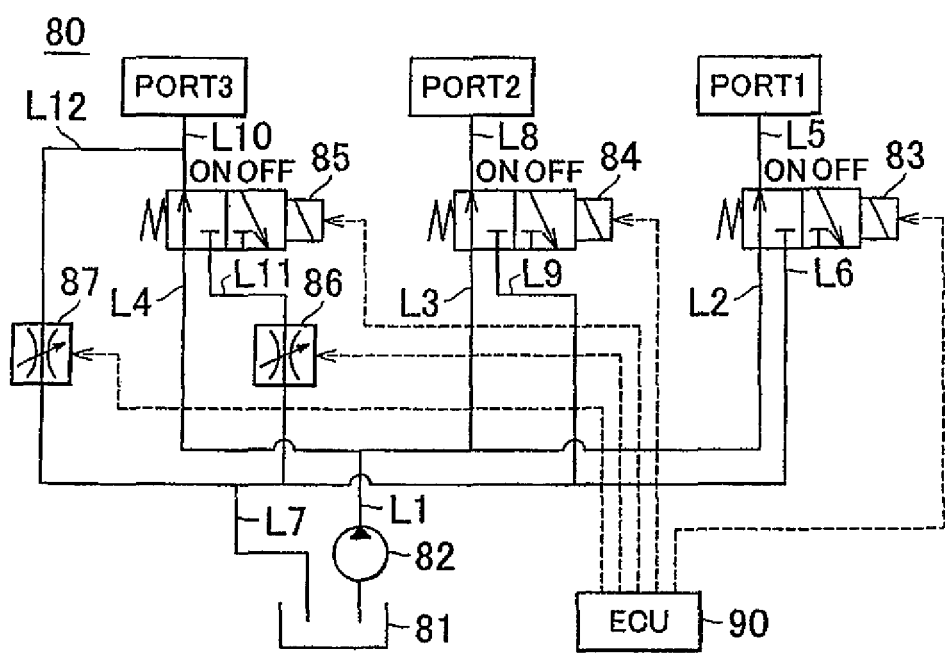
FIG. 3 is a view schematically showing an exemplary arrangement of a hydraulic control device of the fluid transmission device of FIG. 1 and FIG. 2.

FIG. 1 and FIG. 2 are cross-sectional views showing principal parts of a fluid transmission device according to the embodiment of the invention. The outline or contour of the fluid transmission device is generally provided by rotating the structure as shown in FIG. 1 and FIG. 2 about the X-X axis indicated as a centerline in FIG. 1 and FIG. 2, in a circumferential direction. The sections of the principal parts of the fluid transmission device as shown in FIG. 1 and FIG. 2 are those as viewed in different directions with respect to the X-X axis. FIG. 3 schematically shows an exemplary arrangement of a hydraulic control device 80 of the fluid transmission device. As shown in FIG. 1 through FIG. 3, the fluid transmission device 1 of this embodiment consists principally of a pre-damper 10, front cover 20, fluid transmission mechanism 30, piston member 40, lock-up clutch 50, dynamic damper 60, turbine clutch 70 and the hydraulic control device 80. Reference numeral 90 denotes ECU that is electrically connected to the hydraulic control device 80 and is configured to control opening and closing of each valve of the hydraulic control device 80. Reference numeral 100 denotes a crankshaft as an input member that applies the driving force of the engine to the fluid transmission device 1. Also, reference numeral 200 denotes an output shaft (e.g. an input shaft of a transmission) to which the driving force of the engine is delivered from the fluid transmission device 1.

The pre-damper 10 is provided between the crankshaft 100 as the input member and the front cover 20, and serves to damp vibrations corresponding to the engine speed that is the rotational speed of the engine as the driving source (not shown). Also, the pre-damper 10 transmits the driving force of the engine applied from the crankshaft 100 to the front cover 20 via first damper springs 14 (which will be described later) as a first elastic body. As shown in FIG. 1 and FIG. 2, the pre-damper 10 consists principally of a spring holding member 11, first spring side member 12, second spring side member 13 and two or more first damper springs 14.

The spring holding member 11 is an example of the elastic-body holding member, and has an annular shape. The spring holding member 11 is disposed between the first spring side member 12 and the second spring member 13, and holds the two or more first damper springs 14. The spring holding member 11 is fastened, along with stress relaxation side members 101, 102, to the crankshaft 100 by means of fastening members 110 (e.g., bolts). Accordingly, the spring holding member 11 is able to rotate, along with the stress relaxation side members 101, 102, as a unit with the crankshaft 100. Namely, the driving force of the engine is transmitted from the crankshaft 100 to the spring holding member 11. The spring holding member 11 is positioned in radial directions by the crankshaft 100. Also, the spring holding member 11 is formed with spring holding portions 11a and bolt slide portions 11b. The stress relaxation side members 101, 102, each having an annular shape, absorb deformation of the spring holding member 11 and make the bolt pressure of the fastening members 110 uniform, so as to prevent a fastened portion (which consists of the spring holding member 11, stress relaxation side members 101, 102, crankshaft 100 and the fastening members 110) from being damaged.

The spring holding portions 11a (in the form of, for example, notches) are formed at radially outer positions of the spring holding member 11, such that the two or more spring holding portions 11a are arranged in the circumferential direction of the spring holding member 11. The above-mentioned first damper spring 14 is held in each of the spring holding portions 11a, such that opposite end portions of the first damper spring 14 are in contact with the spring holding member 11.

The bolt slide portions 11b (in the form of, for example, arc-shaped slits) are formed at radially outer positions of the spring holding member 11, such that the two or more bolt slide portions 11b are arranged in the circumferential direction of the spring holding member 11. The spring holding portions 11a and the bolt slide portions 11b are formed in the spring holding member 11 to be arranged alternately in the circumferential direction. The bolt slide portions 11b allow fastening bolts 120 to slide relative to the spring holding member 11 in the circumferential direction.

The first spring side member 12 provides a part of the elastic-body side member. The first spring side member 12, which has an annular shape, is opposed to the second spring side member 13 via the spring holding member 11. The first spring side member 12 is formed with spring receiving portions 12a each of which receives a part of each of the first damper springs 14 held by the spring holding member 11. The first spring side member 12 is also formed with driving force transmitting portions that can contact the opposite end portions of the first damper springs 14 held by the spring holding member 11. With this arrangement, the driving force transmitted to the spring holding member 11 is transmitted to the first spring side member 12 via the two or more first damper springs 14. Also, the first spring side member 12 is formed with a first contact portion 12b that protrudes from a radially outer end portion thereof toward the output side (FIG. 1, FIG. 2) and extends continuously in the circumferential direction. The first spring side member 12 is also formed at its radially inner end portion with a second contact portion 12c that extends continuously in the circumferential direction. In this embodiment, the second contact portion 12c is in contact with the stress relaxation side member 101 in radial directions. Accordingly, the elastic-body side member is positioned in radial directions by the crankshaft 100 to which the stress relaxation side member 101 is fastened. The first spring side member 12 is formed with bolt receiving portions 12d each of which receives a part of each of the fastening bolts 120. The spring receiving portions 12a and the bolt receiving portions 12d are formed in the first spring side member 12 to be arranged alternately in the circumferential direction.

The second spring side member 13 provides a part of the elastic-body side member. Namely, the elastic-body side member consists of two members, i.e., the first spring side member 12 and the second spring side member 13. The second spring side member 13, which has an annular shape, is opposed to the first spring side member 12 via the spring holding member 11. The second spring side member 13 is formed with spring receiving portions 13a each of which receives a part of each of the first damper springs 14 held by the spring holding member 11. The second spring side member 13 is also formed with driving force transmitting portions that can contact the opposite end portions of the first damper springs 14 held by the spring holding member 11. With this arrangement, the driving force transmitted to the spring holding member 11 is transmitted to the second spring side member 13 via the two or more first damper springs 14. Also, the second spring side member 13 is formed at its radially outer end portion with a stepped portion 13b that extends continuously in the circumferential direction. The second spring side member 13 is also formed with block receiving portions 13c that receive set blocks 23 (which will be described later) of the front cover 20. The spring receiving portions 13a and the block receiving portions 13c are formed in the second spring side member 13 to be arranged alternately in the circumferential direction.

The first damper springs 14 constitute an example of the first elastic body, and are in the form of coil springs. The first damper springs 14 transmit the driving force transmitted from the crankshaft 100 to the spring holding member 11, to the first spring side member 12 and the second spring side member 13. When the driving force is transmitted to the spring holding member 11, one end portion of each of the first damper springs 14 contacts the spring holding member 11, and the other end portion contacts the first spring side member 12 and the second spring side member 13, so that the first damper springs 14 transmit the driving force to the first spring side member 12 and second spring side member 13 contacting the first damper springs 14 while elastically deforming in accordance with the driving force. Since the spring holding member 11 transmits the driving force received from the crankshaft 100 to the spring side members via the first damper springs 14, excessive stress is prevented from being applied to the spring holding member 11, thus assuring improved reliability. In this connection, the spring constant of the first damper springs 14 may be set to a relatively low value. By providing the first damper springs 14 with a low spring constant, it is possible to lower the resonance point and improve the vibration absorbing capability of the pre-damper 10, which may lead to reduction of vibrations, such as booming noise, corresponding to the rotational speed of the engine (not shown), and reduction of vibrations, such as booming noise, over the entire range of the engine speed.

The first spring side member 12 and the second spring side member 13, are fastened to the set blocks 23 with the fastening bolts 120. Namely, the first spring side member 12 and the second spring side member 13 are integrated with the front cover 20, and are able to rotate with the front cover 20. In this condition, the fastening bolts 120 are inserted in the bolt slide portions 11b of the spring holding member 11. Thus, the first spring side member 12, second spring side member 13 and front cover 20 that are integrated together by means of the fastening bolts 120 are able to rotate relative to the spring holding member 11. With this arrangement, the driving force of the engine is transmitted to the front cover 20 via the pre-damper 10. The pre-damper 10 is disposed between the crankshaft 100 and the front cover 20, as described above. Therefore, the balance between the input-side inertial mass and output-side inertial mass of the pre-damper 10 is improved as compared with the case where the pre-damper 10 is disposed between the front cover 20 and the fluid transmission mechanism 30. Thus; the resonance point corresponding to, the engine speed can be lowered, and vibrations corresponding to the engine speed can be damped or suppressed.

The fastening bolts 120 allow the first spring side member 12 and the second spring side member 13 to rotate relative to the spring holding member 11; therefore, rivets, or the like, need not be used, which leads to reduction of the number of components, and reduction of the manufacturing cost. The front cover 20, which can rotate relative to the crankshaft 100, is rotatably supported on the crankshaft 100 via a bearing 130. With the first spring side member 12 and second spring side member 13 fastened to the front cover 20 with the fastening bolts 120, a part of each fastening bolt 120 is received in a corresponding one of the bolt receiving portions 12d, and each of the set blocks 23 is received in a corresponding one of the block receiving portions 13c. With this arrangement, the size or dimension of the fluid transmission device 1 as measured in the axial direction does not become so large even if the pre-damper 10 is provided between the crankshaft 100 and the front cover 20.

The first spring side member 12 and the second spring side member 13 are integrated together by means of the fastening bolts 120, so that the first contact portion 12b contacts the stepped portion 13b over the entire circumference, and radially outer end portions of the first spring side member 12 and second spring side member 13 are closed. In this condition, the axial distance or spacing between the first spring side member 12 and the second spring side member 13 is set to a distance that permits the spring holding member 11 disposed between the first spring side member 12 and the second spring side member 13 to rotate relative to the first spring side member 12 and the second spring side member 13. Thus, the first spring side member 12 and second spring side member 13 (which provide the elastic-body side member) cooperate to define a space 15 that includes the spring receiving portions 12a, spring receiving portions 13a and spacing formed between the first spring side member 12 and the second spring side member 13. Namely, the spring holding member 11 and the first damper springs 14 are housed in the space 15. With the first spring side member 12 and the second spring side member 13 thus integrated by means of the fastening bolts 120, the axial distance between the first spring side member 12 and the second spring side member 13 is adjusted in the above manner, and a spacer(s), or the like, is/are not required, which leads to reduction of the number of components and reduction of the manufacturing cost.

In the condition in which the first spring side member 12 and the second spring side member 13 are fastened to the front cover 20 with the fastening bolts 120, the first spring side member 12 contacts the stress relaxation side member 101 over the enter circumference, and the second spring side member 13 contacts the front cover 20 over the entire circumference. With this arrangement, the space 15 is closed by the crankshaft 100 to which the stress relaxation side member 101 is fastened with the fastening members 110, and the front cover 20. Thus, the space 15 is able to hold lubricating oil (such as grease) supplied to the first damper springs 14, etc.

A seal member S1 is disposed between the first spring side member 12 and the stress relaxation side member 101, to provide a seal between the first spring side member 12 and the crankshaft 100 to which the stress relaxation side member 101 is fastened with the fastening members 110. Also, a seal member S2 is disposed between the second spring side member 13 and the front cover 20, to provide a seal between the second spring side member 13 and the front cover 20 that are integrated together by means of the fastening bolts 120. Accordingly, the space 15 is sealed by the sealing members S1, S2 against the outside thereof. With this arrangement, the lubricating oil in the space 15 is prevented from leaking to the outside, thus assuring improved durability. Also, with the arrangement in which the second spring side member 13 is fastened to the front cover 20 with the fastening bolts 120, the front cover 20 provides a sealing surface that seals the space 15 against the outside. Thus, the space 15 can be sealed with high reliability, and the number of components and the manufacturing cost can be reduced.

The driving force of the engine as a driving source, which is applied from the crankshaft 100 as the input member, is transmitted to the front cover 20. In this embodiment, the driving force of the engine applied from the crankshaft 100 via the pre-damper 10 is transmitted to the front cover 20. As shown in FIG. 1 and FIG. 2, the front cover 20 consists principally of a main body 21, a flange 22, and the above-mentioned set blocks 23. The main body 21 has a disc-like shape. The flange 22 protrudes toward the output side from a radially outer end portion of the main body 21. The set blocks 23 are connected to the crankshaft 100 via the pre-damper 10. The set blocks 23 are formed at two or more circumferential positions on the input side of the main body 21. Each of the set blocks 23 is fastened to the first spring side member 12 and second spring side member 13 with a corresponding one of the fastening bolts 120, as described above.

The fluid transmission mechanism 30, which is an example of the fluid transmission unit, transmits the driving force received from the front cover 20, from a pump to a turbine via a hydraulic fluid. As shown in FIG. 1 and FIG. 2, the fluid transmission mechanism 30 consists principally of a pump 31, a turbine 32, a stator 33, a one-way clutch 34 and hydraulic oil as a hydraulic fluid present between the pump 31 and the turbine 32. In the following description of this embodiment, "pressure" means the pressure of the hydraulic oil unless otherwise specified.

The driving force transmitted to the front cover 20 is transmitted to the pump 31, and then transmitted from the pump 31 to the turbine 32 via the hydraulic oil. The pump 31 has a pump shell 31b to which a plurality of pump blades 31a are fixed, and is fixed to the front cover 20 such that a radially outer end portion of the pump shell 31b is fixed by fixing means, such as welding, to an end portion (closer to the output shaft) of the flange 22 of the front cover 20. With this arrangement, the pump 31 rotates as a unit with the front cover 20, and the driving force transmitted to the front cover 20 is transmitted to the pump blades 31a.

The driving force is transmitted from the pump 31 to the turbine 32 via the hydraulic oil. The turbine 32 has a turbine shell 32b to which a plurality of turbine blades 32a that are opposed to the pump blades 31a in the axial direction are fixed. The turbine 32 is fixed to a support member 92 such that a radially inner end portion of the turbine shell 32b is fixed to the support member 92 with fixing means, such as rivets 91. The support member 92 is supported on a hub 93 via a bearing 35 such that the support member 92 is rotatable relative to the hub 93 and is slidable in the axial direction relative to the hub 93. Namely, the turbine 32 is movable in the axial direction.

The hub 93 is supported on the output shaft 200 as the output member, such that the turbine 32 and the output shaft 200 are rotatable as a unit, and such that the hub 93 is slidable in the axial direction relative, to the output shaft 200. For example, the hub 93 and the output shaft 200 are engaged with each other via splines formed on an inner circumferential surface of the hub 93 and an outer circumferential surface of the output shaft 200, respectively, so that the hub 93 and the output shaft 200 are rotatable as a unit and are slidable relative to each other in the axial direction. A seal member S3 that provides a seal between the support member 92 and the hub 93 is provided between the support member 92 and the hub 93. Also, seal members S4, S5 that provide seals between the hub 93 and the output shaft 200 are provided between the hub 93 and the output shaft 200, such that a region including the above-mentioned splines is interposed between the seal members S4, S5.

The stator 33 has a plurality of stator blades 33a formed in the circumferential direction, and is disposed between the pump 31 and the turbine 32 so as to change the flow of the hydraulic oil circulating between the pump 31 and the turbine 32 and thus provide a certain driving force characteristic based on the driving force transmitted from the engine. The stator 33 is fixed via the one-way clutch 34 to a housing 94 in which the fluid transmission device 1 is housed, by a suitable fixing means, for example, through engagement of splines formed on an inner circumferential surface of the one-way clutch 34 with splines formed on and an outer circumferential surface of the housing 94. The one-way clutch 34 supports the stator 33 such that the stator 33 is rotatable only in one direction relative to the housing 94. The one-way clutch 34 is supported in the axial direction with bearings 36, 37 interposed between the clutch 34 and the support member 92 and a sleeve 95, respectively, such that the clutch 34 is rotatable relative to the support member 92 and the sleeve 95.

As shown in FIG. 1 and FIG. 2, the piston member 40 transmits the driving force received from the front cover 20 to the output shaft 200 as the output member. The piston member 40 is disposed between the front cover 20 and the fluid transmission mechanism 30. The piston 40 is supported on the hub 93 such that the piston member 40 is rotatable as a unit with the hub 93 and is slidable in the axial direction relative to the hub 93. A plurality of piston-side protrusions 40a arranged in the circumferential direction are formed on an output-side side face of the piston member 40 close to the radially inner end thereof so as to protrude from the side face toward the output side, and a plurality of hub-side protrusions 93a arranged in the circumferential direction are formed on an input-side side face of the hub 93 at its positions opposed to the piston-side protrusions 40a in the axial direction so as to protrude from the side face toward the input side. The piston-side protrusions 40a are engaged with the hub-side protrusions 93a so that the piston member 40 and the hub 93 are rotatable as a unit and are slidable relative to each other in the axial direction. A seal member S6 that provides a seal between the piston member 40 and the hub 93 is disposed between the piston member 40 and the hub 93.

As shown in FIG. 2, the hub 93 is formed with a communication passage 93b having one end that is open to the inner circumferential surface thereof and the other end that is open to a region of the outer circumferential surface between the seal member S6 and the hub-side protrusions 93a. Also, the output member 200 has a partition member 201 inserted therein, and an input-side end portion of the output member 200 is closed by the partition member 201. A first passage 202 whose input-side axial end is released (i.e., open) and which is connected to the hydraulic control device 80 is formed within the partition member 201. Also, a second passage 203 whose input-side axial end is closed by the partition member 20a and which is connected to the hydraulic control device 80 is formed between the output member 200 and the partition member 201. Also, a communication passage 204 having one end connected to the second passage 203 and the other end that is open to a region of the outer circumferential surface of the output shaft 200 which includes the above-mentioned splines is formed through the output shaft 200. Furthermore, a third passage 96 whose one end is open to the vicinity of the stator 33 and which is connected to the hydraulic control device 80 is formed between the housing 94 and the sleeve 95.

The fluid transmission device 1 is formed with three PORTs connected to the hydraulic control device 80. PORT 1 is formed between the front cover 20 and the piston member 40, and is connected to the hydraulic control device 80 via the first passage 202. PORT 2 is formed between the piston member 40 and the turbine 32, and is connected to the hydraulic control device 80 via the communication passage 93b, communication passage 204 and the second passage 203. PORT 3 is formed between the turbine 32 and the pump 31, and is connected to the hydraulic control device 80 via the third passage 96. In operation, the hydraulic pressures in the PORTs 1-3 are controlled by the hydraulic control device 80.

As shown in FIG. 1 and FIG. 2, the lock-up clutch 50 permits the front cover 20 and the piston member 40 to be engaged with each other. The front cover 20 and the piston member 40 are engaged with each other by the lock-up clutch 50, through frictional engagement between a cover-side clutch face 21 formed on the front cover 20 and a first piston-side clutch face that is formed on the piston member 40 and is opposed to the cover-side clutch face 21a. The cover-side clutch face 21 is formed on a portion of the main body 21 of the front cover 20 which is opposed to the piston member 40 in the axial direction. The first piston-side clutch face is a friction surface of a friction plate 51 attached to a portion of the piston member 40 which is opposed to the cover-side clutch face 21a in the axial direction. Namely, the first piston-side clutch face is formed on the front-cover side, or input side, of the piston member 40. When the lock-up clutch 50 is in an engaged state, the cover-side clutch face 21a is engaged with the first piston-side clutch face. When the lock-up clutch 50 is in a release state, the cover-side clutch face 21a is spaced from the first piston-side clutch face. In operation, the piston member 40 moves in the axial direction relative to the front cover 20 according to the pressures in the PORT 1, PORT 2 and PORT 3, so that the lock-up clutch 50 is switched between the engaged state and the release state. Namely, the lock-up clutch 50 is controlled by the hydraulic control device 80. The lock-up clutch 50 is said to be in the engaged state when power can be transmitted between the front cover 20 and the piston member 40, and is said to be in the release state when power cannot be transmitted between these two members 20, 40. The engaged state of the lock-up clutch 50 includes a slipping state or partially engaged state in which there is a difference in the rotational speed between the front cover 20 and the piston member 40, and a fully engaged state in which there is no difference in the rotational speed between these members 20, 40.

The dynamic damper 60 is provided between the turbine 32 and the piston member 40. The dynamic damper 60 elastically supports the turbine 32 when the turbine clutch 70 is placed in a release state (which will be described later) by the hydraulic control device 80. The dynamic damper 60, which uses the turbine 32 as the inertial mass, suppresses the resonance in a particular rotational speed range of the engine as the driving source with a phase opposite to that of the resonance, thereby to damp vibrations corresponding to the particular rotational speed range. As shown in FIG. 1 and FIG. 2, the dynamic damper 60 consists principally of a spring side plate 61, a spring holding plate 62 and two or more second damper springs 63.

The piston member 40 is formed with spring receiving portions 40b each of which receives a part of each of the second damper springs 63 held by the spring holding plate 62. Also, the piston member 40 is formed with driving force transmitting portions that can contact the opposite end portions of the second damper springs 63 held by the spring holding plate 62.

The spring side plate 61, which has an annular shape, is positioned to be opposed to the piston member 40 via the spring holding plate 62. The spring side plate 61 is formed with spring receiving portions 61a each of which receives a part of each of the second damper springs 63 held by the spring holding plate 62. Also, the spring side plate 61 is formed with driving force transmitting portions that can contact the opposite end portions of the second damper springs 63 held by the spring holding plate 62. The spring side plate 61 is integrated with the piston member 40 by a suitable coupling means, such as knock-pins 64. Also, sleeves 65 are provided between the piston member 40 and the spring side plate 61 that are integrated together. The sleeves 65, each having a cylindrical shape, are fitted on the knock-pins 64 so as to keep an appropriate spacing or distance between the piston member 40 and the spring side plate 61. Namely, the sleeves 65 serve to define the axial positions of the piston member 40 and spring side plate 61 relative to each other.

The spring holding plate 62, which has an annular shape, is disposed between the piston member 40 and the spring side plate 61. The spring holding plate 62 holds the two or more second damper springs 63. The spring holding plate 62 is formed with spring holding portions 62a, sleeve slide portions 62b, and plate-side protrusions 62c.

The spring holding portions 62a are formed at two or more circumferentially spaced positions of the spring holding plate 62, and each of the spring holding portions 62a is in the form of an arc-like slot formed in a radially middle portion of the spring holding plate 62. Each of the second damper springs 63 is held or received in a corresponding one of the spring holding portions 62a, and the opposite end portions of the second damper spring 63 are in contact with the spring holding plate 62.

The sleeve slide portions 62b are formed at two or more circumferentially spaced positions of the spring holding plate 62, and each of the sleeve slide portions 62b is in the form of an arc-like slot formed in a radially outer portion of the spring holding plate 62. Each sleeve slide portion 62b allows a corresponding one of the sleeves 65 to slide in the circumferential direction relative to the spring holding plate 62. Namely, the piston member 40 and the spring side plate 61 that are integrated together with the knock pins 64 are rotatable relative to the spring holding plate 62.

The plate-side protrusions 62c are formed at two or more circumferentially spaced positions on a radially inner end portion of the spring holding plate 62 so as to protrude from the radially inner end portion toward the output side. In the meantime, a connecting member 66 is disposed at the radially inner side of the spring holding plate 62. The connecting member 66 connects the spring holding plate 62 with the turbine 32. The connecting member 66 is fixed, along with the turbine 32, to the support member 92, with a suitable fixing means, such as rivets 91 inserted through a radially inner end portion of the connecting member 66. The connecting member 66 is formed with two or more connecting-member-side protrusions 66a that protrude from a radially outer end portion of the connecting member 66 toward the input side. The connecting-member-side protrusions 66a are opposed to the plate-side protrusions 62c in the axial direction, and are formed at two or more circumferentially spaced positions on the radially outer end portion of the connecting member 66. The plate-side protrusions 62c are engaged with the connecting-member-side protrusions 66a such that the spring holding plate 62 and the connecting member 66 are rotatable as a unit and are movable relative to each other in the axial direction. Namely, the turbine 32 and the piston member 40 are connected via the dynamic damper 60 so as to be rotatable relative to each other and are movable relative to each other in the axial direction.

The second damper springs 63 constitute an example of the second elastic body, and each of the second damper springs 63 is in the form of a coil spring. The second damper springs 63 elastically support the turbine 32 when the hydraulic control device 80 places the turbine clutch 70 in a release state (which will be described later). When the turbine clutch 70 is placed in the release state by the hydraulic control device 80, the turbine 32 is connected to the piston member 40 via the connecting member 66, spring holding plate 62 and the second damper springs 63. The driving force is transmitted from the front cover 20 to the piston member 40 directly or via the fluid transmission mechanism 30. Namely, when the hydraulic control device 80 places the turbine clutch 70 in the release state (which will be described later), the dynamic damper 60 located on a power transmission path as a transmission path of the driving force operates to elastically support the turbine 32, using the turbine 32 as the inertial mass in a condition where the driving force is transmitted via the piston member 40. Accordingly, the dynamic damper 60, which elastically supports the turbine 32, is able to suppress vibrations in a particular rotational speed range of the engine with a phase opposite to that of the vibrations. Here, the particular rotational speed range of the engine is set to a rotational speed range in which the engine speed is around 1000 rpm, for example, and the dynamic damper 60 is configured to suppress vibrations in the particular rotational speed range of the engine with the opposite phase. Also, the use of the turbine 32 as the inertial mass makes it possible to extend the range of setting (of the spring constant, etc.) of the second damper springs 63 for suppressing the vibrations in the particular rotational speed range of the engine.

As shown in FIG. 1 and FIG. 2, the turbine clutch 70 allows the turbine 32 and the piston member 40 to be engaged with each other. The turbine clutch 70 brings the turbine 32 and the piston member 40 into engagement, through frictional engagement between a turbine-side clutch face formed on the turbine 32 and a second piston-side clutch face that is formed on the piston member 40 and is opposed to the turbine-side clutch face. In this embodiment, the turbine-side clutch face is a turbine-side inclined clutch face 32c that is formed on the turbine 32 to be inclined from the radially outer side to the radially inner side in an axial direction from the output side to the input side. The second piston-side clutch face is a piston-side inclined clutch face 40c that is formed on a radially outer portion of the piston member 40 so as to be opposed to the turbine-side inclined clutch face 32c and inclined from the radially outer side to the radially inner side in the axial direction from the output side to the input side. Namely, the turbine clutch 70 is a swash plate clutch that permits frictional engagement between the turbine-side inclined clutch face 32c and the piston-side inclined clutch face 40c. Namely, the second piston-side clutch face is formed at the turbine side, or the output side, of the piston member 40. In operation, the relative distance between the turbine 32 and the piston member 40 as measured in the axial direction is changed in accordance with the respective pressures of the PORT 1, PORT 2 and PORT 3, so that the turbine clutch 70 is switched between the engaged state and the release state. Namely, the turbine clutch 70 is controlled by the hydraulic control device 80. Here, the turbine clutch 70 is said to be in the engaged state when power can be directly transmitted between the turbine 32 and the piston member 40, and is said to be in the release state when power cannot be directly transmitted between these two members 32, 40. In other words, the turbine-side clutch face and the second piston-side clutch face are engaged with each other when the turbine clutch 70 is in the engaged state, and the turbine-side clutch face and the second piston-side clutch face are spaced from each other when the turbine clutch 70 is in the release state.

As described above, the friction surface of the friction plate 51 as the first piston-side clutch face that constitutes the lock-up clutch 50 and the piston-side inclined clutch face 40c as the second piston-side clutch face that constitutes the turbine clutch 70 are formed on the piston member 40. Namely, the clutch faces that form the lock-up clutch 50 and the turbine clutch 70 are formed on the piston member as a single member. Accordingly, four members need not be provided for forming four clutch faces that provide two clutches. Also, when the lock-up clutch 50 and the turbine clutch 70 are in the engaged states, the front cover 20, piston member 40 and the turbine 32 are integrated together, resulting in reduction of the size. Thus, the arrangement of the lock-up clutch 50 and the turbine clutch 70 as described above assures reduction of the number of components, reduced cost, reduced size and reduced weight.

When the turbine clutch 70 in the form of a swash plate is in the engaged state, large frictional engagement force can be produced due to a wedge effect. Also, the piston-side inclined clutch face 40c is located radially outwardly of the turbine-side clutch inclined surface 32c; therefore, when the pressure in the PORT 2 increases upon switching of the PORT 2 from an OFF state to an ON state (as will be described later), the pressure in PORT 2 is applied to the radially outer portion of the piston member 40, so that the turbine-side inclined clutch face 32c and the piston-side inclined clutch face 40c that are in frictional engagement are easily moved away or separated from each other. As a result, the turbine clutch 70 can be easily switched from the engaged state to the release state, namely, the clutch release of the turbine clutch 70 is accomplished with improved easiness or efficiency. Also, when the turbine clutch 70 is in the engaged state, the piston member 40 is less likely to deform in the axial direction, thus assuring improved controllability when the lock-up clutch 50 is in a slipping or partially engaged state.

The hydraulic control device 80, which is one example of the clutch control device of the invention, controls the lock-up clutch 50 and the turbine clutch 70. The hydraulic control device 80 places the lock-up clutch 50 in a selected one of the engaged state (fully engaged state or partially engaged (slipping) state) and the release state, and places the turbine clutch 70 in a selected one of the engaged state (fully engaged state or partially engaged (slipping) state) and the release state. The hydraulic control device 80 controls the respective pressures in the PORT 1, PORT 2 and PORT 3. As shown in FIG. 3, the hydraulic control device 80 consists principally of an oil tank 81, an oil pump 82, a first switching valve 83, a second switching valve 84, a third switching valve 85, a first control valve 86, a second control valve 87, and channels that connect these components and the PORTs 1-3.

The oil tank 81 stores the hydraulic oil that is to be supplied to the fluid transmission device 1 and has been discharged from the fluid transmission device 1.

The oil pump 82 is operable to apply pressure to the hydraulic oil stored in the oil tank 81. The oil pump 82 operates under the driving force of the engine (not shown), for example, to suck up, pressurize and deliver the hydraulic oil stored in the oil tank 81. The pressurized hydraulic oil is delivered from the oil tank 81 into a first channel L1 via a pressure regulator (not shown). The first channel L1 is connected to a second channel L2 connected to the first switching valve 83, a third channel L3 connected to the second switching valve 84, and a fourth channel L4 connected to the third switching valve 85. With this arrangement, the pressurized and delivered hydraulic oil is supplied to the first switching valve 83, second switching valve 84 and the third switching valve 85. The pressure regulator returns a part of the hydraulic oil present downstream of the pressure regulator back to the oil tank 81 when the pressure measured at the downstream side of the pressure regulator becomes equal to or higher than a predetermined pressure level.

The first switching valve 83, which is one example of the port controller of the invention, is operable to change connections among the PORT 1, the oil tank 81 and the oil pump 82. The first switching valve 83 is connected to the second channel L2, and is also connected to the PORT 1 via a fifth channel L5 and connected to the oil tank 81 via a sixth channel L6 and a seventh channel L7. Namely, the first switching valve 83 is connected to the PORT 1, oil tank 81 and the oil pump 82. The first switching valve 83 is connected to the ECU 90 so that the ON/OFF position of the valve 83 is controlled by the ECU 90. When the first switching valve 83 is placed in the ON position under ON control of the ECU 90, the second channel L2 and the fifth channel L5 are connected to each other, to establish a supply state in which the oil pump 82 communicates with the PORT 1 and the hydraulic oil is supplied to PORT 1. When the first switching valve 83 is placed in the OFF position under OFF control of the ECU 90, the fifth channel L5 and the sixth channel L6 are connected to each other, to establish a discharge state in which the PORT 1 communicates with the oil tank 81 and the hydraulic oil is discharged from the PORT 1 into the oil tank 81. Namely, the hydraulic control device 80 controls the first switching valve 83 to bring the PORT 1 into the supply state or the discharge state.

The second switching valve 84, which is one example of the port controller of the invention, is operable to change connections among the PORT 2, the oil tank 81 and the oil pump 82. The second switching valve 84 is connected to the third channel L3, and is also connected to the PORT 2 via an eighth channel L8 and connected to the oil tank 81 via a ninth channel L9 and the seventh channel L7. Namely, the second switching valve 84 is connected to the PORT 2, oil tank 81 and the oil pump 82. The second switching valve 84 is connected to the ECU 90 so that the ON/OFF position of the valve 84 is controlled by the ECU 90. When the second switching valve 84 is placed in the ON position under ON control of the ECU 90, the third channel L3 and the eighth channel L8 are connected to each other, to establish a supply state in which the oil pump 82 communicates with the PORT 2 and the hydraulic oil is supplied to the PORT 2. When the second switching valve 84 is placed in the OFF position under OFF control of the ECU 90, the eighth channel L8 and the ninth channel L9 are connected to each other, to establish a discharge state in which the PORT 2 communicates with the oil tank 81 and the hydraulic oil is discharged from the PORT 2 into the oil tank 81. Namely, the hydraulic control device 80 controls the second switching valve 84 so as to bring the PORT 2 into the supply state or the discharge state.

The third switching valve 85, which is one example of the port controller of the invention, is operable to change connections among the PORT 3, the oil tank 81 and the oil pump 82. The third switching valve 85 is connected to the fourth channel and is also connected to the PORT 3 via a tenth channel L10 and connected to the oil tank 81 via an eleventh channel L11 and the seventh channel L7. Namely, the third switching valve 85 is connected to the PORT 3, oil tank 81 and the oil pump 82. The third switching valve 85 is connected to the ECU 90 so that the ON/OFF position of the valve 85 is controlled by the ECU 90. When the third switching valve 85 is placed in the ON position under ON control of the ECU 90, the fourth channel LA and the tenth channel L10 are connected to each other, to establish a supply state in which the oil pump 82 communicates with the PORT 3 and the hydraulic oil is supplied to the PORT 3. When the third switching valve 85 is placed in the OFF position under OFF control of the ECU 90, the tenth channel L10 and the eleventh channel L11 are connected to each other, to establish a discharge state in which the PORT 3 communicates with the oil tank 81 and the hydraulic oil is discharged from the PORT 3 into the oil tank 81. Namely, the hydraulic control device 80 controls the third switching valve 85 so as to bring the PORT 3 into the supply state or the discharge state.

The first control valve 86, which is one example of the slip amount controller of the invention; is operable to control or switch the lock-up clutch 50 from the engaged state to the partially engaged (slipping) state or the fully engaged state. The first control valve 86 controls the flow rate of the hydraulic oil flowing into or out of the PORT 11n this embodiment, when the PORT 3 is in the discharge state, the first control valve 86 controls the discharge flow rate in the discharge state as the flow rate of the hydraulic oil discharged from the PORT 3. Namely, the first control valve 86 controls the pressure in the PORT 3 when it is in the discharge state. The first control valve 86 is provided at some point in the eleventh channel L11. The first control valve 86 is connected to the ECU 90, and is controlled by the ECU 90. When the first control valve 86 is placed in the ON position under control of the ECU 90, the first control valve 86 is brought into a controlling state for controlling the discharge flow rate in the discharge state so as to control the pressure in the PORT 3. When the first control valve 86 is placed in the OFF position, the valve 86 is brought into a non-controlling state in which the discharge flow rate in the discharge state is not controlled but is maximized.

The second control valve 87, which is one example of the slip amount controller of the invention, is operable to control or switch the lock-up clutch 50 from the engaged state to the partially engaged (slipping) state or the fully engaged state. The second control valve 87 controls the flow rate of the hydraulic oil flowing into or out of the PORT 3. In this embodiment, when the PORT 3 is in the supply state, namely, when the hydraulic oil is supplied to the PORT 3, the second control valve 87 controls the supply flow rate of the hydraulic oil supplied to the PORT 3. Namely, the second control valve 87 controls the pressure in the PORT 3 when it is in the supply state. The second control valve 87 is provided at some point in a twelfth channel 12 that connects the tenth channel L10 with the seventh channel L7. The second control valve 87 is connected to the ECU 90, and is controlled by the ECU 90. When the second control valve 87 is placed in the ON position under control of the ECU 90, the second control valve 87 controls the discharge flow rate in the supply state as the flow rate of the hydraulic oil discharged into the oil tank 81 via the twelfth channel 12. Thus, the second control valve 87 is brought into a controlling state for controlling the supply flow rate by controlling the discharge flow rate in the supply state so as to control the pressure in the PORT 3. When the second control valve 87 is placed in the OFF position, the valve 87 is brought into a non-controlling state in which the discharge flow rate in the supply state is not controlled but made equal to zero, so that the supply flow rate is maximized.

The ECU 90 is an electronic control unit that controls the operation of the fluid transmission device 1 by controlling the hydraulic control device 80. The ECU 90 performs ON/OFF control of the first switching valve 83, ON/OFF control of the second switching valve 84, ON/OFF control of the third switching valve 85, driving control of the first control valve 86 and driving control of the second control valve 98. More specifically, the ECU 90 controls the first switching valve 83 for switching of the PORT 1 between the supply state and the discharge state, controls the second switching valve 84 for switching of the PORT 2 between the supply state and the discharge state, controls the third switching valve 85 for switching of the PORT 3 between the supply state and the discharge state, controls the first control valve 86 for control of the discharge flow rate in the discharge state of the PORT 3, and controls the second control valve 87 for control of the supply flow rate of the PORT 3. Namely, the ECU 90 controls the operation of the hydraulic control device 80 so as to effect switching of the lock-up clutch 50 between the engaged state and the release state and switching of the turbine clutch 70 between the engaged state and the release state.

The ECU 90 operates the fluid transmission device 1 in a selected one of six operating modes by means of the hydraulic control device 80. The six operating modes include a first operating mode (converter mode), second operating mode (lock-up clutch ON, dynamic damper ON), third operating mode (lock-up clutch ON, dynamic damper OFF), fourth operating mode (free mode), fifth operating mode (lock-up clutch ON (slipping), dynamic damper ON), and a sixth operating mode (lock-up clutch ON (slipping), dynamic damper OFF). FIG. 4 through FIG. 12 are views useful for explaining the operating modes. In the following description, the lock-up clutch 50 may be referred to as "L/U", and the dynamic damper 60 may be referred to as "D/D".

Figure 4:
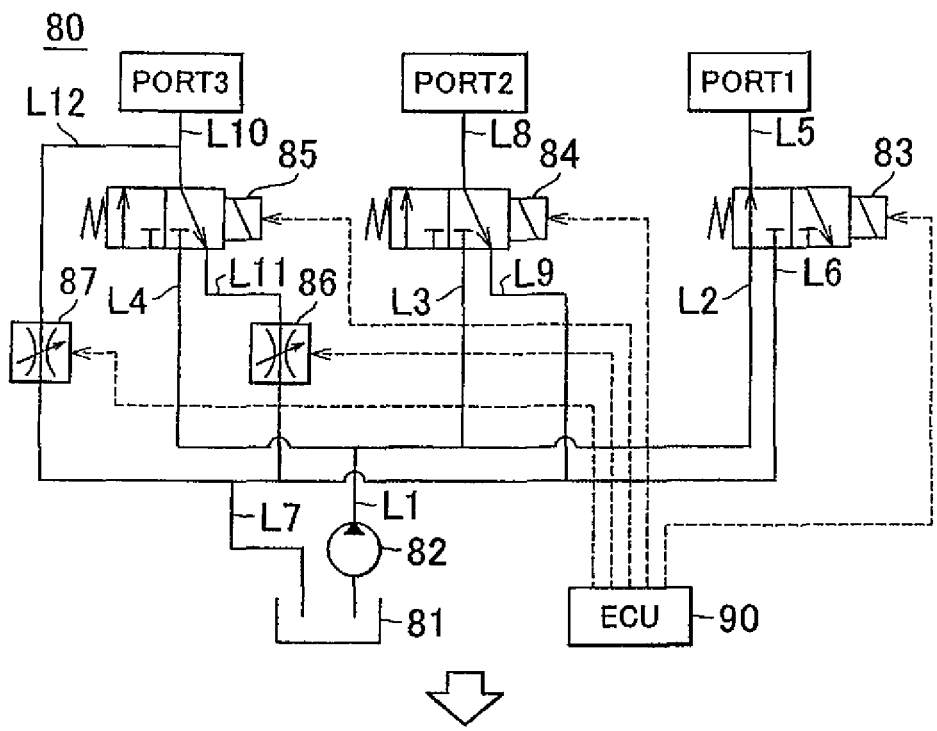
FIG. 4 is a view useful for explaining a first operating mode of the fluid transmission device of FIG. 1 and FIG. 2.
Figure 5:
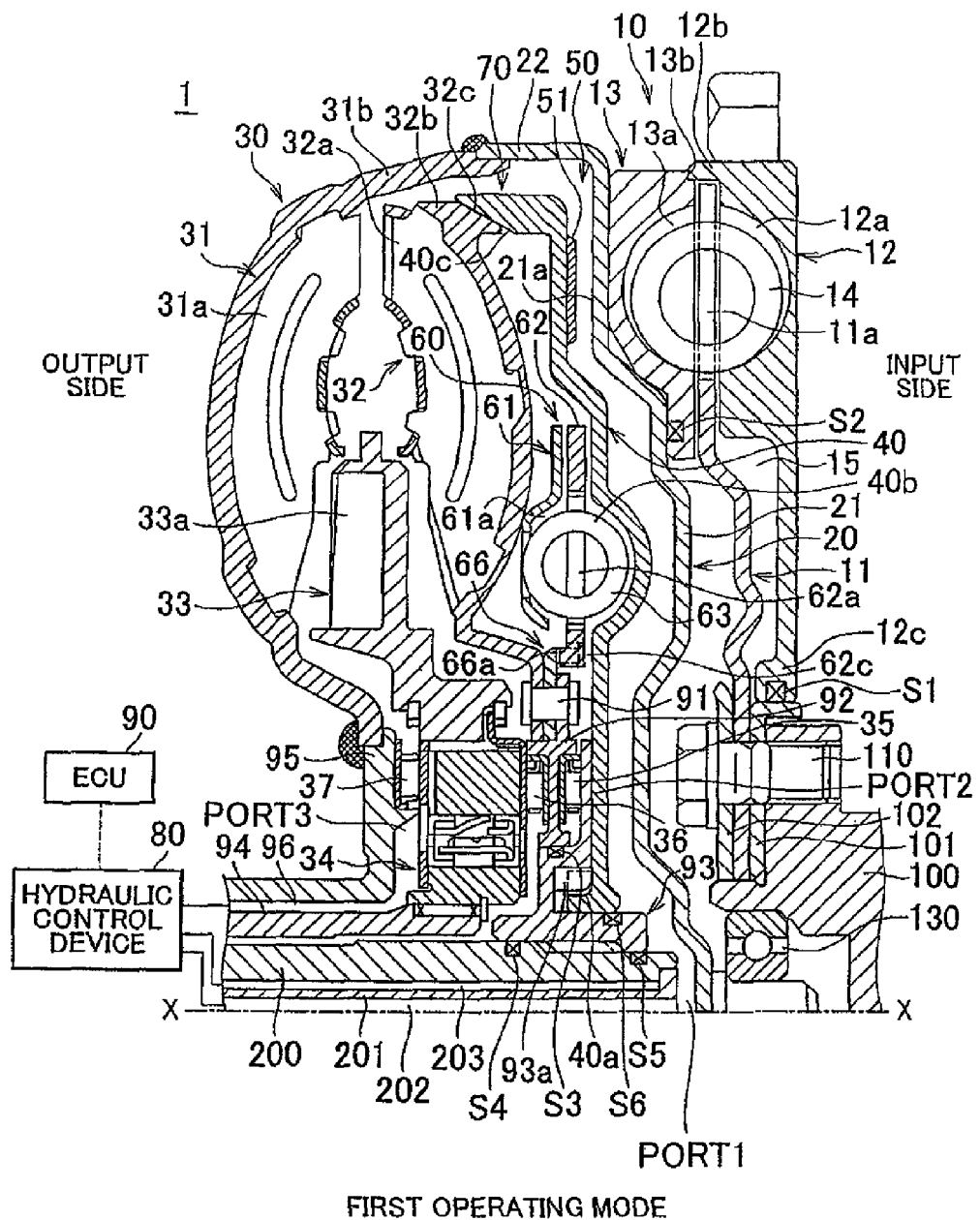
FIG. 5 is a view useful for explaining the first operating mode.

The first operating mode (converter mode) is a fluid transmission mode in which the driving force is transmitted to the output shaft 200 via the fluid transmission mechanism 30. To establish the first operating mode, the ECU 90 controls the first switching valve 83 to the ON position, controls the second switching valve 84 to the OFF position, controls the third switching valve 85 to the OFF position, controls the first control valve 86 to the OFF position, and controls the second control valve 87 to the OFF position, as shown in FIG. 4. Namely, in the first operating mode, the hydraulic control device 80 brings the PORT 1 into the supply state, brings the PORT 2 into the discharge state, and brings the PORT 3 into the discharge state. As a result, in the first operating mode, the piston member 40 moves to the output side in the axial direction, as shown in FIG. 5 due to a difference in pressure between the PORT 1 and the PORT 2, namely, due to a pressure difference between the input side and output side of the piston member 40, so that the turbine-side inclined clutch face 32*c* is brought into frictional engagement with the piston-side inclined clutch face 40*c*, and the turbine clutch 70 is placed in the engaged state. Also, in the first operating mode in which PORT 1 is in the supply state, the hydraulic oil is supplied from between the front cover 20 and the piston member 40, and the lock-up clutch 50 is placed in the release state. Thus, in the first operating mode, the lock-up clutch 50 is placed in the OFF state, and the dynamic damper 60 is placed in the OFF state. In the first operating mode in which the first control valve 86 is OFF, i.e., in the non-controlling state, the flow rate of the hydraulic oil discharged from the PORT 3 that is in the discharge state is not controlled. In the first operating mode, the hydraulic oil supplied to the PORT 1 passes a spacing between the flange 22 of the front cover 20 and a radially outer end portion of the piston member 40, and flows into the PORT 3, to be discharged from the PORT 3 to the hydraulic control device 80. In the first operating mode, therefore, the hydraulic oil can transfer heat generated in the fluid transmission mechanism 30, to the outside of the fluid transmission mechanism 30.

In the above-described first operating mode (converter mode) in which the lock-up clutch 50 is OFF, as shown in FIG. 5, the driving force of the engine (not shown) is transmitted to the output shaft 200 via the pre-damper 10, front cover 20, pump 31, hydraulic oil, turbine 32, turbine clutch 70, piston member 40 and the hub 93. Namely, in the first operating mode, the driving force is transmitted to the output shaft 200 via the fluid transmission mechanism 30.

Figure 6:
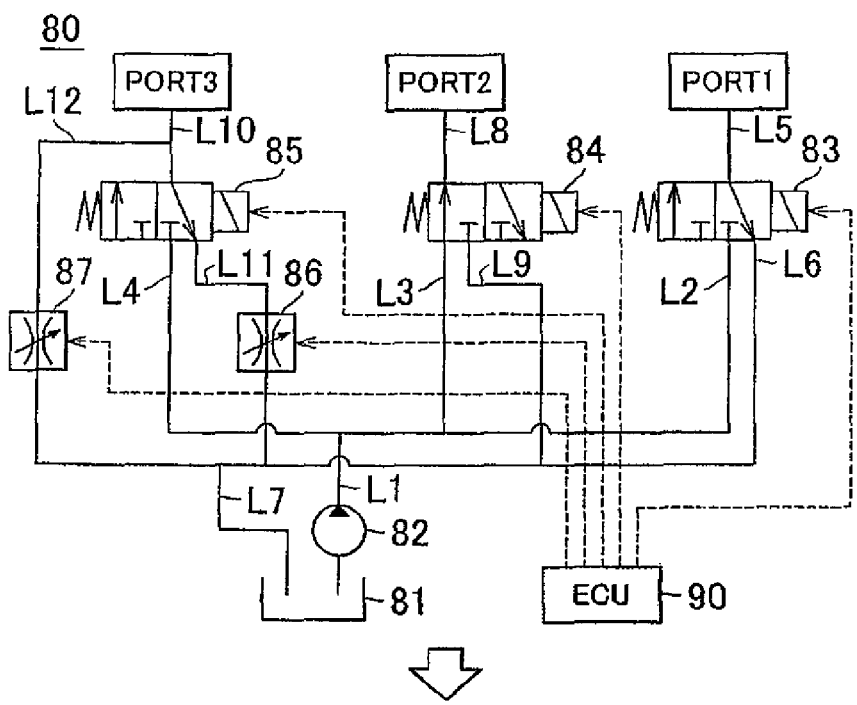
FIG. 6 is a view useful for explaining a second operating mode of the fluid transmission device of FIG. 1 and FIG. 2.
Figure 7:
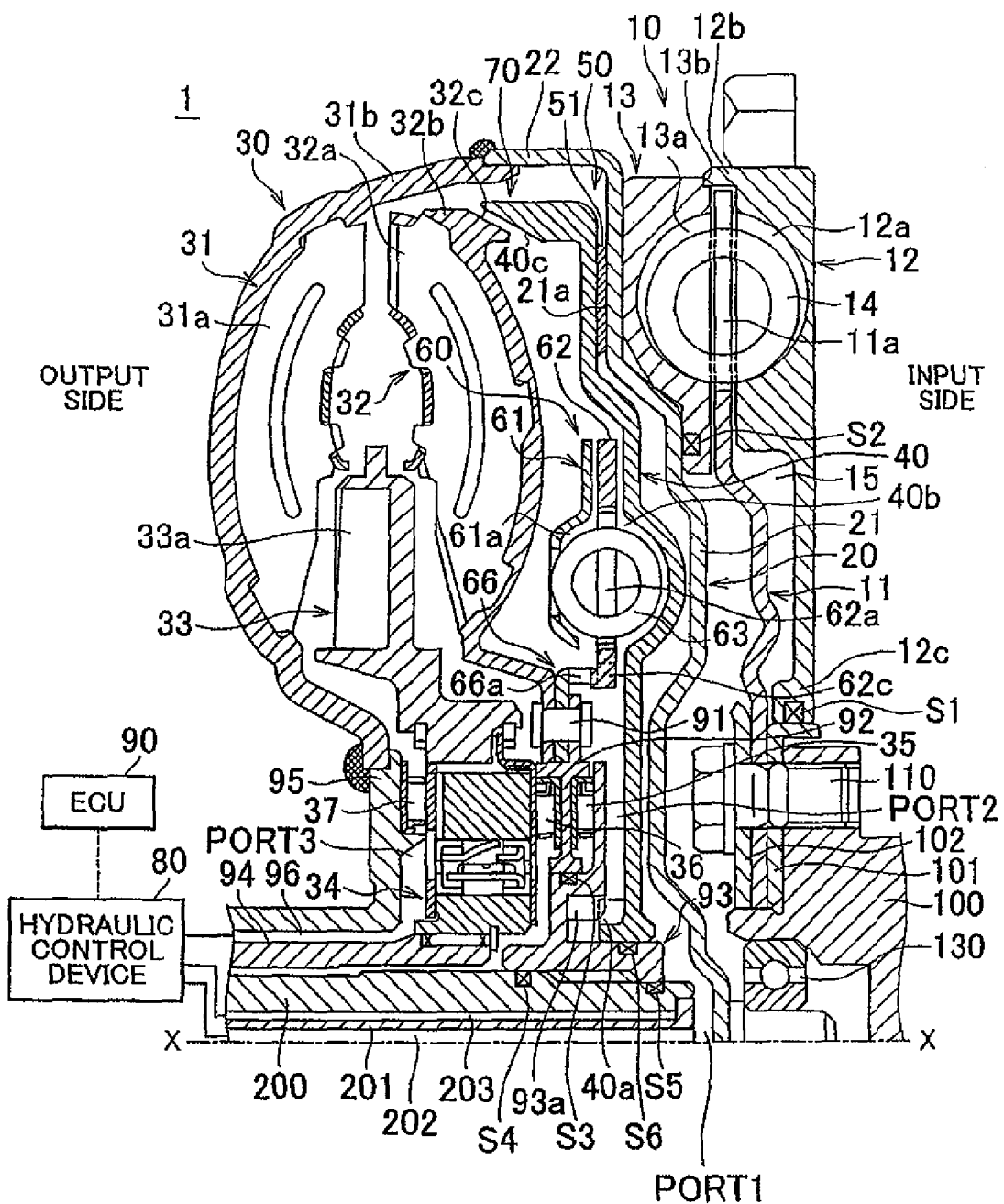
FIG. 7 is a view useful for explaining the second operating mode and a fifth operating mode.

The second operating mode (L/U=ON, D/D=ON) is a damper operating, direct transmission mode in which the driving force is directly transmitted to the output shaft 200 while the dynamic damper 60 is in the operating state. To establish the second operating mode, the ECU 90 controls the first switching valve 83 to the OFF position, controls the second switching valve 84 to the ON position, controls the third switching valve 85 to the OFF position, controls the first control valve 86 to the ON position, and controls the second control valve 87 to the OFF position, as shown in FIG. 6. Namely, in the second operating mode, the hydraulic control device 80 brings the PORT 1 into the discharge state, brings the PORT 2 into the supply state, and brings the PORT 3 into the discharge state. As a result, in the second operating mode, the piston member 40 moves to the input side in the axial direction, as shown in FIG. 7, due to a pressure difference between the PORT 2 and the PORT 1, namely, due to a pressure difference between the output side and input side of the piston member 40, so that the cover-side clutch face 21*a* is brought into frictional engagement with the friction surface of the friction plate 51, and the lock-up clutch 50 is placed in the engaged state. Also, in the second operating mode in which the PORT 2 is in the supply state, the hydraulic oil is supplied from between the turbine 32 and the piston member 40, and the turbine clutch 70 is placed in the release state. Thus, in the second operating mode, the lock-up clutch 50 is placed in the ON state, and the dynamic damper 60 is in placed in the operating, or ON state, as shown in FIG. 6. In the second operating mode in which the first control valve 86 is ON, i.e., in the controlling state, the flow rate of the hydraulic oil discharged from the PORT 3 that is in the discharge state is controlled. The ECU 90 operates the first control valve 86 to control the flow rate of the hydraulic oil discharged from the PORT 3 in the discharge state, namely, the pressure in the PORT 3, so that the pressure in the PORT 2 becomes equal to or higher than the pressure in the PORT 3. In the second operating mode, therefore, the lock-up clutch 50 is placed in the fully engaged state in which there is no difference in the rotational speed between the front cover 20 and the piston member 40.

In the above-described second operating mode (L/U=ON, D/D=ON) in which the lock-up clutch 50 is ON, the driving force of the engine (not shown) is transmitted to the output shaft 200 via the pre-damper 10, front cover 20, lock-up clutch 50, piston member 40 and the hub 93, as shown in FIG. 7. Namely, in the second operating mode, the driving force is directly transmitted to the output shaft 200 without passing the fluid transmission mechanism 30.

Also, in the above-described second operating mode in which the dynamic damper 60 is ON, the turbine 32 is elastically supported by the dynamic damper 60, and vibrations corresponding to the engine speed are transmitted to the pre-damper 10, front cover 20, lock-up clutch 50, piston member 40, dynamic damper 60 and the turbine 32. Accordingly, when the engine speed is in a particular rotational speed range, the dynamic damper 60 is placed in the ON state so as to suppress the resonance in the particular rotational speed range of the engine with the opposite phase. Thus, the dynamic damper 60 is placed in the ON state when the engine speed is in the particular rotational speed range, so as to damp vibrations corresponding to the engine speed that is within the particular rotational speed range.

Figure 8:
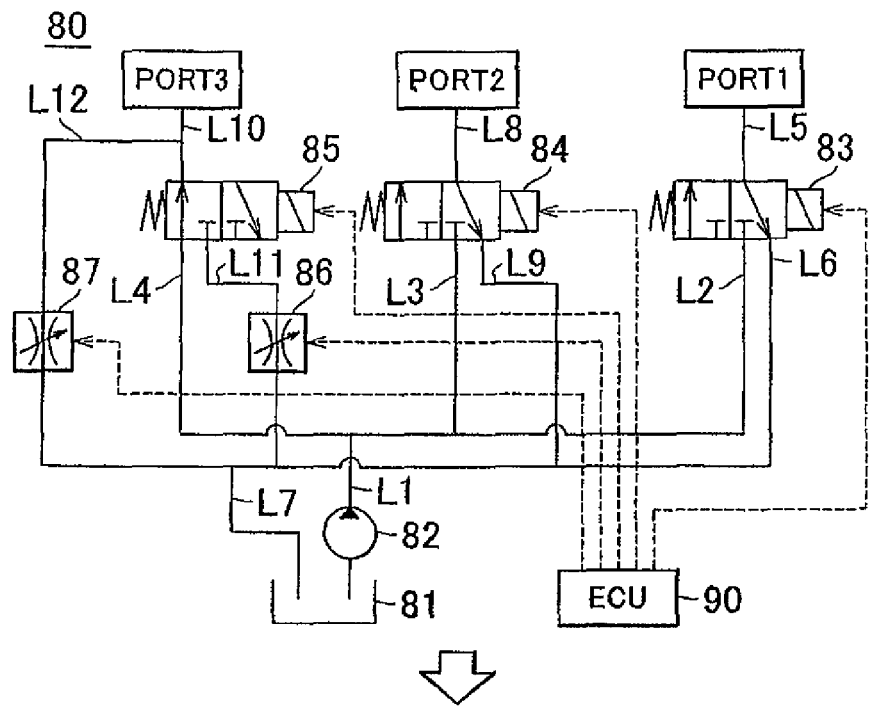
FIG. 8 is a view useful for explaining a third operating mode of the fluid transmission device of FIG. 1 and FIG. 2.
Figure 9:
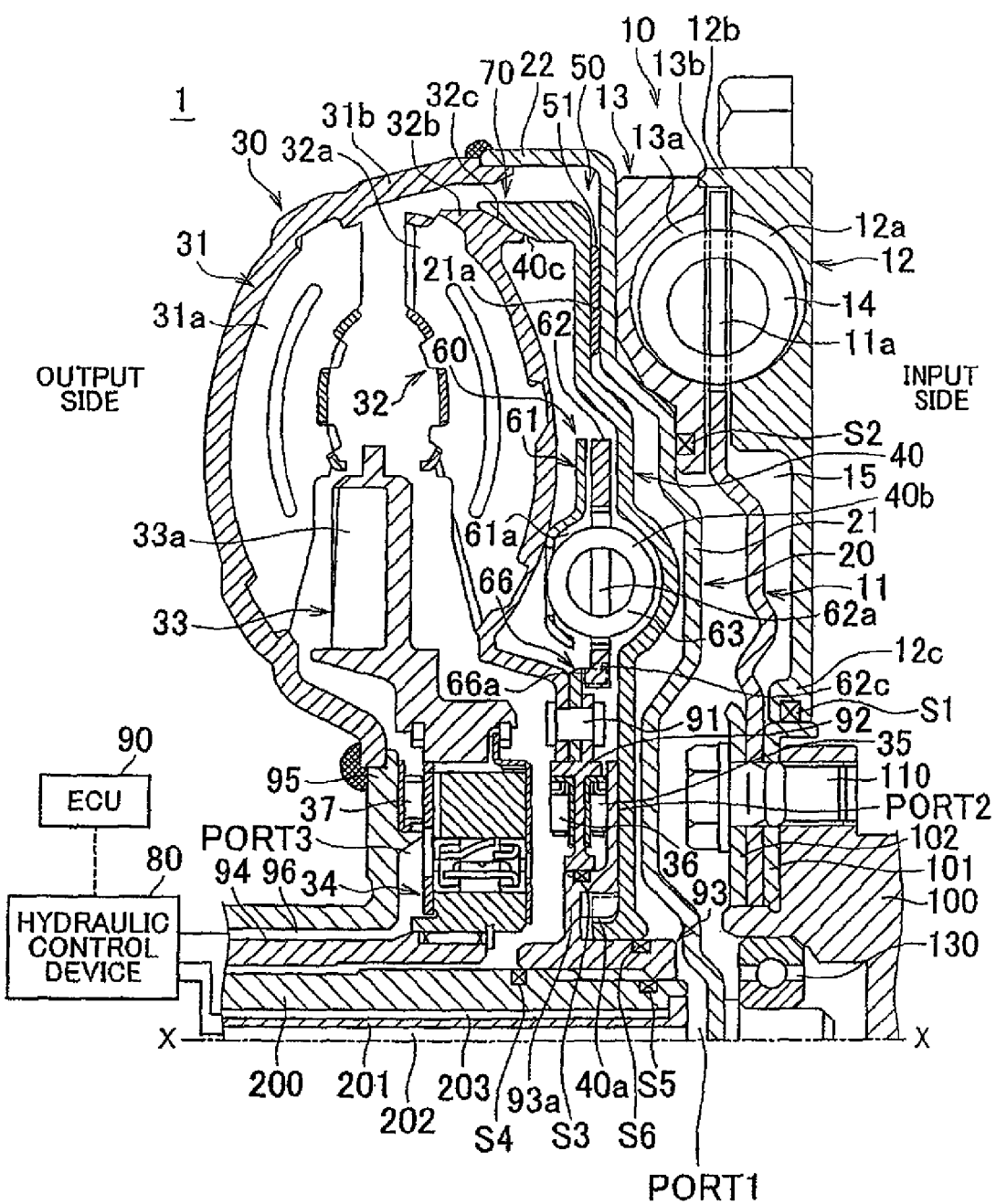
FIG. 9 is a view useful for explaining the third operating mode and a sixth operating mode.

The third operating mode (L/U=ON, D/D=OFF) is a damper non-operating, direct transmission mode in which the driving force is directly transmitted to the output shaft 200 while the dynamic damper 60 is in the non-operating state. To establish the third operating mode, the ECU 90 controls the first switching valve 83 to the on position, controls the second switching valve 84 to the OFF position, controls the third switching valve 85 to the ON position, controls the first control valve 86 to the OFF position and controls the second control valve 87 to the OFF position, as shown in FIG. 8. Namely, in the third operating mode, the hydraulic control device 80 brings the PORT 1 into the discharge state, brings the PORT 2 into the discharge state, and brings the PORT 3 into the supply state. Thus, in the third operating mode, the turbine 32 and the piston member 40 move to the input side in the axial direction, as shown in FIG. 9, due to pressure differences among PORT 3, PORT 2 and PORT 1, namely, pressure differences among the output side of the turbine 32, the output side of the piston member 40 and the input side of the piston member 40. As a result, the turbine-side inclined clutch face 32c is brought into frictional engagement with the piston-side inclined clutch face 40c, while the cover-side clutch face 21a is brought into frictional engagement with the friction surface of the friction plate 50, so that the lock-up clutch 50 and the turbine clutch 70 are both placed in the engaged states. Thus, in the third operating mode, the lock-up clutch 50 is placed in the ON state, and the dynamic damper 60 is in the non-operating, or OFF state, as shown in FIG. 8. In the third operating mode in which the second control valve 87 is OFF, i.e., in the non-controlling state, the flow rate of the hydraulic oil supplied to the PORT 3 that is in the supply state is not controlled.

In the above-described third operating mode (L/U=ON, D/D=OFF) in which the lock-up clutch 50 is ON, the driving force of the engine (not shown) is transmitted to the output shaft 200 via the pre-damper 10, front cover 20, lock-up clutch 50, piston member 40 and the hub 93, as shown in FIG. 9. Namely, in the third operating mode, the driving force is directly transmitted to the output shaft 200 without passing the fluid transmission mechanism 30.

Also, in the above-described third operating mode in which the dynamic damper 60 is OFF, the turbine 32 is not elastically supported by the dynamic damper 60. Accordingly, the dynamic damper 60 is placed in the OFF state when the engine speed is not within the particular rotational speed range, in other words, when the engine speed is within a rotational speed range in which vibrations become worse due to the operation of the dynamic damper 60. Thus, the vibrations are prevented from becoming worse due to the operation of the dynamic damper 60 when the engine speed is in a rotational speed range outside the particular rotational speed range of the engine. Namely, the dynamic damper 60 can operate only when vibrations corresponding to the particular rotational speed range of the engine are to be damped.

To establish the fourth operating mode (free operating mode) in a first method, the ECU 90 controls the first switching valve 83 to the ON position, controls the second switching valve 84 to the ON position, controls the third switching valve 85 to the ON position, controls the first control valve 86 to the OFF position, and controls the second control valve 87 to the OFF position, as shown in FIG. 10. In a second method, the ECU 90 controls the first switching valve 83 to the OFF position, controls the second switching valve 84 to the OFF position, controls the third switching valve 85 to the OFF position, controls the first control valve 86 to the OFF position, and controls the second control valve 87 to the OFF position. In a third method, the ECU 90 controls the first switching valve 83 to the ON position; controls the second switching valve 84 to the ON position, controls the third switching valve 85 to the OFF position, controls the first control valve 86 to the OFF position, and controls the second control valve 87 to the OFF position. Namely, in the fourth operating mode established in the first method, the hydraulic control device 80 brings the PORT 1 into the supply state, brings the PORT 2 into the supply state, and brings the PORT 3 into the supply state. In the second method, the hydraulic control device 80 brings the PORT 1 into the discharge state, brings the PORT 2 into the discharge state, and brings the PORT 3 into the discharge state. In the third method, the hydraulic control device 80 brings the PORT 1 into the supply state, brings the PORT 2 into the supply state, and brings the PORT 3 into the discharge state. In the fourth operating mode, therefore, the lock-up clutch 50 and the turbine clutch 70 are both placed in the release state. As a result, in the fourth operating mode, the lock-up clutch 50 is placed in the OFF state, and the dynamic damper 60 is placed in the ON state.

In the above-described fourth operating mode (free operating mode) in which the lock-up clutch 50 is OFF and the dynamic damper 60 is ON, the driving force of the engine (not shown) is transmitted to the output shaft 20 via the pre-damper 10, front cover 20, pump 31, hydraulic oil, turbine 32, dynamic damper 60, piston member 40 and the hub 93, as shown in FIG. 1. Namely, in the fourth operating mode, the driving force is transmitted to the output shaft 20 via the fluid transmission mechanism 30 and the dynamic damper 60.

Figure 11:
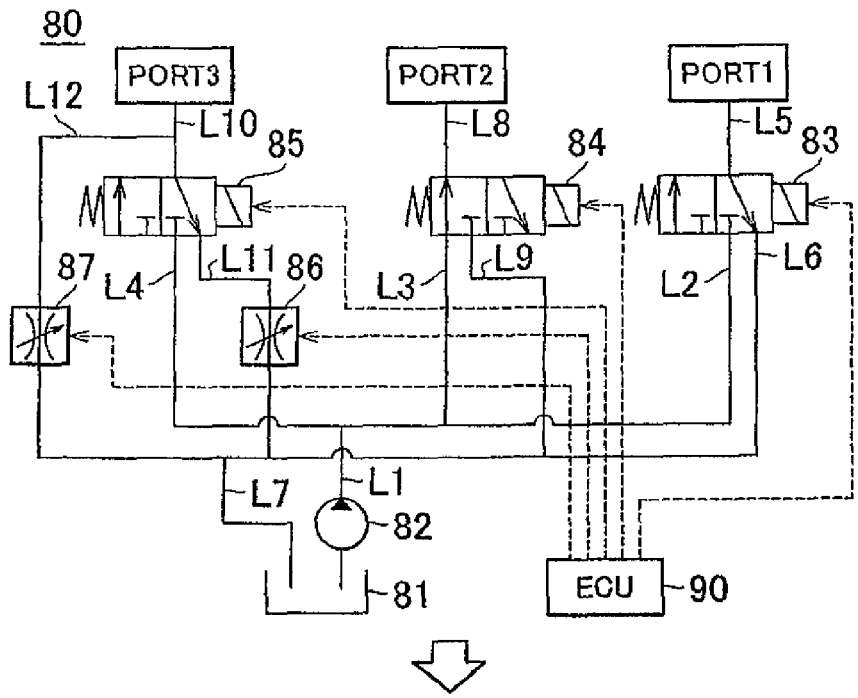
FIG. 11 is a view useful for explaining a fifth operating mode of the fluid transmission device of FIG. 1 and FIG. 2.

The fifth operating mode (L/U=SLIP, D/D=ON) is a damper operating, direction transmission mode. To establish the fifth operating mode, the ECU 90 controls the first switching valve 83 to the OFF position, controls the second switching valve 84 to the ON position, controls the third switching valve 85 to the OFF position, controls the first control valve 86 to the ON position and controls the second control valve 87 to the OFF position, as shown in FIG. 11. Namely, in the fifth operating mode, the hydraulic control device 80 brings the PORT 1 into the discharge state, brings the PORT 2 into the supply state, and brings the PORT 3 into the discharge state. As a result, in the fifth operating mode, the piston member 40 moves to the input side in the axial direction, as shown in FIG. 7, clue to a pressure difference between the PORT 2 and the PORT 1, namely, due to a pressure difference between the output side and input side of the piston member 40, so that the cover-side clutch face 21a is brought into frictional engagement with the friction surface of the friction plate 51, and the lock-up clutch 50 is thus placed in the engaged state. Also, in the fifth operating mode in which the PORT 2 is in the supply state, the hydraulic oil is supplied from between the turbine 32 and the piston member 40, to bring the turbine clutch 70 into the release state. Thus, in the fifth operating mode, the lock-up clutch 50 is placed in the ON state, and the dynamic damper 60 is placed in the ON state, as shown in FIG. 11. In the fifth operating mode, the first control valve 86 is ON, i.e., is in the controlling state, and operates to control the flow rate of the hydraulic oil discharged from the PORT 3 that is in the discharge state. The ECU 90 controls the flow rate of the hydraulic oil discharged from the PORT 3 that is in the discharge state, i.e. the pressure in PORT 3, by means of the first control valve 86, so that a difference in the rotational speed arises between the front cover 20 and the piston member 40. Accordingly, in the fifth operating mode, the lock-up clutch 50 is placed in the partially engaged (or slipping) state in which there is a difference in the rotational speed between the front cover 20 and the piston member 40. In this condition, the ECU 90 controls the operation of the first control valves 86 so as to control the slip amount, i.e., the amount of slipping of the lock-up clutch 50. As described above, the lock-up clutch 50 can be switched by the first control valve 86 between the partially engaged (slipping) state and the fully engaged state. Namely, it is possible to switch the lock-up clutch 50 between the partially engaged or slipping state and the fully engaged state by controlling the pressure in the PORT 3, without controlling the pressure in the PORT 2. Thus, there is no need to provide a control valve for controlling the pressure in the PORT 2, which leads to reduction of the number of components.

In the above-described fifth operating mode (L/U=SLIP, D/D=ON) in which the lock-up clutch 50 is ON, the driving force of the engine (not shown) is transmitted to the output shaft 200 via the pre-damper 10, front cover 20, lock-up clutch 50, piston member 40 and the hub 93, as shown in FIG. 7. Namely, in the fifth operating mode, the driving force is directly transmitted to the output shaft 200 without passing the fluid transmission mechanism 30, at an efficiency that depends on the slip amount of the lock-up clutch 50.

Also, in the above-described fifth operating mode in which the dynamic damper 60 is ON, the turbine 32 is elastically supported by the dynamic damper 60, and vibrations corresponding to the rotational speed of the engine (not shown) are transmitted to the pre-damper 10, front cover 20, lock-up clutch 50, piston member 40, dynamic damper 60 and the turbine 32. Accordingly, as in the second operating mode, the dynamic damper 60 is placed in the ON state when the engine speed is in the particular rotational speed range, so as to damp vibrations corresponding to the engine speed that is within the particular rotational speed range. Furthermore, since the lock-up clutch 50 is in the partially engaged or slipping state, the level of the vibrations corresponding to the particular rotational speed range of the engine can be lowered due to slipping of the front cover 20 and the piston member 40 relative to each other.

Figure 12:
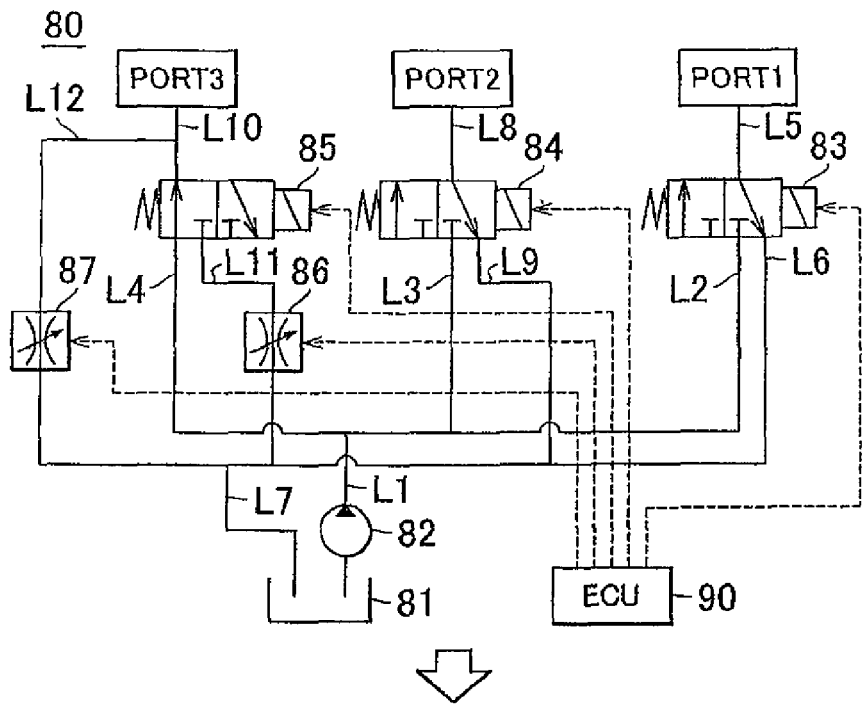
FIG. 12 is a view useful for explaining a sixth operating mode of the fluid transmission device of FIG. 1 and FIG. 2.

The sixth operating mode (L/U=SLIP, D/D=OFF) is a damper non-operating, direct transmission mode. To establish the sixth operating mode, the ECU 90 controls the first switching valve 83 to the OFF position, controls the second switching valve 84 to the OFF position, controls the third switching valve 85 to the ON position, controls the first control valve 86 to the OFF position, and controls the second control valve 87 to the ON position, as shown in FIG. 12. Namely, in the sixth operating mode, the hydraulic control device 80 brings the PORT 1 into the discharge state, brings the PORT 2 into the discharge state, and brings the PORT 3 into the supply state. In the sixth operating mode, therefore, the turbine 32 and the piston member 40 move to the input side in the axial direction, as shown in FIG. 9, due to pressure differences among the PORT 3, the PORT 2 and the PORT 1, namely, due to pressure differences among the output side of the turbine 32, the output side of the piston member 40 and the input side of the piston member 40. As a result, the turbine-side inclined clutch face 32c is brought into frictional engagement with the piston-side inclined clutch face 40c, while the cover-side clutch face 21a is brought into frictional engagement with the friction surface of the friction plate 51, so that the lock-up clutch 50 and the turbine clutch 70 are placed in the engaged states. Thus, in the sixth operating mode, the lock-up clutch 50 is placed in the ON state, and the dynamic damper 60 is placed in the OFF state, as shown in FIG. 12. In the sixth operating mode, the second control valve 87 is ON, i.e., in the controlling state, and operates to control the flow rate of the hydraulic fluid supplied into to the PORT 3 that is in the supply state. The ECU 90 controls the operation of the second control valve 87 so as to control the flow rate of the hydraulic fluid supplied into the PORT 3 that is in the supply state, namely, the pressure in the PORT 3, so that a difference in the rotational speed arises between the front cover 20 and the piston member 40. Accordingly, in the sixth operating mode, the lock-up clutch 50 is placed in the partially engaged or slipping state in which there is a difference in the rotational speed between the front cover 20 and the piston member 40. The ECU 90 controls the operation of the second control valve 87 so as to control the slip amount of the lock-up clutch 70.

In the above-described sixth operating mode (L/U=SLIP, D/D=OFF) in which the lock-up clutch 50 is ON, the driving force of the engine (not shown) is transmitted to the output shaft 200 via the pre-damper 10, front cover 20, lock-up clutch 50, piston member 40 and the hub 93, as shown in FIG. 9. Namely, in the sixth operating mode, the driving force is directly transmitted to the output shaft 200 without passing the fluid transmission mechanism 30, at an efficiency that depends on the slip amount of the lock-up clutch 70.

Also, in the above-described sixth operating mode in which the dynamic damper 60 is OFF, the turbine 32 is not elastically supported by the dynamic damper 60. Thus, as in the third operating mode, the dynamic damper 60 is placed in the OFF state when the engine speed is not within the particular rotational speed range, so that vibrations are prevented from becoming worse due to the operation of the dynamic damper 60 in a rotational speed range outside the particular rotational speed range. Furthermore, since the lock-up clutch 50 is in the partially engaged or slipping state, the level of the vibrations corresponding to the engine speed can be lowered due to slipping of the front cover 20 and the piston member 40 relative to each other.

In this embodiment, the ECU 90 obtains the throttle opening (%) of the throttle valve (not shown) that controls the amount of intake air supplied to the engine (not shown), the engine speed (rpm), and the gear position of the transmission (not shown), and switches the lock-up clutch 50 between the engaged state and the release state and switches the turbine clutch 70 between the engaged state and the release state, based on the obtained throttle opening, engine speed, gear position, and an operation map set in advance in a storage unit (not shown). The operation map is plotted or set with respect to each gear position of the transmission (not shown), so as to define the relationships among the throttle opening and the engine speed, the engaged or release state of the lock-up clutch 50, and the engaged or release state of the turbine clutch 70. Namely, the ECU 90 selects one of the above-indicated six operating modes, based on the obtained throttle opening, engine speed, and the operation map corresponding to the obtained gear position. The throttle opening, engine speed and the gear position can be obtained by known techniques, and therefore, the methods of obtaining these parameters will not be described in detail. To obtain a parameter indicative of the load condition of the engine, the ECU 90 may obtain the acceleration stroke (or position) of the accelerator pedal (not shown) operated by the driver, instead of the throttle opening. The vehicle on which the engine (not shown) and the fluid transmission device 1 are installed is provided with a braking device, namely, a device for applying braking force to driving wheels (not shown) of the vehicle. The braking device may be in the form of, for example, a hydraulic brake system, a generator, such as a motor or an alternator, or the like. The ECU 90 receives a brake signal that is generated in response to a change of an output value at the time of braking by the braking device, namely, when the braking device applies braking force to the driving wheels.

Figure 13:
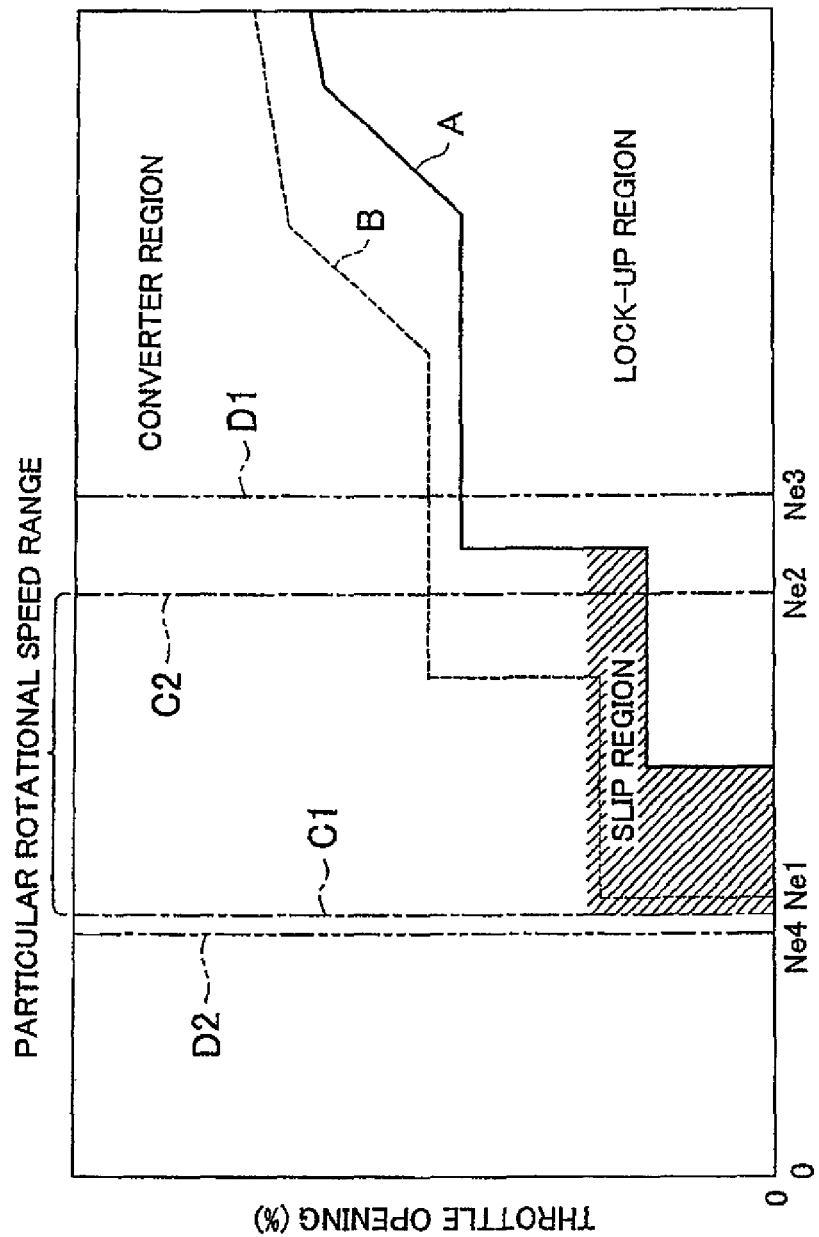
FIG. 13 is a view showing an operation map.

FIG. 13 shows one example of the operation maps. The operation map plotted for each gear position is divided into, for example, a converter region, a lock-up region, and a slip region, as shown in FIG. 13. The ECU 90 basically operates the fluid transmission device 1 in one of the operating modes corresponding to the region determined based on the obtained throttle opening and engine speed. The converter region is a region of a fluid transmission state (i.e., a region in which power is transmitted via the hydraulic fluid). In the converter region, the ECU 90 operates the fluid transmission device 1 in the above-indicated first operating mode. The lock-up region is a region of a direct transmission state in which power is directly transmitted via the lock-up clutch 50 that is in the fully engaged state. In the lock-up region, the ECU 90 operates the fluid transmission device 1 in the second operating mode or the third operating mode. The slip region is a region of a direct transmission state in which power is directly transmitted via the lock-up clutch 50 that is in the partially engaged or slipping state. In the slip region, the ECU 90 operates the fluid transmission device 1 in the fifth operating mode or the sixth operating mode. In the above-mentioned converter region, the turbine clutch 70 is held in the engaged state all the time, to hold the dynamic damper 60 in the non-operating state.

In FIG. 13, A represents a lock-up clutch full engagement line, based on which it is determined whether the lock-up clutch 50 should be switched from the release state or slipping state to the fully engaged state. When the throttle opening or the engine speed changes while the fluid transmission device 1 is in an operating mode (the first operating mode or fifth operating mode or sixth operating mode) in which the lock-up clutch 50 is in the release state or slipping state, so that the operating point defined by the throttle opening and the engine speed passes the lock-up clutch full engagement line A and enters the lock-up region, the ECU 90 switches the operating mode to an operating mode (selected from the second and third operating modes) in which the lock-up clutch 50 is in the fully engaged state, and operates the fluid transmission device 1 in the selected operating mode. In FIG. 13, B represents a lock-up clutch release line, based on which it is determined whether the lock-up clutch 50 is switched from the fully engaged state to the release state or slipping state. When the throttle opening or the engine speed changes while the fluid transmission device 1 is in an operating mode (the second operating mode or third operating mode) in which the lock-up clutch 50 is in the fully engaged state, so that the operating point passes the lock-up clutch release line B and enters the slip region or converter region, the ECU 90 switches the operating mode to an operating mode (selected from the fifth, sixth and first operating modes) in which the lock-up clutch 50 is in the slipping state or the release state, and operates the fluid transmission device 1 in the selected operating mode.

In FIG. 13, C1 represents a turbine clutch release line, based on which it is determined whether the turbine clutch 70 should be switched from the engaged state to the release state, namely, whether the dynamic damper 60 should be operated. The turbine clutch release line C1 is set to a first turbine-clutch release speed Ne1. If the engine speed becomes equal to or higher than the first turbine-clutch release speed Ne1, the ECU 90 places the turbine clutch 70 in the release state and operates the dynamic damper 60, irrespective of the throttle opening. In this embodiment, the first turbine-clutch release speed Ne1 is set to a boundary between the converter region and the slip region. Accordingly, when at least the engine speed changes to be equal to or higher than the first turbine-clutch release speed Ne1 and the operating point shifts from the converter region into the slip region, the ECU 90 witches the operating mode from the first operating mode in which the turbine clutch 70 is in the engaged state, to the fifth operating mode in which the turbine clutch 70 is in the release state, and operates the fluid transmission device 1 in the fifth operating mode.

In FIG. 13, D1 represents a turbine-clutch engagement line, based on which it is determined whether the turbine clutch 70 should be switched from the release state to the engaged state, namely, whether the dynamic damper 60 should be brought into a non-operating state. The turbine clutch engagement line D1 is set to a first turbine-clutch engagement speed Ne3. If the engine speed becomes equal to or higher than the first turbine-clutch engagement speed Ne3, the ECU 90 places the turbine clutch 70 in the engaged state, and brings the dynamic damper 60 into the non-operating state, irrespective of the throttle opening. In this embodiment, the first turbine-clutch engagement speed Ne3 is set within the lock-up region. Accordingly, when at least the engine speed changes in the lock-up region to be equal to or higher than the first turbine-clutch engagement speed Ne3, the ECU 90 switches the operating mode from the second operating mode in which the turbine clutch 70 is in the release state to the third operating mode in which the turbine clutch 70 is in the engaged state, and operates the fluid transmission device 1 in the third operating mode.

In FIG. 13, C2 represents a turbine clutch release line, based on which it is determined whether the turbine clutch 70 should be switched from the engaged state to the release state, namely, whether the dynamic damper 60 should be operated. The turbine clutch release line C2 is set to a second turbine-clutch release speed Ne2. If the engine speed becomes equal to or lower than the second turbine-clutch release speed Ne2, the ECU 90 places the turbine clutch 70 in the release state so as to operate the dynamic damper 60, irrespective of the throttle opening. In this embodiment, the second turbine-clutch release speed Ne2 is set within the lock-up region (including a region between the lock-up clutch full engagement line A and the lock-up clutch release line B) and within the slip region. Accordingly, when at least the engine speed changes in the lock-up region or slip region to be equal to lower than the second turbine-clutch release speed Ne2, the ECU 90 switches the operating mode from an operating mode (the third operating mode or sixth operating mode) in which the turbine clutch 70 is in the engaged state, to an operating mode (the second operating mode or fifth operating mode) in which the turbine clutch 70 is in the release state, and operates the fluid transmission device 1 in the second or fifth operating mode.

In FIG. 13, D2 represents a turbine clutch engagement line, based on which it is determined whether the turbine clutch 70 should be switched from the release state to the engaged state, namely, whether the dynamic damper 60 should be brought into a non-operating state. The turbine clutch engagement line D2 is set to a second turbine-clutch engagement speed Ne4. If the engine speed becomes equal to or lower than the second turbine-clutch engagement speed Ne4, the ECU 90 places the turbine clutch 70 in the engaged state so as to bring the dynamic damper 60 into the non-operating state, irrespective of the throttle opening. In this embodiment, the second turbine-clutch engagement speed Net is set to a boundary between the slip region (including a region between the turbine-clutch release line C1 and the turbine-clutch engagement line D2) and the converter region. Accordingly, when at least the engine speed changes to be equal to or lower than the second turbine-clutch engagement speed Ne4 and the operating point shifts from the slip region into the converter region, the ECU 90 switches the operating mode from the fifth operating mode in which the turbine clutch 70 is in the release state to the first operating mode in which the turbine clutch 70 is in the engaged state, and operates the fluid transmission device 1 in the first operating mode.

In this embodiment, the first turbine-clutch release speed Ne1 and the second turbine-clutch engagement speed Ne4 are set to different values. The second turbine-clutch engagement speed Ne4 is set to a lower value than the first turbine-clutch release speed Ne1. Also, the second turbine-clutch release speed Ne2 and the first turbine-clutch engagement speed Ne3 are set to different values. The first turbine-clutch engagement speed Ne3 is set to a higher value than the second turbine-clutch release speed Ne2. Since the engagement speed at which the turbine clutch 70 is brought into the engaged state is not equal to the release speed at which the turbine clutch 70 is brought into the release state, switching of the turbine clutch 70 between the engaged state and the release state is less likely to be repeated due to minor changes in the engine speed, as compared with the case where the engagement speed is equal to the release state. Namely, the dynamic damper 60 is less likely to be repeatedly switched between the operating state and the non-operating state due to minor changes in the engine speed, thus assuring improved riding comfort. While the engagement speed and the release speed are different from each other in this embodiment, the engagement speed and the release speed may be equal to each other. Namely, the first turbine-clutch release speed Ne1 may be equal to the second turbine-clutch engagement speed Ne4, and the second turbine-clutch release speed Ne2 may be equal to the first turbine-clutch engagement speed Ne3.

Also, the first turbine-clutch release speed Ne1 and the second turbine-clutch release speed Ne2 are set such that the above-mentioned particular rotational speed range is defined between the first turbine-clutch release speed Ne1 and the second turbine-clutch release speed Ne2. Namely, the range of the engine speed in which the turbine clutch 70 is in the release state and the dynamic damper 60 is operating is set as the particular rotational speed range.

Figure 14:
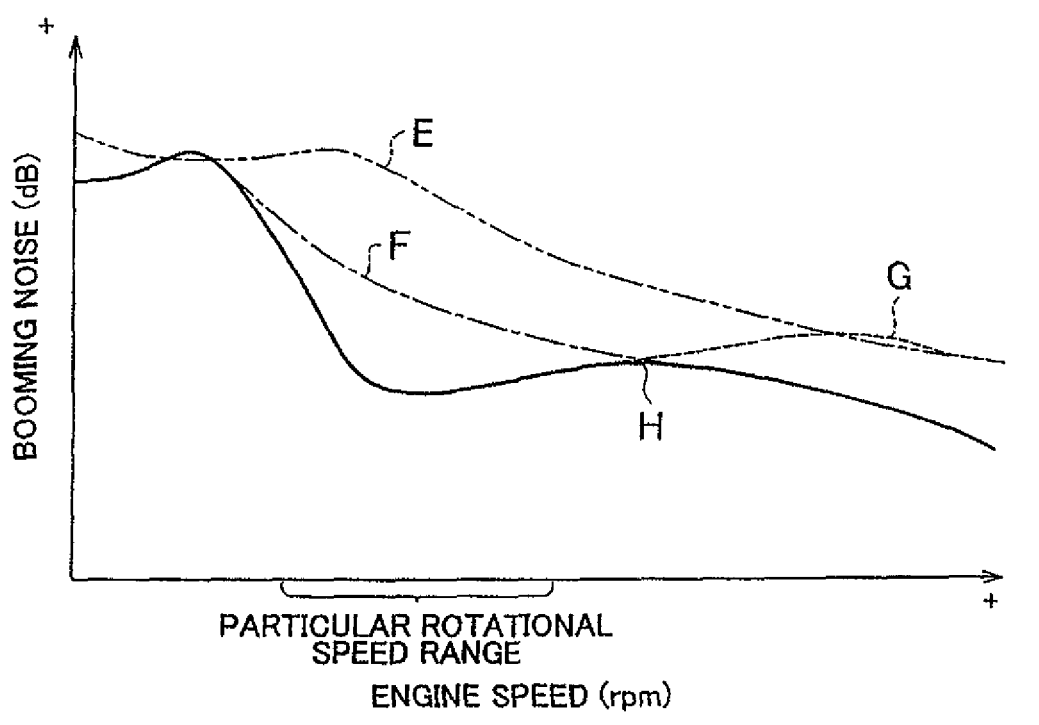
FIG. 14 is a graph showing the relationship between the engine speed and booming noise.

As described above, in the fluid transmission device 1 of this embodiment, the pre-damper 10 is provided between the crankshaft 100 and the front cover 20, and the dynamic damper 60 is provided which can be switched by the turbine clutch 70 between the operating state and the non-operating state and elastically supports the turbine 32 when it is in operation. FIG. 14 is a graph indicating the relationship between the engine speed and booming noise. In FIG. 14, line E indicates the relationship between the engine speed and the booming noise with regard to a fluid transmission device in which a pre-damper is provided between the front cover and the fluid transmission mechanism. Line F shown in FIG. 14 indicates the relationship between the engine speed and the booming noise with regard to a fluid transmission device in which the pre-damper is provided between the crankshaft and the front cover. Line G shown in FIG. 14 indicates the relationship between the engine speed and the booming noise with regard to a fluid transmission device in which the pre-damper is provided between the crankshaft and the front cover, and a dynamic damper that is operating all the time irrespective of the engine speed is provided. Line H shown in FIG. 14 indicates the relationship between the engine speed and the booming noise with regard to the fluid transmission device 1 of this embodiment. The booming noise (dB) is generated in the vehicle compartment due to vibrations corresponding to the engine speed.

In the case of the fluid transmission device in which the pre-damper is provided between the crankshaft and the front cover, the balance between the input-side inertial mass and output-side inertial mass of the pre-damper is improved as compared with the case of the fluid transmission device in which the pre-damper is provided between the front cover and the fluid transmission mechanism. Accordingly, where the pre-damper is provided between the crankshaft and the front cover, the resonance point corresponding to each engine speed can be lowered, and vibrations corresponding to the engine speed can be damped or suppressed, as indicated by lines F, G, H associated with the fluid transmission devices in which the pre-damper is provided between the crankshaft and the front cover, as compared with line E associated with the fluid transmission device in which the pre-damper is provided between the front cover and the fluid transmission mechanism. Thus, vibrations, such as booming noise, can be reduced over the entire range of the engine speed.

In the case of the fluid transmission device equipped with the dynamic damper, when the engine speed is in the particular rotational speed range, the resonance in the particular rotational speed range of the engine can be suppressed or countered with the opposite phase. Accordingly, vibrations generated in the particular rotational speed range of the engine can be damped or suppressed, as indicated by line G, H associated with the fluid transmission devices each equipped with the dynamic damper. Thus, vibrations, such as booming noise, can be locally reduced, i.e., reduced in the particular rotational speed range.

Furthermore, in the fluid transmission device 1 of this embodiment in which the dynamic damper 60 is operated in the particular rotational speed range but not operated in the other rotational speed range, the turbine clutch 70 is placed in the engaged state so as not to operate the dynamic camper 60 when the engine speed is not within the particular rotational speed range. Therefore, vibrations, such as booming noise, are prevented from becoming worse (i.e., increasing) in the rotational speed range in which vibrations would become worse due to the operation of the dynamic damper, as indicated by line H (in FIG. 14) associated with the fluid transmission device 1 of this embodiment, as compared with line G (in FIG. 14) associated with the fluid transmission device in which the dynamic damper operates all the time. Namely, in the fluid transmission device 1 of this embodiment, the dynamic damper 60 is caused to operate only when the vibrations corresponding to the particular rotational speed range of the engine are to be damped, and is inhibited from operating (i.e., brought into a non-operating state) before the engine speed falls within the rotational speed range in which the vibrations would become worse due to the operation of the dynamic damper 60. Thus, the dynamic damper 60 is selectively brought into the non-operating or operating state, through engagement or release of the turbine clutch 70, so that the dynamic damper 60 can be effectively used for damping vibrations in appropriate manners. In the above manner, vibrations, such as booming noise, can be reduced in the local (or particular) range and entire range of the engine speed, and the lock-up clutch 50 can be placed in the engaged state even when the engine speed is within a relatively low speed range, thus assuring improved fuel efficiency.

As described above, the fluid transmission device 1 according to the invention is able to control the state (slipping state, fully engaged state, release state) of the lock-up clutch 50 and the state (engaged state, release state) of the turbine clutch 70 by controlling the pressures in the PORT 1, PORT 2 and PORT 3. Thus, only the simple arrangement is required to operate the fluid transmission device 1 in a selected one of the above-indicated plural operating modes.

Figure 15:
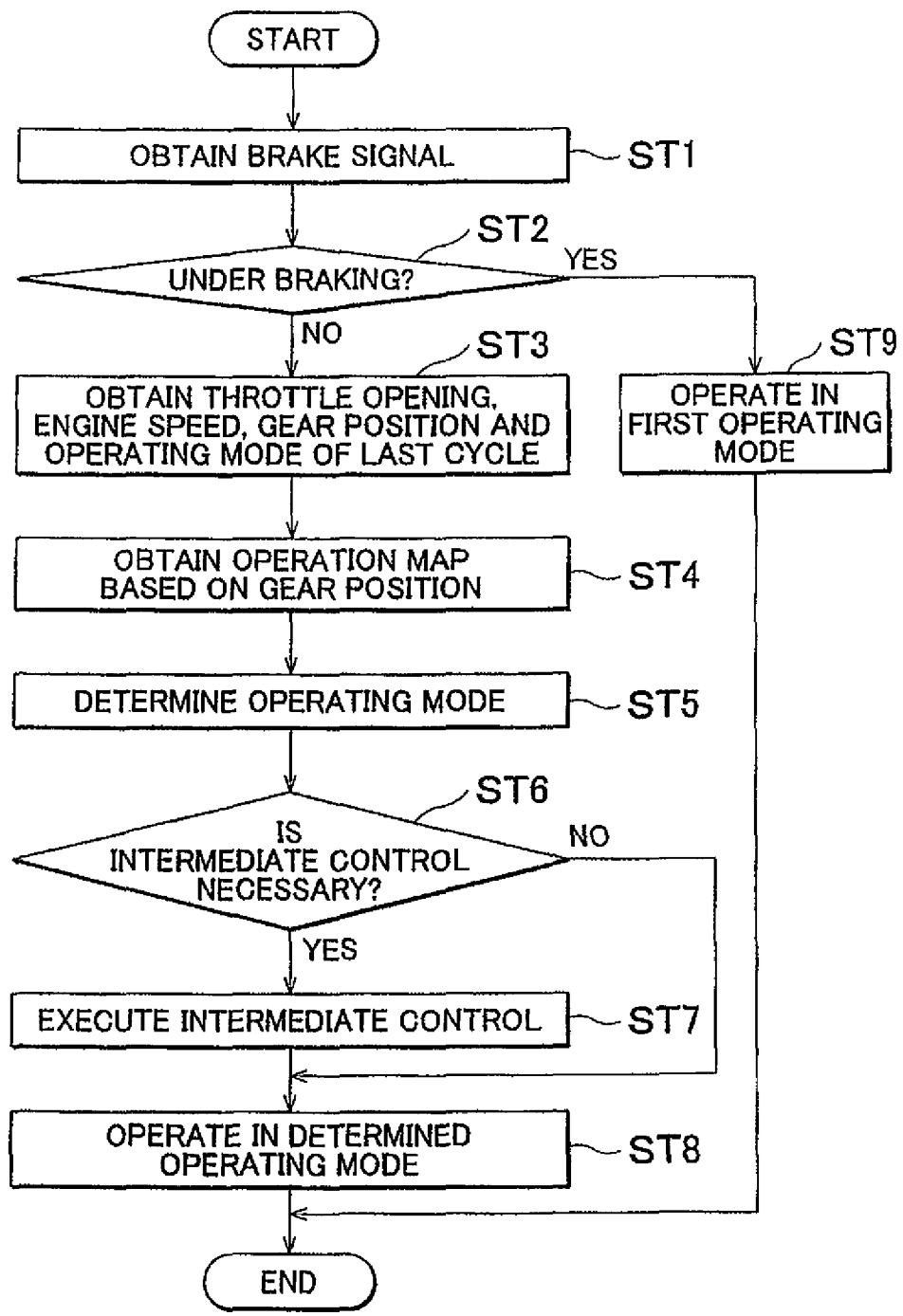
FIG. 15 is a flowchart illustrating a control routine of the fluid transmission device according to the embodiment of FIG. 1 and FIG. 2.

Next, a method of controlling the fluid transmission device 1 according to this embodiment of the invention will be described. FIG. 15 is a flowchart illustrating the control flow of the fluid transmission device of this embodiment, and FIG. 16 through FIG. 23 illustrate intermediate control operations performed during switching of the operating modes. The control of the fluid transmission device 1 is repeatedly executed at given intervals defining control cycles.

Initially, the ECU 90 obtains a brake signal (step ST1).

Next, the ECU 90 determines whether the vehicle (not shown) is under braking, based on the obtained brake signal (step ST2).

If the ECU 90 determines that the vehicle (not shown) is not under braking (NO in step ST2), it obtains the throttle opening, engine speed, gear position, and the operating mode of the last cycle (step ST3). Here, the operating mode of the last mode is the operating mode determined in the last control cycle, which is stored in advance in a storage unit (not shown).

Next, the ECU 90 obtains an operation map based on the obtained gear position (step ST4). In this step, the ECU 90 selects an operation map corresponding to the obtained gear position, from a plurality of operation maps corresponding to the respective gear positions, which are stored in advance in the storage unit (not shown).

Next, the ECU 90 determines the operating mode (step ST5). In this step, the ECU 90 determines the operating mode-based on the obtained throttle opening, engine speed, the operating mode of the last cycle, and the operation map. The ECU 90 obtains the state (fully engaged state, slipping (partially engaged) state, (or) release state) of the lock-up clutch 50 established in the last cycle and the state (engaged state or release state) of the turbine clutch 70 established in the last cycle, from the operating mode of the last cycle. If it is determined from the obtained throttle opening, engine speed and the operation map that the state of the lock-up clutch 50 and/or the state of the turbine clutch 70 need be changed, the ECU 90 determines an operating mode different from the operating mode of the last cycle so as to change the state of the lock-up clutch 50 and/or the state of the turbine clutch 70.

Next, the ECU 90 determines whether intermediate control needs to be performed (step ST6). In this step, if the operating mode determined in the current cycle is different from the operating mode of the last cycle, the ECU 90 determines whether it is necessary to perform intermediate control for causing the fluid transmission device 1 to perform an intermediate operation or operations during switching between two operating modes. The intermediate control is performed so as to improve controllability, such as readiness to engage the lock-up clutch 50.

If the ECU 90 determines that intermediate control needs to be performed (YES in step ST6), the intermediate control is executed (step ST7). The intermediate control is executed when the fluid transmission device 1 shifts from the fluid transmission state to the damper operating, direct transmission state, or shifts from the damper operating, direct transmission state to the fluid transmission state, or shifts from the fluid transmission state to the damper non-operating, direct transmission state, or shifts from the damper non-operating, direct transmission state to the fluid transmission state. After execution of the intermediate control, the ECU 90 operates the fluid transmission device 1 in the determined operating mode (step ST8). In the following, switching between each combination of the above-indicated operating modes during which intermediate control is executed, and the intermediate control performed during switching between each combination of the operating modes will be described.

An example of the intermediate control is performed when the determined operating mode is the fifth operating mode, and the operating mode of the fluid transmission device 1 is switched from the first operating mode to the fifth operating mode (which will be simply referred to as "1-5 switching"). To effect the 1-5 switching, the fluid transmission device 1 that is in the first operating mode is subjected to a first intermediate operation and a second intermediate operation, and is then switched to the fifth operating mode, as shown in FIG. 16. In the first intermediate operation, the ECU 90 controls the first switching valve 83 to ON, controls the second switching valve 84 to ON, controls the third switching valve 85 to OFF, controls the first control valve 86 to OFF and controls the second control valve 87 to OFF. Namely, in the first intermediate operation, the hydraulic control device 80 brings the PORT 1 into the supply state, brings the PORT 2 into the supply state and brings the PORT 3 into the discharge state. In the second intermediate operation, the ECU 90 controls the first switching valve 83 to ON, controls the second switching valve 84 to ON, controls the third switching valve 85 to OFF, controls the first control valve 86 to ON, and controls the second control valve 87 to OFF. Namely, in the second intermediate operation, the hydraulic control device 80 brings the PORT 1 into the supply state, brings the PORT 2 into the supply state, and brings the PORT 3 into the discharge state. In the second intermediate operation, the first control valve 86 is ON, i.e., is in the controlling state, and the ECU 90 causes the first control valve 86 to control the flow rate of the hydraulic oil discharged from the PORT 3 that is in the discharge state so as to produce a difference in the rotational speed between the front cover 20 and the piston member 40, so that the lock-up clutch 50 is placed in the partially engaged or slipping state. Thus, the intermediate control is performed during the 1-5 switching, i.e., switching from the fluid transmission state to the damper operating, direct transmission state, so as to bring the PORT 2 into the supply state prior to switching to the damper operating, direct transmission state, i.e., prior to switching to the fifth operating mode. By bringing the PORT 2 into the supply state prior to switching to the fifth operating mode, the turbine clutch 70 is surely or reliably placed in the release state, and the dynamic damper 60 is able to operate immediately after the lock-up clutch 50 is brought into the partially engaged or slipping state, thus assuring improved riding comfort and improved fuel efficiency. Also, since the piston member 40 moves to the output side under the intermediate control, the readiness to engage the lock-up clutch 50 is improved. In this connection, the 1-5 switching takes place, for example, when it is advantageous to lower the level of vibrations corresponding to the particular rotational speed range of the engine through slipping or partial engagement of the lock-up clutch 50, and use the dynamic damper 60 for damping the vibrations corresponding to the particular rotational speed range of the engine.

Another example of the intermediate control is performed when the determined operating mode is the second operating mode, and the operating mode of the fluid transmission device 1 is switched from the first operating mode to the second operating mode (which will be simply referred to as "1-2 switching"). To effect the 1-2 switching, the fluid transmission device 1 that is in the first operating mode is subjected to a third intermediate operation and a fourth intermediate operation, and is then switched to the second operating mode, as shown in FIG. 17. In the third intermediate operation, the ECU 90 controls the first switching valve 83 to ON, controls the second switching valve 84 to ON, controls the third switching valve 85 to OFF, controls the first control valve 86 to OFF, and controls the second control valve 87 to OFF. Namely, in the third intermediate operation, the hydraulic control device 80 brings the PORT 1 into the supply state, brings the PORT 2 into the supply state, and brings the PORT 3 into the discharge state. In the fourth intermediate operation, the ECU 90 controls the first switching valve 83 to ON, controls the second switching valve 84 to ON, controls the third switching valve 85 to OFF, controls the first control valve 86 to ON, and controls the second control valve 87 to OFF. Namely, in the fourth intermediate operation, the hydraulic control device 80 brings the PORT 1 into the supply state, brings the PORT 2 into the supply state, and brings the PORT 3 into the discharge state. In the fourth intermediate operation, the first control valve 86 is ON, i.e., is in the controlling state, and the ECU 90 causes the first control valve 86 to control the flow rate of the hydraulic oil discharged from the PORT 3 that is in the discharge state so as not to produce a difference in the rotational speed between the front cover 20 and the piston member 40, so that the lock-up clutch 50 is placed in the fully engaged state. Thus, the intermediate control is performed during the 1-2 switching, i.e., switching from the fluid transmission state to the damper operating, direct transmission state, so as to bring the PORT 2 into the supply state prior to switching to the damper operating, direct transmission state, i.e., prior to switching to the second operating mode. By bringing the PORT 2 into the supply state prior to switching to the second operating mode, the turbine clutch 70 is surely or reliably placed in the release state, and the dynamic damper 60 is able to operate immediately after the lock-up clutch 50 is brought into the fully engaged state, thus assuring improved riding comfort and improved fuel efficiency. Also, since the piston member 40 moves to the output side under the intermediate control, the readiness to engage the lock-up clutch 50 is improved. In this connection, the 1-2 switching takes place, for example, when it is advantageous to use the dynamic damper 60 for damping vibrations corresponding to the particular rotational speed range of the engine.

A further example of the intermediate control is performed when the determined operating mode is the first operating mode, and the operating mode is switched from the second operating mode to the first operating mode (which will be simply referred to as "2-1 switching"). To effect the 2-1 switching, the fluid transmission device 1 that is in the second operating mode is subjected to a fifth intermediate operation, and is then switched to the first operating mode, as shown in FIG. 18. In the fifth intermediate operation, the ECU 90 controls the first switching valve 83 to OFF, controls the second switching valve 84 to OFF, controls the third switching valve 85 to ON, controls the first control valve 86 to OFF, and controls the second control valve 87 to OFF. Namely, in the fifth intermediate operation, the hydraulic control device 80 brings the PORT 1 into the discharge state, brings the PORT 2 into the discharge state, and brings the PORT 3 into the supply state. Thus, the intermediate control is performed during the 2-1 switching, i.e., switching from the damper operating, direct transmission state to the fluid transmission state, so as to bring the PORT 2 into the discharge state prior to switching to the fluid transmission state, i.e., prior to switching to the first operating mode. By bringing the PORT 2 into the discharge state prior to switching to the first operating mode, the turbine clutch 70 is surely or reliably placed in the engaged state, and the lock-up clutch 50 is brought into the release state after the turbine clutch 70 is engaged. Since the turbine clutch 70 is placed in the engaged state before the lock-up clutch 50 is released, the driving force transmitted to the turbine 32 is prevented from being applied to the dynamic damper 60. It is thus possible to prevent excessive torque from being applied to the dynamic damper 60, in particular, the second damper springs 63, thus assuring improved reliability and reduced shock. In this connection, the 2-1 switching takes place, for example, when vibrations corresponding to the engine speed increase as the throttle opening increases, and it is advantageous to absorb the vibrations corresponding to the engine speed with the fluid transmission device 1 placed in the fluid transmission state (i.e., operating in the first operating mode).

A still further example of the intermediate control is performed when the determined operating mode is the first operating mode, and the operating mode is switched from the fifth operating mode to the first operating mode (which will be simply referred to as "5-1 switching"). To effect the 5-1 switching, the fluid transmission device 1 that is in the fifth operating mode is subjected to a sixth intermediate operation and a seventh intermediate operation, and is then switched to the first operating mode, as shown in FIG. 19. In the sixth intermediate operation, the ECU 90 controls the first switching valve 83 to OFF, controls the second switching valve 84 to ON, controls the third switching valve 85 to ON, controls the first control valve 86 to OFF, and controls the second control valve 87 to OFF. Namely, in the sixth intermediate operation, the hydraulic control device 80 brings the PORT 1 into the discharge state, brings the PORT 2 into the supply state, and brings the PORT 3 into the supply state. In the seventh intermediate operation, the ECU 90 controls the first switching valve 83 to ON, controls the second switching valve 84 to OFF, controls the third switching valve 85 to ON, controls the first control valve 86 to OFF, and controls the second control valve 87 to OFF. Namely, in the seventh intermediate operation, the hydraulic control unit 80 brings the PORT 1 into the supply state, brings the PORT 2 into the discharge state, and brings the PORT 3 into the supply state. Thus, the intermediate control is performed during the 5-1 switching, i.e., switching from the damper operating, direct transmission state to the fluid transmission state, so as to bring the PORT 2 into the discharge state prior to switching to the fluid transmission state, i.e., prior to switching to the first operating mode. By bringing the PORT 2 into the discharge state prior to switching to the first operating mode, the turbine clutch 70 is reliably placed in the engaged state, and the lock-up clutch 50 is placed in the release state after the turbine clutch 70 is engaged. Since the turbine clutch 70 is placed in the engaged state before the lock-up clutch 50 is released, the driving force transmitted to the turbine 32 is prevented from being applied to the dynamic damper 60. It is thus possible to prevent excessive torque from being applied to the dynamic damper 60, in particular, the second damper springs 63, thus assuring improved reliability and reduced shock. In this connection, the 5-1 switching takes place, for example, when vibrations corresponding to the engine speed increase as the throttle opening increases, and it is advantageous to absorb the vibrations corresponding to the engine speed with the fluid transmission device 1 placed in the fluid transmission state or operating in the first operating mode.

A still another example of the intermediate control is performed when the determined operating mode is the sixth operating mode, and the operating mode is switched from the first operating mode to the sixth operating mode (which will be simply referred to as "1-6 switching"). To effect the 1-6 switching, the fluid transmission device 1 that is in the first operating mode is subjected to an eighth intermediate operation, and then switched to the sixth operating mode, as shown in FIG. 20. In the eighth intermediate operation, the ECU 90 controls the first switching valve 83 to ON, controls the second switching valve 84 to OFF, controls the third switching valve 85 to ON, controls the first control valve 86 to OFF, and controls the second control valve 87 to OFF. Namely, in the eighth intermediate operation, the hydraulic control device 80 brings the PORT 1 into the supply state, brings the PORT 2 into the discharge state, and brings the PORT 3 into the supply state. Thus, the intermediate control is performed during the 1-6 switching, i.e., switching from the fluid transmission state to the damper non-operating, direct transmission state, so as to bring the PORT 3 into the supply state prior to switching to the damper non-operating, direct transmission state, i.e., prior to switching to the sixth operating mode. By bringing the PORT 3 into the supply state prior to switching to the sixth operating mode, the turbine clutch 70 is reliably placed in the engaged state, and the lock-up clutch 50 can be brought into the partially engaged or slipping state immediately after the dynamic damper 60 is placed in the non-operating state, thus assuring improved riding comfort and improved fuel efficiency. Also, since the turbine 32 and the piston member 40 move to the input side under the intermediate control, the readiness to engage the lock-up clutch 50 is improved. Furthermore, since the turbine clutch 70 is placed in the engaged state before the lock-up clutch 50 is brought into the partially engaged or slipping state, the driving force transmitted to the turbine 32 is prevented from being applied to the dynamic damper 60. It is thus possible to prevent excessive torque from being applied to the dynamic damper 60, in particular, the second damper springs 63, thus assuring improved reliability and reduced shock. In this connection, the 1-6 switching takes place, for example, when the throttle opening is reduced, and it is advantageous to improve the efficiency with the lock-up clutch 50 placed in the partially engaged or slipping state.

A still another example of the intermediate control is performed when the determined operating mode is the third operating mode, and the operating mode is switched from the first operating mode to the third operating mode (which will be simply referred to as "1-3 switching"). To effect the 1-3 switching, the fluid transmission device 1 that is in the first operating mode is subjected to a ninth intermediate operation, and then switched to the third operating mode, as shown in FIG. 21. In the ninth intermediate operation, the ECU 90 controls the first switching valve 83 to ON, controls the second switching valve 84 to OFF, controls the third switching valve 85 to ON, controls the first control valve 86 to OFF, and controls the second control valve 87 to OFF. Namely, in the ninth intermediate operation, the hydraulic control device 80 brings the PORT 1 into the supply state, brings the PORT 2 into the discharge state, and brings the PORT 3 into the supply state. Thus, the intermediate control is performed during the 1-3 switching, i.e., switching from the fluid transmission state to the damper non-operating, direct transmission state, so as to bring the PORT 3 into the supply state prior to switching to the damper non-operating, direct transmission state, i.e., prior to switching to the third operating mode. By bringing the PORT 3 into the supply state prior to switching to the third operating mode, the turbine clutch 70 is reliably placed in the engaged state, and the lock-up clutch 50 can be brought into the fully engaged state immediately after the dynamic damper 60 is placed in the non-operating state, thus assuring improved riding comfort and improved fuel efficiency. Also, since the turbine 32 and the piston member 40 move toward the input side under the intermediate control, the readiness to engage the lock-up clutch 50 is improved. Furthermore, since the turbine clutch 70 is placed in the engaged state before the lock-up clutch 50 is fully engaged, the driving force transmitted to the turbine 32 is prevented from being applied to the dynamic damper 60. It is thus possible to prevent excessive torque from being applied to the dynamic damper 60, in particular, the second damper springs 63, thus assuring improved reliability and reduced shock. In this connection, the 1-3 switching takes place, for example, when torque variations in the engine are reduced as the throttle opening decreases, and it is advantageous to damp vibrations corresponding to the engine speed by means of the pre-damper 10, without utilizing slipping of the lock-up clutch 50.

Another example of the intermediate control is performed when the determined operating mode is the first operating mode, and the operating mode is switched from the third operating mode to the first operating mode (which will be simply referred to as "3-1 switching"). To effect the 3-1 switching, the fluid transmission device 1 that is in the third operating mode is subjected to a tenth intermediate operation, and then switched to the first operating mode, as shown in FIG. 22. In the tenth intermediate operation, the ECU 90 controls the first switching valve 83 to ON, controls the second switching valve 84 to OFF, controls the third switching valve 85 to ON, controls the first control valve 86 to OFF, and controls the second control valve 87 to OFF. Namely, in the tenth intermediate operation, the hydraulic control device 80 brings the PORT 1 into the supply state, brings the PORT 2 into the discharge state, and brings the PORT 3 into the supply state. Thus, the intermediate control is performed during the 3-1 switching, i.e., switching from the damper non-operating, direct transmission state to the fluid transmission state, so as to bring the PORT 1 into the supply state prior to switching to the fluid transmission state, i.e., prior to switching to the first operating mode. By bringing the PORT 1 into the supply state before switching to the first operating mode, the lock-up clutch 50 is brought into the release state while the turbine clutch 70 is reliably kept in the engaged state. Since the turbine clutch 70 is not released (i.e., the turbine clutch 70 is held in the engaged state) before the lock-up clutch 50 is released, the driving force transmitted to the turbine 32 is prevented from being applied to the dynamic damper 60. It is thus possible to prevent excessive torque from being applied to the dynamic damper 60, in particular, the second damper springs 63, thus assuring improved reliability and reduced shock. In this connection, the 3-1 switching takes place, for example, when vibrations corresponding to the engine speed increase as the throttle opening increases, and it is advantageous to absorb the vibrations corresponding to the engine speed with the fluid transmission device 1 placed in the fluid transmission state.

Another example of the intermediate control is performed when the determined operating mode is the first operating mode, and the operating mode is switched from the sixth operating mode to the first operating mode (which will be simply referred to as "6-1 switching"). To effect the 6-1 switching, the fluid transmission device 1 that is in the sixth operating mode is subjected to an eleventh intermediate operation, and then switched to the first operating mode, as shown in FIG. 23. In the eleventh intermediate operation, the ECU 90 controls the first switching valve 83 to ON, controls the second switching valve 84 to OFF, controls the third switching valve 85 to ON, controls the first control valve 86 to OFF, and controls the second control valve 87 to OFF. Namely, in the eleventh intermediate operation, the hydraulic control device 80 brings the PORT 1 into the supply state, brings the PORT 2 into the discharge state, and brings the PORT 3 into the supply state. Thus, the intermediate control is performed during the 6-1 switching, i.e., switching from the damper non-operating, direct transmission state to the fluid transmission state, so as to bring the PORT 1 into the supply state prior to switching to the fluid transmission state, i.e., prior to switching to the first operating mode. By bringing the PORT 1 into the supply state before switching to the first operating mode, the lock-up clutch 50 is brought into the release state while the turbine clutch 70 is reliably kept in the engaged state. Since the turbine clutch 70 is not released before the lock-up clutch 50 is released, the driving force transmitted to the turbine 32 is prevented from being applied to the dynamic damper 60. It is thus possible to prevent excessive torque from being applied to the dynamic damper 60, in particular, the second damper springs 63, thus assuring improved reliability and reduced shock. In this connection, the 6-1 switching takes place, for example, when vibrations corresponding to the engine speed increase as the throttle opening increases, and it is advantageous to absorb the vibrations corresponding to the engine speed with the fluid transmission device 1 placed in the fluid transmission state.

If the ECU 90 determines that the intermediate control need not be performed (NO in step ST6 of FIG. 15), the ECU 90 operates the fluid transmission device 1 in the determined operating mode (step ST8).

For example, no intermediate control is performed when the determined operating mode is the second operating mode, and the operating mode of the fluid transmission device 1 is switched from the fifth operating mode to the second operating mode (which will be simply referred to as "5-2 switching"). To effect the 5-2 switching, the ECU 90 controls the first control valve 86 so as to reduce the flow rate of the hydraulic oil discharged from the PORT 3 that is in the discharge state, namely, increase the pressure in the PORT 3, thereby to bring the lock-up clutch 50 into the fully engaged state (in which the pressure in the PORT 2 is equal to or higher than the pressure in the PORT 3). In the 5-2 switching, the lock-up clutch 50 is switched from the partially engaged or slipping state to the fully engaged state, thus assuring improved fuel efficiency. In this connection, the 5-2 switching takes place, for example, when torque variations in the engine are reduced as the throttle opening decreases, and it is advantageous to damp vibrations corresponding to the particular rotational speed range of the engine by means of the dynamic damper 60, without utilizing slipping of the lock-up clutch 50.

For example, no intermediate control is performed when the determined operating mode is the fifth operating mode and the operating mode is switched from the second operating mode to the fifth operating mode (which will be simply referred to as "2-5 switching"). To effect the 2-5 switching, the ECU 90 controls the first control valve 86 so as to increase the flow rate of the hydraulic oil discharged from the PORT 3 that is in the discharge state, namely, reduce the pressure in the PORT 3, thereby to produce a difference in the rotational speed between the front cover 20 and the piston member 40. In the 2-5 switching, the lock-up clutch 50 is switched from the fully engaged state to the partially engaged or slipping state, thus assuring improved fuel efficiency when compared with the case where the operating mode is switched to the first operating mode. In this connection, the 2-5 switching takes place, for example, when vibrations corresponding to the particular rotational speed range of the engine increase as the throttle opening increases, and it is advantageous to damp the vibrations corresponding to the particular rotational speed range of the engine by means of the dynamic damper 60, while lowing the level of the vibrations corresponding to the particular rotational speed range of the engine through slipping of the lock-up clutch 50.

For example, no intermediate control is performed when the determined operating mode is the third operating mode, and the operating mode is switched from the sixth operating mode to the third operating mode (which will be simply referred to as "6-3 switching"). To effect the 6-3 switching, the ECU 90 controls the first control valve 86 so as to reduce the flow rate of the hydraulic oil discharged from the PORT 3 that is in the supply state, thereby to increase the amount or flow rate of the hydraulic oil supplied to the PORT 3, namely, increase the pressure in the PORT 3, so that the lock-up clutch 50 is brought into the fully engaged state (in which the pressure in the PORT 2 is equal to or higher than the pressure in the PORT 3). In the 6-3 switching, the lock-up clutch 50 is switched from the partially engaged or slipping state to the fully engaged state, thus assuring improved fuel efficiency. In this connection, the 6-3 switching takes place, for example, when torque variations in the engine are reduced as the throttle opening decreases, and it is advantageous to damp vibrations corresponding to the engine speed by means of the pre-damper 10, without utilizing slipping of the lock-up clutch 50.

For example, no intermediate control is performed when the determined operating mode is the sixth operating mode, and the operating mode is switched from the third operating mode to the sixth operating mode (which will be simply referred to as "3-6 switching"). To effect the 3-6 switching, the ECU 90 controls the first control valve 86 so as to increase the flow rate of the hydraulic oil discharged from the PORT 3 that is in the discharge state, thereby to reduce the amount or flow rate of the hydraulic oil supplied to the PORT 3, namely, reduce the pressure in the PORT 3, and produce a difference in the rotational speed between the front cover 20 and the piston 40. In the 3-6 switching, the lock-up clutch 50 is switched from the fully engaged state to the partially engaged or slipping state, thus assuring improved fuel efficiency when compared with the case where the fluid transmission device 1 is switched to the first operating mode. In this connection, the 3-6 switching takes place, for example, when vibrations corresponding to the particular rotational speed range of the engine increase as the throttle opening increases, and it is advantageous to lower the level of the vibrations corresponding to the engine speed through slipping of the lock-up clutch 50.

If the ECU 90 determines that the vehicle (not shown) is under braking (YES in step ST2 of FIG. 15), it operates the fluid transmission device 1 in the first operating mode (step ST9). In this step, the ECU 90 brings at least the PORT 2 into the discharge state upon braking of the vehicle (not shown). Accordingly, the lock-up clutch 50 can be immediately brought into the release state, and engine stall that would occur if the driving wheels (not shown) are directly connected to the engine is prevented from occurring at the time of braking, in particular, hard braking of the vehicle.

Figure 24:
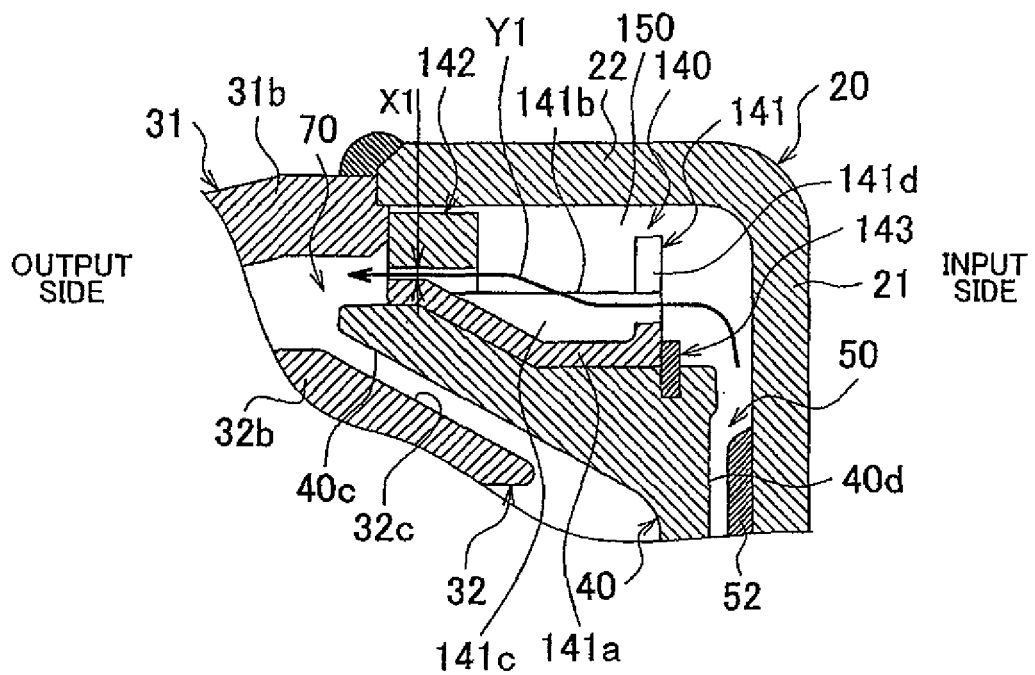
FIG. 24 is a view showing an exemplary arrangement of a first channel resistance changing mechanism.
Figure 25:
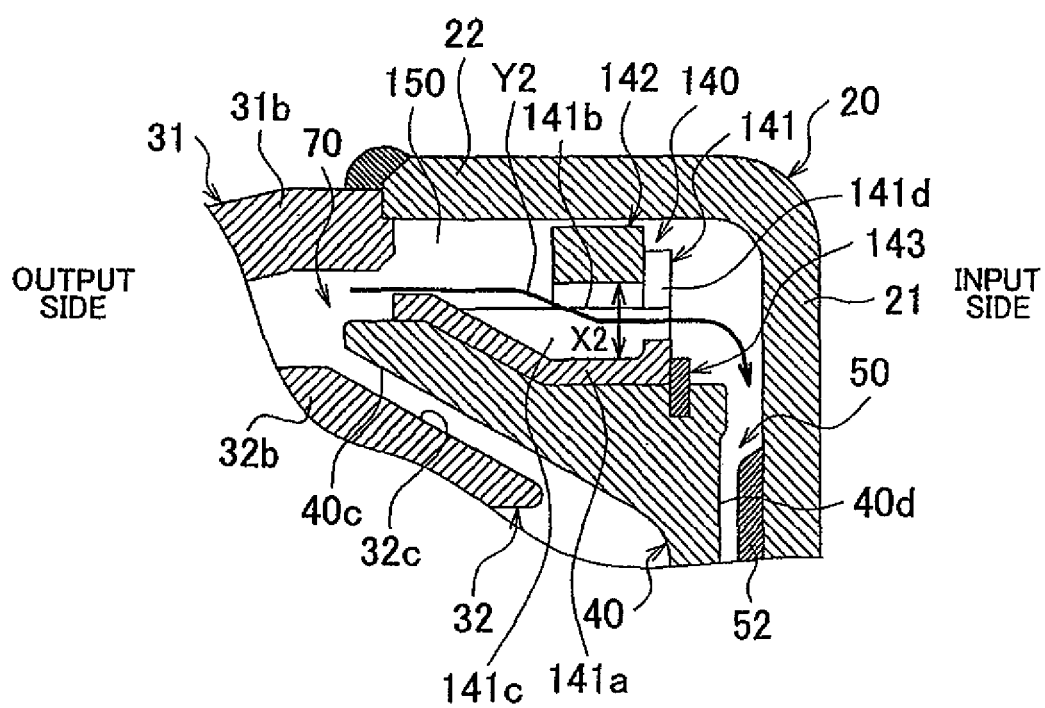
FIG. 25 is a view showing an exemplary arrangement of the first channel resistance changing mechanism.
Figure 26:
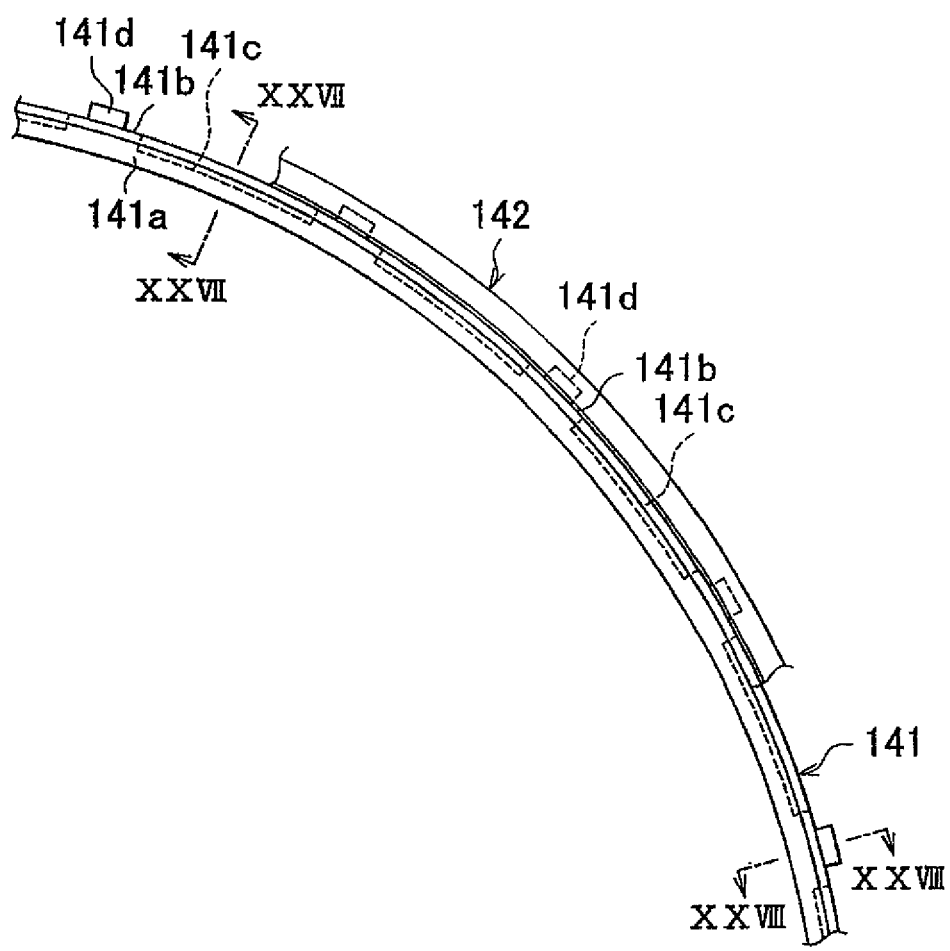
FIG. 26 is a view showing an exemplary arrangement of the first channel resistance changing mechanism.
Figure 27:
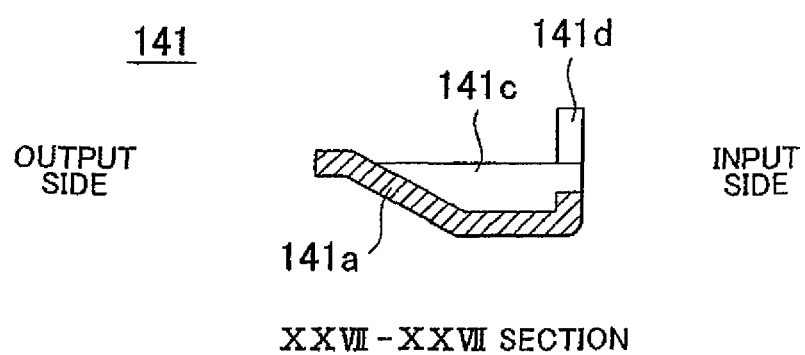
FIG. 27 is a view showing a section taken along line I-I.
Figure 28:
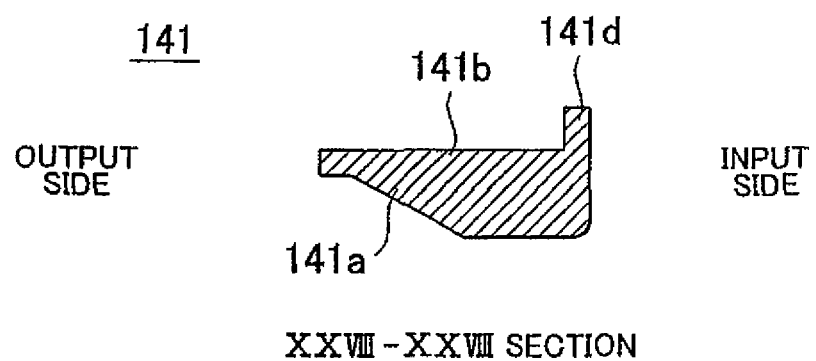
FIG. 28 is a view showing a section taken along line II-II.

In the illustrated embodiment, a first channel resistance changing mechanism for changing the channel resistance of a channel formed between the PORT 1 and the PORT 3 may be provided. FIG. 24 through FIG. 26 show an exemplary arrangement of the first channel resistance changing mechanism. FIG. 27 is a cross-sectional view showing a section taken along line I-I in FIG. 26. FIG. 28 is a cross-sectional view showing a section taken along line II-II in FIG. 26. The first channel resistance changing mechanism 140, which is one example of the first channel resistance changing unit, is provided in an inter-PORT channel 150 formed between a radially outer end portion of the piston member 40 and the flange 22 of the front cover 20, as shown in FIG. 24-FIG. 28. The first channel resistance changing mechanism 140 consists principally of a slide member 141 and a ring member 142, and is arranged to change the channel resistance of the inter-PORT channel 150. The inter-PORT channel 150 is a channel formed between the FORT 1 and the PORT 3. In this embodiment, the inter-PORT channel 150 is also a channel formed between the PORT 1 and the PORT 2.

As shown in FIG. 26-FIG. 28, the slide member 141 has an annular shape, and is fixed to the radially outer end portion of the piston member 40 with a suitable fixing means, such as a snap ring 143 in this embodiment. The slide member 141 includes a main body 141a, a plurality of slide portions 141b, a plurality of hydraulic oil channel portions 141c, and a plurality of stopper portions 141d.

The main body 141a has an annular shape, and a cross-section of the main body 141a taken in the axial direction has an output-side flat face portion parallel to the axial direction, an input-side flat face portion parallel to the axial direction, and an inclined portion that connects the output-side and input-side flat face portions and is inclined from the output-side flat face portion located at the radially outer side to the input-side flat face portion located at the radially inner side.

The slide portions 141b are formed to extend continuously from the output-side flat face portion parallel to the axial direction, toward the input side, and the ring member 142 is adapted to slide on the slide portions 141b in the axial direction. The slide portions 141b are formed at a plurality of circumferential positions on the main body 141a, namely, the slide portions 141b are arranged to be spaced from each other in the circumferential direction.

The hydraulic oil channel portions 141c are part of the inter-PORT channel 150, and allow the hydraulic oil to flow from the PORT 1 into the PORT 3 or allow the hydraulic oil to flow from the PORT 3 into the PORT 1. The hydraulic oil channel portions 141c are formed between adjacent ones of the slide portions 141b that are spaced from each other in the circumferential direction. Thus, the hydraulic oil channel portions 141c are formed at a plurality of circumferential positions on the main body 141a, such that the oil channel portions 141c and the slide portions 141b are arranged alternately in the circumferential direction.

The stopper portions 141d serve to limit movement of the ring member 142 toward the input side in the axial direction. The stopper portions 141d are formed on the slide portions 141b such that each of the stopper portions 141d protrudes from an input-side end portion of the corresponding slide portion 141b, radially outwardly of the inner circumferential surface of the ring member 142. With this arrangement, the axial movement of the ring member 142 along the slide portions 141b toward the input side is limited when the ring member 142 contacts or abuts on the stopper portions 141d.

In operation, the ring member 142 moves along the slide portions 141b in the axial direction, so as to change the area formed between the slide members 141 and the ring member 142, and thus change the channel resistance of the inter-PORT channel 150. The ring member 142 is supported by the slide portions 141b and the flange 22 of the front cover 20 such that it is movable in the axial direction. The ring member 142 moves in the axial direction relative to the slide members 141, in accordance with the flow of the hydraulic oil in the inter-PORT channel 150.

When the hydraulic oil flows from the PORT 1 into the inter-PORT channel 150, flow of the hydraulic oil from the input side to the output side as indicated by arrow Y1 occurs in the inter-PORT channel 150, as shown in FIG. 24. As a result, the ring member 142 moves toward the output side in the axial direction, along the slide portions 141b of the slide member 141. The pump shell 31b is fixed to the flange 22 of the front cover 20 such that the input-side end portion of the pump shell 31b protrudes radially inwards from the outer circumferential surface of the ring member 142. Therefore, the ring member 142 that moves toward the output side in the axial direction contacts the input-side end portion of the pump shell 31b, so that the movement of the ring member 142 toward the output side is limited by the pump shell 31b. In this condition, the hydraulic oil that flows from the PORT 1 into the inter-PORT channel 150 passes through a clearance X1 formed between the inner circumferential surface of the ring member 142 and a portion of the slide member 141 which is opposed to the inner circumferential surface (i.e., the output-side flat face portion parallel to the axial direction), and flows into the PORT 3 and/or the PORT 2. When the hydraulic oil flows from the PORT 3 or PORT 2 into the inter-PORT channel 150, flow of the hydraulic oil from the output side toward the input side as indicated by arrow Y2 occurs in the inter-PORT channel 150, as shown in FIG. 25. As a result, the ring member 142 moves toward the input side in the axial direction, along the slide portions 141b of the slide member 141. Then, the ring member 142 is brought into contact with the stopper portions 141d of the slide member 141 so that the movement of the ring member 142 toward the input side is limited. In this condition, the hydraulic oil that flows from the PORT 3 or PORT 2 into the inter-PORT channel 150 passes through a clearance X2 formed between the inner circumferential surface of the ring member 142 and a portion of the slide member 141 which is opposed to the inner circumferential surface (i.e., the input-side flat face portion parallel to the axial direction), namely, passes through a spacing between the ring member 142 and the hydraulic oil channel portions 141c, and flows into the PORT 1.

The clearance X2 through which the hydraulic oil passes in the condition of FIG. 25 is larger than the clearance X1 through which the hydraulic oil passes in the condition of FIG. 24. Namely, when the hydraulic oil is supplied from the PORT 1, the area formed between the slide member 141 and the ring member 142 is smaller than that formed when the hydraulic oil is discharged from the PORT 1, and the channel resistance is increased. In the first operating mode in which the hydraulic oil is supplied from the PORT 1, the hydraulic oil supplied from the PORT 1 is discharged from the PORT 3, so that heat generated in the fluid transmission mechanism 30 can be transferred to the outside of the fluid transmission mechanism 30 via the hydraulic oil. In this case, the amount of the hydraulic oil discharged from the PORT 3 is deemed sufficient if heat can be transferred by the oil. If the amount of the hydraulic oil is larger than necessary, a pump loss may be increased. Therefore, the first channel resistance changing mechanism 140 increases the channel resistance when the hydraulic oil is supplied from the PORT 1 and discharged from the PORT 3, as described above, so as to reduce the amount or flow rate of the hydraulic oil flowing from the PORT 1 into the PORT 3, and thus reduce the pump loss. Consequently, the fuel efficiency can be improved.

In the illustrated embodiment, the friction plate 51 of the lock-up clutch 50 is provided on the piston member 40, and the lock-up clutch 50 is placed in the engaged state through frictional engagement between the friction plate 51 and the cover-side clutch face of the front cover 20. However, the invention is not limited to this arrangement. For example, a friction plate 52 may be provided on the front cover 20, as shown in FIG. 24 and FIG. 25. In this case, the lock-up clutch 50 may enable the front cover 20 and the piston member 40 to engage with each other, through frictional engagement between the first piston-side clutch face 40d formed on the piston member 40, and the friction surface of the friction plate 52 as the cover-side clutch face that is formed on the front cover 20 and is opposed to the first piston-side clutch face 40d. The provision of the friction plate 52 on the front cover 20 causes heat to be generated in the piston member 40 when the lock-up clutch 50 is switched from the release state to the engaged state. However, the hydraulic oil flows into the PORT 2 when the lock-up clutch 50 is in the engaged state; therefore the heat generated in the piston member 40 can be transferred to the outside of the fluid transmission device 1 via the hydraulic oil.

Figure 29:
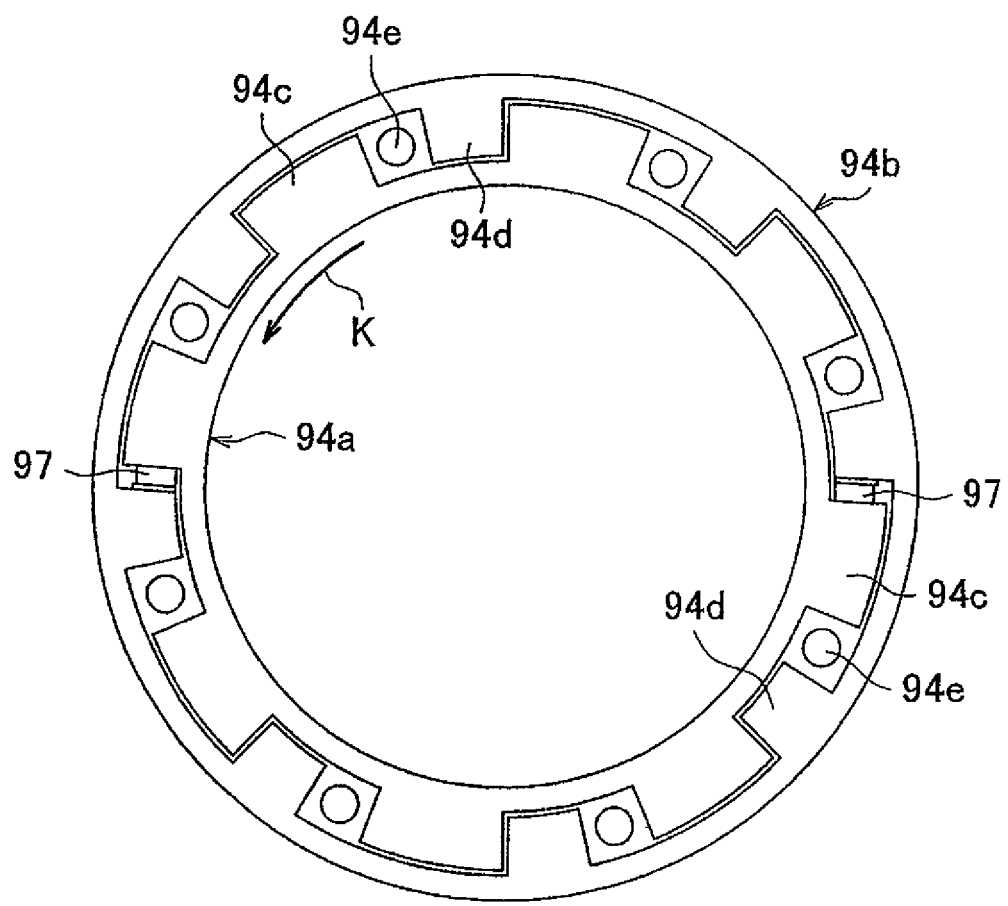
FIG. 29 is a view showing an exemplary arrangement of a second channel resistance changing mechanism.
Figure 30:
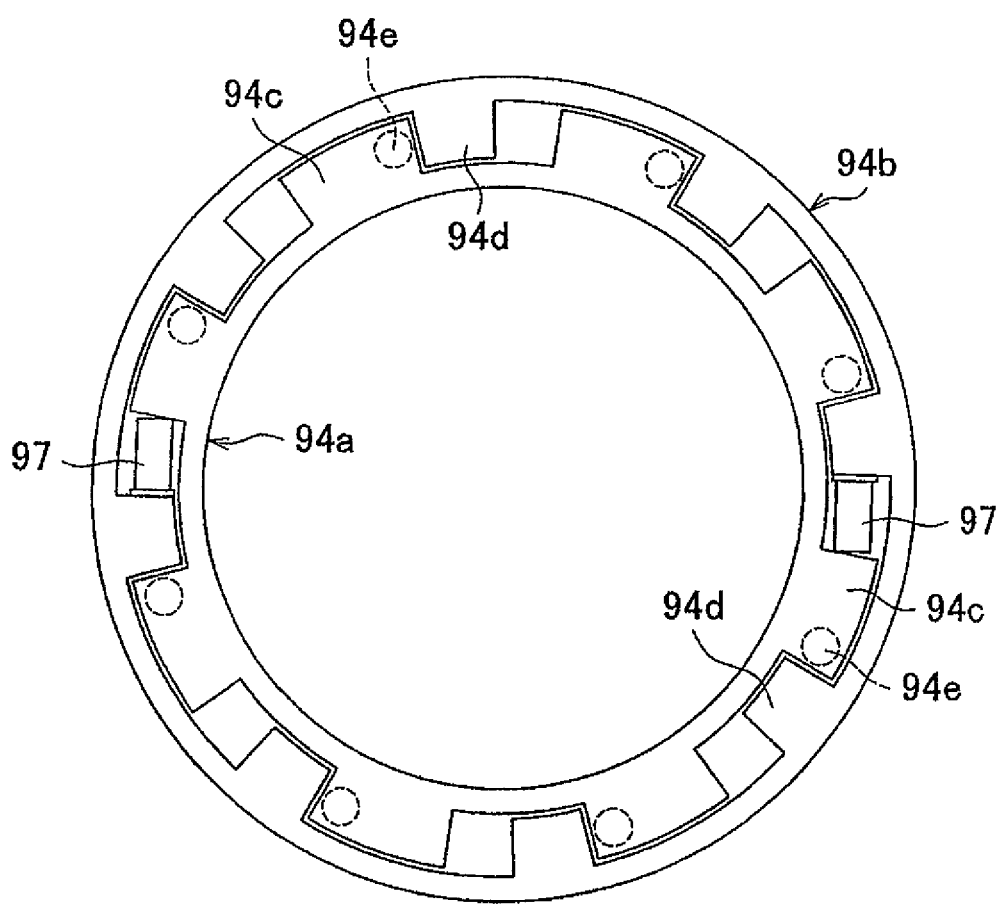
FIG. 30 is a view showing an exemplary arrangement of the second channel resistance changing mechanism.
Figure 31:
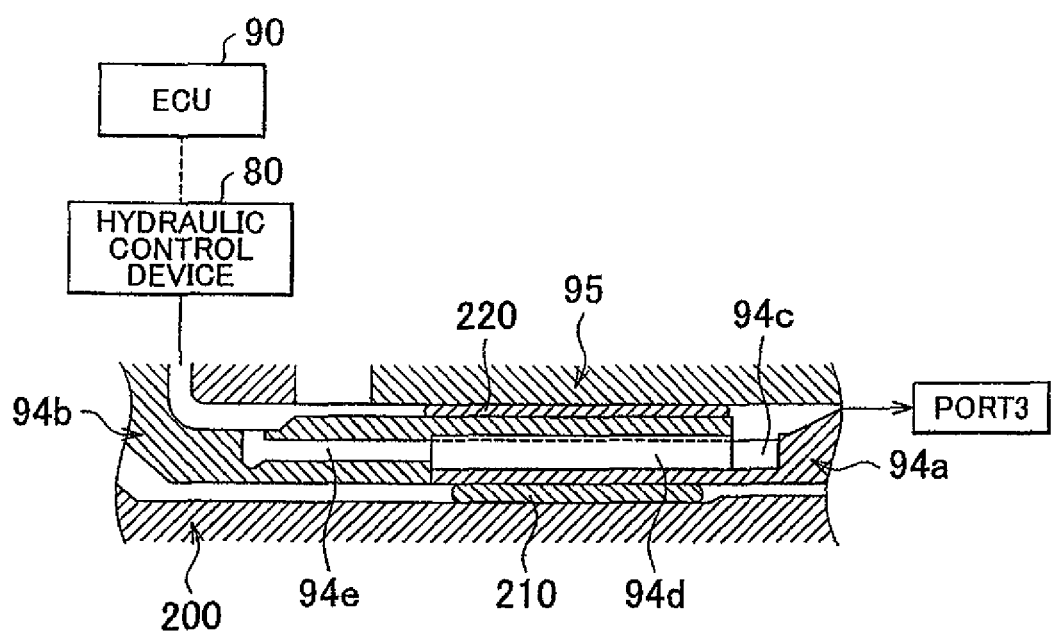
FIG. 31 is a view showing an exemplary arrangement of the second channel resistance changing mechanism.

In the illustrated embodiment, a second channel resistance changing mechanism for changing the channel resistance of a channel formed between the hydraulic control device 80 and the PORT 3 may be provided. FIG. 29 through FIG. 31 show an exemplary arrangement of the second channel resistance changing mechanism. The second channel resistance changing mechanism, which is one example of the second channel resistance changing unit, is formed in a channel formed between the hydraulic control device 80 and the PORT 3, namely, in a channel between the sleeve 95, and a first split housing 94a and a second split housing 94b, as shown in FIG. 29-FIG. 31. The second channel resistance changing mechanism consists principally of the first split housing 94a, second spring housing 94b and elastic members 97, and is operable to change the channel resistance based on the torque of the stator 33.

The first split housing 94a, which has a cylindrical shape, is fixed to the stator 33 via the one-way clutch 34, and is supported by a bush 210 provided between the first split housing 94a and the output shaft 200 such that the first split housing 94a is rotatable relative to the output shaft 200. The first split housing 94a is formed with a plurality of channel resistance changing portions 94c in an output-side portion thereof as viewed in the axial direction. The channel resistance changing portions 94c protrude radially outwardly of openings of communication passages 94e (which will be described later) from the outer circumferential surface of the first split housing 94a, and extend from the output-side end portion of the first split housing 94a toward the input side. In operation, the first split housing 94a rotates relative to the second split housing 94b so as to change the areas of the openings of the communication passages 94e. The channel resistance changing portions 94c are formed at a plurality of circumferential positions on the first split housing 94a, i.e., are arranged in the circumferential direction with respect to the first split housing 94a.

The second split housing 94b, which has a cylindrical shape, is supported by a bush 220 provided between the second split housing 94b and the sleeve 95 such that the second split housing 94b is rotatable relative to the output shaft 200. Namely, the first split housing 94a and the second split housing 94b are supported to be rotatable relative to each other. The second split housing 94b is formed at the input side as viewed in the axial direction with a plurality of stopper portions 94d. The stopper portions 94d are formed between adjacent ones of the channel resistance changing portions 94c that are spaced from each other in the circumferential direction. More specifically, the stopper portions 94d protrude radially inwardly of the radially outer end portions of the channel resistance changing portions 94c, from the inner circumferential surface of the second split housing 94b, and extend from an input-side end portion of the second split housing 94b toward the output side. Thus, the stopper portions 94d are formed at a plurality of circumferential positions on the second split housing 94b such that the stopper portions 94d and the channel resistance changing portions 94c are alternately arranged in the circumferential direction.

The second split housing 94b is also formed with the communication passages 94e that connect the hydraulic control device 80 with the PORT 3. Each of the communication passages 94e has an input-side end that is open to an input-side side face of the second split housing 94b which is formed between circumferentially adjacent ones of the stopper portions 94d, and an output-side end that is open to a channel that is formed between the second split housing 94b and the sleeve 95 (at a location closer to the output side than the bush 220) and communicates with the hydraulic control device 80. When the channel resistance changing portion 94c located between circumferentially adjacent ones of the stopper portions 94d reaches one circumferential end portion of the spacing between the stopper portions 94d, the input-side end of the communication passage 94e is exposed to a spacing formed in the other circumferential end portion between the channel resistance changing portion 94c and the stopper portion 94d.

The elastic members 97 serve to produce pressing force for moving the first split housing 94a clockwise in the circumferential direction, relative to the second split housing 94b. In this embodiment, each of the elastic members 97, which is formed by bending a flat plate into the shape of a mountain, is supported by a support portion (not shown) on one side face (remote from the communication passage 94-e) of the corresponding stopper portion 94d as viewed in the circumferential direction, to be opposed to the corresponding channel resistance changing portion 94c. The elastic member 97 elastically deforms when the first split housing 94a moves relative to the second split housing 94b in one of the opposite circumferential directions, i.e., in the direction of arrow K in FIG. 29, so as to apply pressing force for moving the first split housing 94a relative to the second split housing 94b in the other circumferential direction, i.e., in the direction opposite to the direction of arrow K in FIG. 29, to the first split housing 94a.

When the fluid transmission device 1 operates in the first operating mode, the hydraulic oil supplied from the PORT 1 passes the PORT 2 and the PORT 3. In the first operating mode, the fluid transmission mechanism 30 is brought into a coupling state, and the direction of the force applied from the hydraulic oil to the stator 33 is reversed. When the fluid transmission mechanism 30 is not in the coupling state, the stator 33 produces torque in the direction of arrow K in FIG. 29, using the force applied from the hydraulic oil. Accordingly, the elastic members 97 elastically deform under the influence of the torque of the stator 33, and each of the channel resistance changing portions 94c moves to one end portion of the spacing between circumferentially adjacent ones of the stopper portions 94d, which portion is located at the leading side in the circumferential direction (direction of arrow K in FIG. 29). As a result, the input-side ends of the communication passages 94e are exposed, as shown in FIG. 29, and the hydraulic oil that has passed the PORT 3 passes through the communication passages 94e, flows into the hydraulic control device 80, and is discharged to the outside of the fluid transmission device 1. When the fluid transmission mechanism 30 is in the coupling state, on the other hand, the torque produced in the direction of arrow K in FIG. 29 due to the force applied from the hydraulic oil to the stator 33 is reduced. As a result, the elastic members 97 that have been elastically deformed due to the torque of the stator 33 apply force to the first split housing 94 in an attempt to resume the original shape. With the force thus applied from the elastic members 97 to the first split housing 94a, each of the channel resistance changing portions 94c moves to the other end portion of the spacing between circumferentially adjacent ones of the stopper portions 94d, which portion is located at the leading side in the direction opposite to the direction of arrow K in FIG. 29. As a result, the input-side ends of the communication passages 94 are closed by the channel resistance changing portions 94c, as shown in FIG. 30, and the hydraulic oil that has passed the PORT 3 cannot pass through the communication passages 94e, cannot flow into the hydraulic control device 80, and cannot be discharged to the outside of the fluid transmission device 1.

In the first operating mode in which the fluid transmission mechanism 30 is in the coupling state, the area of the openings at the input-side ends of the communication passages 94e is made smaller than that in the case where the fluid transmission mechanism 30 in not in the coupling state, and the channel resistance increases with the reduction in the area of the openings. Namely, when the operating mode is switched from the first operating mode to another operating mode, namely, from the fluid transmission state to the damper operating, direct transmission state, or damper non-operating, direct transmission state, the channel resistance increases before the lock-up clutch 50 is brought into the engaged state. Thus, since the channel resistance of the channel formed between the hydraulic control device 80 and the PORT 3 is increased before the lock-up clutch 50 is brought into the engaged state, the amount or flow rate of the hydraulic oil discharged from the PORT 3 can be reduced, and the pressure in the PORT 3 can be increased. As a result, a pressure difference between the PORT 3 and the PORT 1 is reduced, which makes it easy for the piston member 40 to move to the input side. In this manner, when the fluid transmission device 1 is switched from the fluid transmission state to the damper operating, direct transmission state, or the damper non-operating, direct transmission state, preparation for bringing the lock-up clutch 50 into the engaged state is appropriately made, and the readiness to engage the lock-up clutch 50 is improved. Also, since the lock-up clutch 50 is engaged after the fluid transmission mechanism 30 is placed in the coupling state in the first operating mode, the second channel resistance changing mechanism is able to automatically increase the channel resistance before the lock-up clutch 50 is engaged.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

As described above, the fluid transmission device according to the present invention is useful as a fluid transmission device equipped with a lock-up clutch and a damper or dampers, and is suitably employed for reducing vibrations, such as booming noise, in a local range or over the entire range of the rotational speed of the driving source.

The invention claimed is:
1. A fluid transmission device comprising:
a front cover to which driving force of a driving source is transmitted from an input member;
a pre-damper that has a first elastic body, and transmits the driving force to the front cover via the first elastic body;
a fluid transmission unit that includes a pump connected to the front cover and a turbine, and is operable to transmit the driving force transmitted to the pump, to the turbine, via a hydraulic fluid;
a piston member that is disposed between the front cover and the fluid transmission unit, and delivers the driving force to an output member;
a dynamic damper that has a second elastic body, and is connected to the piston member and the turbine via the second elastic body; and
a clutch control device,
wherein:
a part of the turbine and a part of the piston member provide a turbine clutch, and are engaged with each other when the turbine clutch is in an engaged state;
a part of the front cover and another part of the piston member provide a lock-up clutch, and are engaged with each other when the lock-up clutch is in an engaged state; and
the clutch control device controls the lock-up clutch and the turbine clutch.

2. The fluid transmission device according to claim 1, wherein:
the clutch control device controls the lock-up clutch and the turbine clutch so that the lock-up clutch is placed in a release state and the turbine clutch is placed in the engaged state when the fluid transmission device is in a fluid transmission state in which the driving force is transmitted to the output member via the fluid transmission unit;
the clutch control device controls the lock-up clutch and the turbine clutch so that the lock-up clutch is placed in the engaged state and the turbine clutch is placed in a release state when the fluid transmission device is in a damper operating, direct transmission state in which the driving force is directly transmitted to the output member while the dynamic damper is in an operating state in which the rotational speed of at least a part of the dynamic damper is different from that of the piston member; and
the clutch control device controls the lock-up clutch and the turbine clutch so that the lock-up clutch is placed in the engaged state and the turbine clutch is placed in the engaged state when the fluid transmission device is in a damper non-operating, direct transmission state in which the driving force is directly transmitted to the output member while the dynamic damper is in a state other than said operating state.

3. The fluid transmission device according to claim 1, wherein:
said part of the front cover and said another part of the piston member are engaged by friction with each other when the lock-up clutch is in the engaged state, said part of the front cover comprising a cover-side clutch face formed on the front cover, said another part of the piston member comprising a first piston-side clutch face that is formed on the piston member and is opposed to the cover-side clutch face;
said part of the turbine and said part of the piston member are engaged by friction with each other when the turbine clutch is in the engaged state, said part of the turbine comprising a turbine-side clutch face formed on the turbine, said part of the piston member comprising a second piston-side clutch face that is formed on the piston member and is opposed to the turbine-side clutch face;

the first piston-side clutch face is formed on one side of the piston member which is closer to the front cover; and the second piston-side clutch face is formed on the other side of the piston member which is closer to the turbine.

4. The fluid transmission device according to claim 3, wherein:

the turbine-side clutch face is a turbine-side inclined face that is inclined radially inwards in an axial direction from an output-member side to an input-member side; and the second piston-side clutch face is a piston-side inclined face that is located radially outwardly of the turbine-side inclined face and is opposed to the turbine-side inclined face, the piston-side inclined face being inclined from radially inwards in the axial direction from the output-member side to the input-member side.

5. The fluid transmission device according to claim 1, wherein:

the pre-damper comprises an elastic body holding member that holds the first elastic body, rotates as a unit with the input member, and transmits the driving force to the first elastic body, and an elastic body side member that rotates relative to the elastic body holding member, rotates as a unit with the front cover, and transmits the driving force transmitted to the first elastic body, to the front cover;

the front cover is supported such that the front cover rotates relative to the input member; and the elastic body side member is formed with a space in which the first elastic body and the elastic body holding member are received, and is fastened by a fastening member to the front cover such that the elastic body side member rotates relative to the elastic body holding member and rotates as a unit with the front cover.

6. The fluid transmission device according to claim 5, wherein:

the space is closed by the input member and the front cover; and a sealing member is provided between the elastic body side member and the front cover.

7. The fluid transmission device according to claim 1, wherein the clutch control device controls a pressure of the hydraulic fluid in a first port as a space formed between the front cover and the piston member, a pressure of the hydraulic fluid in a second port formed between the piston member and the turbine, and a pressure of the hydraulic fluid in a third port formed between the turbine and the pump, so as to control the lock-up clutch and the turbine clutch.

8. The fluid transmission device according to claim 7, wherein:

the clutch control device includes a port controller that brings each of the first, second and third ports into a supply state in which the hydraulic fluid is supplied to said each port or a discharge state in which the hydraulic fluid is discharged from said each port;

when the fluid transmission device is in a fluid transmission state in which the driving force is transmitted to the output member via the fluid transmission unit, the port controller brings the first port into the supply state, brings the second port into the discharge state, and brings the third port into the discharge state, so as to place the lock-up clutch in the release state and place the turbine clutch in the engaged state;

the port controller brings the first port into the discharge state, brings the second port into the supply state, and brings the third port into the discharge state, so as to place the lock-up clutch in the engaged state and place the turbine clutch in the release state, when the fluid transmission device is in a damper operating, direct transmission state in which the driving force is directly transmitted to the output member while the dynamic damper is in an operating state in which the rotational speed of at least a part of the dynamic damper is different from that of the piston member; and the port controller brings the first port into the discharge state, brings the second port into the discharge state, and brings the third port into the supply state, so as to place the lock-up clutch in the engaged state and place the turbine clutch in the engaged state, when the fluid transmission device is in a damper non-operating, direct transmission state in which the driving force is directly transmitted to the output member while the dynamic damper is in a state other than said operating state.

9. The fluid transmission device according to claim 8, wherein:

the clutch control device includes a slip controller that controls the lock-up clutch that is in the engaged state into a slipping state in which the lock-up clutch is partially engaged or a fully engaged state; and when the fluid transmission device is in a direct transmission state in which the driving force is directly transmitted to the output member, the slip controller controls a flow rate of the hydraulic fluid supplied to or discharged from the third port, so as to control the lock-up clutch into the slipping state or the fully engaged state.

10. The fluid transmission device according to claim 8, wherein, during switching from the fluid transmission state to the damper operating, direct transmission state, the port controller performs intermediate control for bringing the second port into the supply state prior to switching to the damper operating, direct transmission state.

11. The fluid transmission device according to claim 8, wherein, during switching from the damper operating, direct transmission state to the fluid transmission state, the port controller performs intermediate control for bringing the second port into the discharge state prior to switching to the fluid transmission state.

12. The fluid transmission device according to claim 8, wherein, during switching from the fluid transmission state to the damper non-operating, direct transmission state, the port controller performs intermediate control for bringing the third port into the supply state prior to switching to the damper non-operating, direct transmission state.

13. The fluid transmission device according to claim 8, wherein, during switching from the damper non-operating, direct transmission state to the fluid transmission state, the port controller performs intermediate control for bringing the first port into the supply state prior to switching to the fluid transmission state.

14. The fluid transmission device according to claim 8, wherein the port controller brings at least the second port into the discharge state when a brake is applied by a braking device provided in a vehicle on which the driving source is installed.

15. The fluid transmission device according to claim 8, wherein:

the clutch control device controls at least the turbine clutch based on a rotational speed of the driving source; and a turbine-clutch engagement speed that is the rotational speed of the driving source at which the turbine clutch is brought into the engaged state is different from a turbine-clutch release speed that is the rotational speed of the driving source at which the turbine clutch is brought into the release state.

16. The fluid transmission device according to claim 8, further comprising a first channel resistance changing unit that is provided in a channel formed between the first port and the third port and is configured to change a channel resistance of the channel,
wherein the first channel resistance changing unit increases the channel resistance when the hydraulic fluid is supplied from the first port, to a higher level than that provided when the hydraulic fluid is discharged from the first port.

17. The fluid transmission device according to claim 8, further comprising a second channel resistance changing unit that is provided in a channel formed between the clutch control device and the third port and is configured to change a channel resistance of the channel,
wherein the second channel resistance changing unit increases the channel resistance before the lock-up clutch is placed in the engaged state when the fluid transmission device switches from the fluid transmission state to the damper operating, direct transmission state or the damper non-operating, direct transmission state.

18. The fluid transmission device according to claim 17, wherein:
the fluid transmission unit includes a stator disposed between the pump and the turbine; and
the second channel resistance changing unit increases the channel resistance with reduction in torque of the stator in the fluid transmission state.

19. The fluid transmission device according to claim 1, wherein:
the lock-up clutch has a friction plate; and
the friction plate is provided on the front cover.

20. A fluid transmission device comprising:
a front cover to which driving force of a driving source is transmitted from an input member;
a fluid transmission unit that has a pump connected to front cover and a turbine, and is operable to transmit the driving force transmitted to the pump, to the turbine, via a hydraulic fluid;
a piston member that is disposed between the front cover and the fluid transmission unit, and delivers the driving force to an output member;
a pre-damper that is provided between the input member and the front cover, for damping vibrations corresponding to a rotational speed of the driving source;
a clutch control device; and
a dynamic damper that is connected to the turbine and the piston member, and elastically supports the turbine when the clutch control device places a turbine clutch that a part of the turbine and a part of the piston member provide in a release state, so as to damp vibrations corresponding to a particular rotational speed range of the driving source,
wherein:
a part of the front cover and another part of the piston member provide a lock-up clutch, and are engaged with each other when the lock-up clutch is in an engaged state;
the part of the turbine and the part of the piston member are engaged with each other when the turbine clutch is in an engaged state; and
the clutch control device controls the lock-up clutch and the turbine clutch.

21. The fluid transmission device according to claim 20, wherein:
the clutch control device controls the lock-up clutch and the turbine clutch so that the lock-up clutch is placed in a release state and the turbine clutch is placed in the engaged state when the fluid transmission device is in a fluid transmission state in which the driving force is transmitted to the output member via the fluid transmission unit;
the clutch control device controls the lock-up clutch and the turbine clutch so that the lock-up clutch is placed in the engaged state and the turbine clutch is placed in a release state when the fluid transmission device is in a damper operating, direct transmission state in which the driving force is directly transmitted to the output member while the dynamic damper is in an operating state in which the rotational speed of at least a part of the dynamic damper is different from that of the piston member; and
the clutch control device controls the lock-up clutch and the turbine clutch so that the lock-up clutch is placed in the engaged state and the turbine clutch is placed in the engaged state when the fluid transmission device is in a damper non-operating, direct transmission state in which the driving force is directly transmitted to the output member while the dynamic damper is in a state other than said operating state.

22. The fluid transmission device according to claim 20, wherein:
said part of the front cover and said another part of the piston member are engaged by friction with each other when the lock-up clutch is in the engaged state, said part of the front cover comprising a cover-side clutch face formed on the front cover, said another part of the piston member comprising a first piston-side clutch face that is formed on the piston member and is opposed to the cover-side clutch face;
said part of the turbine and said part of the piston member are engaged by friction with each other when the turbine clutch is in the engaged state, said part of the turbine comprising a turbine-side clutch face formed on the turbine, said part of the piston member comprising a second piston-side clutch face that is formed on the piston member and is opposed to the turbine-side clutch face;
the first piston-side clutch face is formed on one side of the piston member which is closer to the front cover; and
the second piston-side clutch face is formed on the other side of the piston member which is closer to the turbine.

23. The fluid transmission device according to claim 22, wherein:
the turbine-side clutch face is a turbine-side inclined face that is inclined radially inwards in an axial direction from an output-member side to an input-member side; and
the second piston-side clutch face is a piston-side inclined face that is located radially outwardly of the turbine-side inclined face and is opposed to the turbine-side inclined face, the piston-side inclined face being inclined from radially inwards in the axial direction from the output-member side to the input-member side.

24. The fluid transmission device according to claim 20, wherein the clutch control device controls a pressure of the hydraulic fluid in a first port as a space formed between the front cover and the piston member, a pressure of the hydraulic fluid in a second port formed between the piston member and the turbine, and a pressure of the hydraulic fluid in a third port formed between the turbine and the pump, so as to control the lock-up clutch and the turbine clutch.

25. The fluid transmission device according to claim 24, wherein:
   the clutch control device includes a port controller that brings each of the first, second and third ports into a supply state in which the hydraulic fluid is supplied to said each port or a discharge state in which the hydraulic fluid is discharged from said each port;
   when the fluid transmission device is in a fluid transmission state in which the driving force is transmitted to the output member via the fluid transmission unit, the port controller brings the first port into the supply state, brings the second port into the discharge state, and brings the third port into the discharge state, so as to place the lock-up clutch in the release state and place the turbine clutch in the engaged state;
   the port controller brings the first port into the discharge state, brings the second port into the supply state, and brings the third port into the discharge state, so as to place the lock-up clutch in the engaged state and place the turbine clutch in the release state, when the fluid transmission device is in a damper operating, direct transmission state in which the driving force is directly transmitted to the output member while the dynamic damper is in an operating state in which the rotational speed of at least a part of the dynamic damper is different from that of the piston member; and
   the port controller brings the first port into the discharge state, brings the second port into the discharge state, and brings the third port into the supply state, so as to place the lock-up clutch in the engaged state and place the turbine clutch in the engaged state, when the fluid transmission device is in a damper non-operating, direct transmission state in which the driving force is directly transmitted to the output member while the dynamic damper is in a state other than said operating state.

26. The fluid transmission device according to claim 25, wherein:
   the clutch control device includes a slip controller that controls the lock-up clutch that is in the engaged state into a slipping state in which the lock-up clutch is partially engaged or a fully engaged state; and
   when the fluid transmission device is in a direct transmission state in which the driving force is directly transmitted to the output member, the slip controller controls a flow rate of the hydraulic fluid supplied to or discharged from the third port, so as to control the lock-up clutch into the slipping state or the fully engaged state.

27. The fluid transmission device according to claim 25, wherein, during switching from the fluid transmission state to the damper operating, direct transmission state, the port controller performs intermediate control for bringing the second port into the supply state prior to switching to the damper operating, direct transmission state.

28. The fluid transmission device according to claim 25, wherein, during switching from the damper operating, direct transmission state to the fluid transmission state, the port controller performs intermediate control for bringing the second port into the discharge state prior to switching to the fluid transmission state.

29. The fluid transmission device according to claim 25, wherein, during switching from the fluid transmission state to the damper non-operating, direct transmission state, the port controller performs intermediate control for bringing the third port into the supply state prior to switching to the damper non-operating, direct transmission state.

30. The fluid transmission device according to claim 25, wherein, during switching from the damper non-operating, direct transmission state to the fluid transmission state, the port controller performs intermediate control for bringing the first port into the supply state prior to switching to the fluid transmission state.

31. The fluid transmission device according to claim 25, wherein the port controller brings at least the second port into the discharge state when a brake is applied by a braking device provided in a vehicle on which the driving source is installed.

32. The fluid transmission device according to claim 25, wherein:
   the clutch control device controls at least the turbine clutch based on a rotational speed of the driving source; and
   a turbine-clutch engagement speed that is the rotational speed of the driving source at which the turbine clutch is brought into the engaged state is different from a turbine-clutch release speed that is the rotational speed of the driving source at which the turbine clutch is brought into the release state.

33. The fluid transmission device according to claim 25, further comprising a first channel resistance changing unit that is provided in a channel formed between the first port and the third port and is configured to change a channel resistance of the channel,
   wherein the first channel resistance changing unit increases the channel resistance when the hydraulic fluid is supplied from the first port, to a higher level than that provided when the hydraulic fluid is discharged from the first port.

34. The fluid transmission device according to claim 25, further comprising a second channel resistance changing unit that is provided in a channel formed between the clutch control device and the third port and is configured to change a channel resistance of the channel,
   wherein the second channel resistance changing unit increases the channel resistance before the lock-up clutch is placed in the engaged state when the fluid transmission device switches from the fluid transmission state to the damper operating, direct transmission state or the damper non-operating, direct transmission state.

35. The fluid transmission device according to claim 34, wherein:
   the fluid transmission unit includes a stator disposed between the pump and the turbine; and
   the second channel resistance changing unit increases the channel resistance with reduction in torque of the stator in the fluid transmission state.

36. The fluid transmission device according to claim 20, wherein:
   the lock-up clutch has a friction plate; and
   the friction plate is provided on the front cover.

* * * * *

UNITED STATES PATENT AND TRADEMARK OFFICE
CERTIFICATE OF CORRECTION

PATENT NO.       : 8,627,934 B2
APPLICATION NO.  : 13/123362
DATED            : January 14, 2014
INVENTOR(S)      : Murata It is certified that error appears in the above-identified patent and that said Letters Patent is hereby corrected as shown below:

On the Title Page, Item [73],

"[73] Assignee: Toyta Jidosha Kabushiki Kaisha, Aichi-ken (JP)", should be

-- [73] Assignee: Toyota Jidosha Kabushiki Kaisha, Aichi-ken (JP) --.

Signed and Sealed this
Twenty-seventh Day of May, 2014

Michelle K. Lee
*Deputy Director of the United States Patent and Trademark Office*